(12) United States Patent
Ly et al.

(10) Patent No.: US 11,743,784 B2
(45) Date of Patent: Aug. 29, 2023

(54) PHYSICAL UPLINK SHARED CHANNEL CONFIGURATIONS AND OCCASIONS FOR HANDOVER PROCEDURES

(71) Applicant: QUALCOMM Incorporated, San Diego, CA (US)

(72) Inventors: Hung Dinh Ly, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/828,155

(22) Filed: Mar. 24, 2020

(65) Prior Publication Data
US 2020/0314709 A1 Oct. 1, 2020

Related U.S. Application Data

(60) Provisional application No. 62/825,771, filed on Mar. 28, 2019, provisional application No. 62/824,537, filed on Mar. 27, 2019.

(51) Int. Cl.
| | |
|---|---|
| H04W 36/00 | (2009.01) |
| H04W 72/04 | (2023.01) |
| H04W 24/10 | (2009.01) |
| H04W 72/1268 | (2023.01) |
| H04W 72/23 | (2023.01) |

(52) U.S. Cl.
CPC ... *H04W 36/0072* (2013.01); *H04W 72/1268* (2013.01); *H04W 72/23* (2023.01)

(58) Field of Classification Search
None
See application file for complete search history.

(56) References Cited

U.S. PATENT DOCUMENTS

2011/0096752 A1 4/2011 Yuk et al.
2012/0163340 A1* 6/2012 Chin ............... H04W 36/0088
370/331

(Continued)

FOREIGN PATENT DOCUMENTS

WO WO-2018092882 A1 5/2018

OTHER PUBLICATIONS

International Search Report and Written Opinion—PCT/US2020/024659—ISA/EPO—dated Sep. 10, 2020.

(Continued)

*Primary Examiner* — Sai Aung
(74) *Attorney, Agent, or Firm* — Holland & Hart LLP

(57) ABSTRACT

Methods, systems, and devices for wireless communications are described. A user equipment (UE) may identify physical uplink shared channel (PUSCH) configuration parameters to send a handover completion message at the end of a handover. A source cell may notify the UE of a handover via a handover command and the UE may acquire system information, and in some cases, a downlink message, from a target cell. The UE may identify a waveform configuration, numerology configuration, and/or modulation scheme using information from the handover command message, the system information, and/or the downlink message. The UE may also determine occasions for transmitting a PUSCH. For example, each occasion may include a set of time-frequency resources on which the PUSCH may be transmitted. The UE may send the handover completion message to the target cell via the PUSCH, during the one or more identified occasions, using the identified configuration parameters.

28 Claims, 27 Drawing Sheets

(56) References Cited

U.S. PATENT DOCUMENTS

| | | | |
|---|---|---|---|
| 2018/0020382 A1* | 1/2018 | Kim | H04W 8/22 |
| 2018/0176710 A1* | 6/2018 | Jang | H04W 88/10 |
| 2018/0206173 A1* | 7/2018 | Virtej | H04W 40/02 |
| 2018/0255569 A1* | 9/2018 | Aiba | H04W 76/30 |
| 2019/0053316 A1* | 2/2019 | Aiba | H04W 76/27 |
| 2019/0149421 A1* | 5/2019 | Jin | H04L 5/0053 |
| | | | 370/331 |
| 2019/0159241 A1* | 5/2019 | Aiba | H04J 11/00 |
| 2019/0274077 A1 | 9/2019 | Suzuki et al. | |
| 2020/0245200 A1* | 7/2020 | Xiong | H04W 56/001 |
| 2020/0305094 A1* | 9/2020 | Ouchi | H04L 5/0051 |
| 2020/0389886 A1* | 12/2020 | Lee | H04W 36/0072 |
| 2021/0297909 A1* | 9/2021 | Lee | H04W 36/0079 |

OTHER PUBLICATIONS

Partial International Search Report—PCT/US2020/024659—ISA/EPO—dated Jul. 20, 2020.

ZTE Corporation, et al., "2-step RACH vs RACH-Less Handover", 3GPP Draft, R2-1904247, 2-step RACH vs RACH-Less Handover, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051701555, 6 pages, Retrieved from the Internet: URL: http://www.3gpp.org/ftp/Meetings%5F3GPP%5FSYNC/RAN2/Docs/R2%2D1904247%2Ezip. [retrieved on 2819-84-86] p. 1-p. 6.

ZTE Corporation, et al., "Discussion on the RACH-less HO in NR", 3GPP Draft, R2-1904246, Discussion on the RACH-less HO in NR, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051701554, 4 pages, Retrieved from the Internet: URL: http://www.3gpp.org/ftp/Meetings%5F3GPP%5FSYNC/RAN2/Docs/R2%2D1904246%2Ezip. [retrieved on 2819-84-86] p. 1-p. 4.

* cited by examiner

PHYSICAL UPLINK SHARED CHANNEL CONFIGURATIONS AND OCCASIONS FOR HANDOVER PROCEDURES

CROSS REFERENCE

The present application for patent claims the benefit of U.S. Provisional Patent Application No. 62/824,537 by Ly et al., entitled "PHYSICAL UPLINK SHARED CHANNEL CONFIGURATIONS FOR HANDOVER PROCEDURES," filed Mar. 27, 2019, and to U.S. Provisional Patent Application No. 62/825,771 by Ly et al., entitled "PHYSICAL UPLINK SHARED CHANNEL OCCASIONS FOR HANDOVER PROCEDURES," filed Mar. 28, 2019, each of which is assigned to the assignee hereof, and expressly incorporated by reference herein.

BACKGROUND

The following relates generally to wireless communications, and more specifically to physical uplink shared channel (PUSCH) configurations and occasions for random access channel (RACH)-less handover procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless networks, a source base station may perform a handover procedure to transfer a UE to a target base station. In a handover procedure, the UE may detach from a connection to the network via the source base station and reattach to the network using a connection via the target base station. However, some handover procedures (e.g., a handover procedure involving RACH procedures) may introduce latency in communications, resulting in an increased interruption time before the UE is able to communicate with the target base station.

SUMMARY

The described techniques relate to improved methods, systems, devices, and apparatuses that support physical uplink shared channel (PUSCH) configurations and occasions for handover procedures, such as random access channel (RACH)-less handover procedures. Generally, the described techniques provide for the indication of a PUSCH configuration used for sending a handover completion message (e.g., a radio resource control (RRC) reconfiguration complete message transmitted over PUSCH) to a base station as part of a RACH-less handover procedure. For example, a source cell (e.g., a source base station) may determine to begin a RACH-less handover procedure to handover a user equipment (UE) to a target cell (e.g., a target base station) and may notify the target cell of the RACH-less handover procedure. In some cases, one or both of the source cell and the target cell may determine a PUSCH configuration for a handover completion message to be sent by the UE via a PUSCH at the end of the RACH-less handover procedure. The determined PUSCH configuration may include a waveform configuration, a numerology configuration, a modulation scheme, or a combination thereof, to be used when transmitting the handover completion message.

The source cell may notify the UE of the RACH-less handover via a handover command message, which, in some cases, may contain an uplink grant for the handover completion message, where the uplink grant contains information regarding the corresponding PUSCH configuration. In other examples, the target cell may send a downlink message (e.g., containing downlink control information (DCI)) including an uplink grant for the handover completion message, where the grant from the target cell may indicate the corresponding PUSCH configuration to the UE. The UE may also acquire, from the target cell, system information indicating the PUSCH configuration. Additionally or alternatively, the PUSCH configuration may be based on one or more bandwidth parts (BWPs) of the source cell or the target cell, or may be indicated via an RRC information element. In any case, the UE may identify one or more of a PUSCH waveform configuration, numerology configuration, and modulation scheme using information obtained from one or more of the handover command message, the system information, and the downlink message. Accordingly, the UE may send a handover completion message to the target cell via the PUSCH using the identified PUSCH configuration.

The described techniques may also provide for identifying one or more PUSCH occasions for a UE to transmit a PUSCH that completes a handover procedure (e.g., without performing a RACH procedure) from the source base station (e.g., the source cell) to the target base station (e.g., the target cell). For example, the target base station may determine a set of PUSCH occasions that are available for transmitting the PUSCH, where each of the set of PUSCH occasions includes a different set of time-frequency resources. The target base station may then transmit a first message of the handover procedure that indicates which PUSCH occasions of the set of PUSCH occasions the UE can use for the PUSCH transmission. Additionally, the PUSCH occasions may be frequency division multiplexed (FDMed), time division multiplexed (TDMed), or a combination thereof, where the PUSCH occasions may be multiplexed in frequency first and then in time.

In some cases, the UE may identify these PUSCH occasions for the PUSCH transmission based on downlink resources in the first message that correspond to the PUSCH occasions. For example, the UE may identify a beamforming correspondence (e.g., association) between the downlink resources and the PUSCH occasions that the UE can use for the PUSCH transmission. That is, the UE may receive one or more sets of downlink resources from the target base station, select at least one set of the downlink resources (e.g., based on a reference signal received power (RSRP) measurement), identify a receive beam used to receive the selected set(s) of downlink resources, and transmit the PUSCH on a transmit beam that corresponds to the identified receive beam. In some cases, the downlink resources may include synchronization signal (SS)/physical broadcast channel (PBCH) blocks, channel state information reference signals (CSI-RSs), or a combination thereof. Additionally or alternatively, if the UE does not support beamforming correspondence, the UE may transmit the PUSCH based on a beam-sweeping procedure over the set of PUSCH occasions. In some cases, the UE may determine a timing reference and a frequency reference for the PUSCH occasions (e.g., based on radio frame boundaries, occasions configured for RACH messages, reference frequencies, etc.).

A method of wireless communications at a UE is described. The method may include receiving, from a source cell, a handover command including an indication to perform a handover to a target cell; identifying a configuration for a PUSCH based on the handover command or downlink control information of the target cell, the configuration including at least one of a waveform configuration, a numerology configuration, or a modulation scheme configuration; and transmitting, to the target cell, a message via the PUSCH having the identified configuration, the message indicating a completion of the handover to the target cell.

An apparatus for wireless communications at a UE is described. The apparatus may include a processor, memory coupled with the processor, and instructions stored in the memory. The instructions may be executable by the processor to cause the apparatus to receive, from a source cell, a handover command including an indication to perform a handover to a target cell; identify a configuration for a PUSCH based on the handover command or downlink control information of the target cell, the configuration including at least one of a waveform configuration, a numerology configuration, or a modulation scheme configuration; and transmit, to the target cell, a message via the PUSCH having the identified configuration, the message indicating a completion of the handover to the target cell.

Another apparatus for wireless communications at a UE is described. The apparatus may include means for receiving, from a source cell, a handover command including an indication to perform a handover to a target cell; identifying a configuration for a PUSCH based on the handover command or downlink control information of the target cell, the configuration including at least one of a waveform configuration, a numerology configuration, or a modulation scheme configuration; and transmitting, to the target cell, a message via the PUSCH having the identified configuration, the message indicating a completion of the handover to the target cell.

A non-transitory computer-readable medium storing code for wireless communications at a UE is described. The code may include instructions executable by a processor to receive, from a source cell, a handover command including an indication to perform a handover to a target cell; identify a configuration for a PUSCH based on the handover command or downlink control information of the target cell, the configuration including at least one of a waveform configuration, a numerology configuration, or a modulation scheme configuration' and transmit, to the target cell, a message via the PUSCH having the identified configuration, the message indicating a completion of the handover to the target cell.

In some examples of the method, apparatuses, and non-transitory computer-readable medium described herein, identifying the configuration of the PUSCH may include operations, features, means, or instructions for receiving an uplink grant indicating resources for transmitting the PUSCH, the uplink grant including an indication of the configuration for the PUSCH.

Some examples of the method, apparatuses, and non-transitory computer-readable medium described herein may further include operations, features, means, or instructions for identifying, within the uplink grant, an indication of the waveform configuration, and selecting a waveform from a set of waveforms based on the indication of the waveform configuration.

Some examples of the method, apparatuses, and non-transitory computer-readable medium described herein may further include operations, features, means, or instructions for identifying, within the uplink grant, an indication of the numerology configuration, and selecting a numerology from a set of numerologies based on the indication of the numerology configuration.

In some examples of the method, apparatuses, and non-transitory computer-readable medium described herein, the selected numerology may be the same as a numerology of an active uplink bandwidth part of the source cell. In some examples of the method, apparatuses, and non-transitory computer-readable medium described herein, the selected numerology may be different from a numerology of an active uplink bandwidth part of the source cell.

Some examples of the method, apparatuses, and non-transitory computer-readable medium described herein may further include operations, features, means, or instructions for identifying, within the uplink grant, an indication of the modulation scheme configuration, and selecting a modulation scheme from a set of modulation schemes based on the indication of the modulation scheme configuration.

In some examples of the method, apparatuses, and non-transitory computer-readable medium described herein, the modulation scheme includes frequency-domain-based Pi/2 binary phase shift keying for a demodulation reference signal associated with the PUSCH or time-domain-based Pi/2 binary phase shift keying for the demodulation reference signal associated with the PUSCH.

In some examples of the method, apparatuses, and non-transitory computer-readable medium described herein, the indication of the modulation scheme configuration includes one or more reserved bits within the uplink grant. In some examples of the method, apparatuses, and non-transitory computer-readable medium described herein, the uplink grant may be included in the handover command.

In some examples of the method, apparatuses, and non-transitory computer-readable medium described herein, receiving the uplink grant indicating the resources for transmitting the PUSCH may include operations, features, means, or instructions for receiving, from the target cell, the downlink control information including the uplink grant. In some examples of the method, apparatuses, and non-transitory computer-readable medium described herein, identifying the configuration for the PUSCH may include operations, features, means, or instructions for receiving, from the target cell, system information including an indication of the waveform configuration, and selecting a waveform from a set of waveforms based on the indication of the waveform configuration.

In some examples of the method, apparatuses, and non-transitory computer-readable medium described herein, the indication of the waveform configuration may be received within a field of a common configuration information element. In some examples of the method, apparatuses, and non-transitory computer-readable medium described herein, identifying the configuration for the PUSCH may include operations, features, means, or instructions for determining a waveform of an active bandwidth part of the source cell, and selecting the waveform of the active bandwidth part for the PUSCH.

In some examples of the method, apparatuses, and non-transitory computer-readable medium described herein, identifying the configuration for the PUSCH may include operations, features, means, or instructions for determining a numerology of an initial uplink bandwidth part of the target cell, and selecting the numerology of the initial uplink bandwidth part for the PUSCH.

In some examples of the method, apparatuses, and non-transitory computer-readable medium described herein, identifying the configuration for the PUSCH may include operations, features, means, or instructions for determining a numerology of an active uplink bandwidth part of the source cell, and selecting the numerology of the active uplink bandwidth part for the PUSCH.

Some examples of the method, apparatuses, and non-transitory computer-readable medium described herein may further include operations, features, means, or instructions for receiving an uplink grant indicating resources for transmitting the PUSCH, determining whether an indication of the configuration for the PUSCH may be included in the uplink grant, and identifying the configuration for the PUSCH based on a determination that the indication of the configuration may be absent from the uplink grant.

Some examples of the method, apparatuses, and non-transitory computer-readable medium described herein may further include operations, features, means, or instructions for selecting a waveform from a set of waveforms based on an indication of the waveform configuration in system information received from the target cell, where the selection may be based on the indication of the configuration being absent from the uplink grant.

Some examples of the method, apparatuses, and non-transitory computer-readable medium described herein may further include operations, features, means, or instructions for determining a waveform of an active bandwidth part of the source cell, and selecting the waveform of the active bandwidth part for the PUSCH, where the selection may be based on the indication of the configuration being absent from the uplink grant.

Some examples of the method, apparatuses, and non-transitory computer-readable medium described herein may further include operations, features, means, or instructions for selecting a numerology from a set of numerologies based on an indication of the numerology configuration in system information received from the target cell, where the selection may be based on the indication of the configuration being absent from the uplink grant.

Some examples of the method, apparatuses, and non-transitory computer-readable medium described herein may further include operations, features, means, or instructions for determining a numerology of an active bandwidth part of the source cell, and selecting the numerology of the active bandwidth part for the PUSCH, where the selection may be based on the indication of the configuration being absent from the uplink grant.

In some examples of the method, apparatuses, and non-transitory computer-readable medium described herein, the numerology configuration includes a configuration of a numerology for the PUSCH or a numerology of an active bandwidth part for transmitting the PUSCH. In some examples of the method, apparatuses, and non-transitory computer-readable medium described herein, the handover includes a RACH-less handover. In some examples of the method, apparatuses, and non-transitory computer-readable medium described herein, the message includes a radio resource control reconfiguration complete message.

A method of wireless communications at a base station is described. The method may include determining to handover a UE from the base station to a target cell using a handover procedure; determining a configuration for a PUSCH based on the determination, the configuration including at least one of a waveform configuration, a numerology configuration, or a modulation scheme configuration; and transmitting, to the UE, a handover command including an uplink grant indicating resources for transmitting the PUSCH to the target cell, the uplink grant including an indication of the configuration for the PUSCH.

An apparatus for wireless communications at a base station is described. The apparatus may include a processor, memory coupled with the processor, and instructions stored in the memory. The instructions may be executable by the processor to cause the apparatus to determine to handover a UE from the base station to a target cell using a handover procedure; determine a configuration for a PUSCH based on the determination, the configuration including at least one of a waveform configuration, a numerology configuration, or a modulation scheme configuration; and transmit, to the UE, a handover command including an uplink grant indicating resources for transmitting the PUSCH to the target cell, the uplink grant including an indication of the configuration for the PUSCH.

Another apparatus for wireless communications at a base station is described. The apparatus may include means for determining to handover a UE from the base station to a target cell using a handover procedure; determining a configuration for a PUSCH based on the determination, the configuration including at least one of a waveform configuration, a numerology configuration, or a modulation scheme configuration; and transmitting, to the UE, a handover command including an uplink grant indicating resources for transmitting the PUSCH to the target cell, the uplink grant including an indication of the configuration for the PUSCH.

A non-transitory computer-readable medium storing code for wireless communications at a base station is described. The code may include instructions executable by a processor to determine to handover a UE from the base station to a target cell using a handover procedure; determine a configuration for a PUSCH based on the determination, the configuration including at least one of a waveform configuration, a numerology configuration, or a modulation scheme configuration; and transmit, to the UE, a handover command including an uplink grant indicating resources for transmitting the PUSCH to the target cell, the uplink grant including an indication of the configuration for the PUSCH.

Some examples of the method, apparatuses, and non-transitory computer-readable medium described herein may further include operations, features, means, or instructions for receiving, from the target cell, an indication of a capability of the target cell to support one or more modulation schemes from a set of modulation schemes, where the configuration for the PUSCH may be based on the capability of the target cell.

In some examples of the method, apparatuses, and non-transitory computer-readable medium described herein, the set of modulation schemes includes frequency-domain-based Pi/2 binary phase shift keying for a demodulation reference signal associated with the PUSCH and time-domain-based Pi/2 binary phase shift keying for the demodulation reference signal associated with the PUSCH.

In some examples of the method, apparatuses, and non-transitory computer-readable medium described herein, determining the configuration for the PUSCH may include operations, features, means, or instructions for identifying a set of waveforms for the PUSCH, and determining the waveform configuration using a waveform from the set of waveforms.

In some examples of the method, apparatuses, and non-transitory computer-readable medium described herein, determining the configuration for the PUSCH may include operations, features, means, or instructions for identifying a set of numerologies for the PUSCH, and determining the numerology configuration using a numerology from the set of numerologies.

In some examples of the method, apparatuses, and non-transitory computer-readable medium described herein, determining the configuration for the PUSCH may include operations, features, means, or instructions for identifying a set of modulation schemes for the PUSCH, and determining the modulation scheme configuration using a modulation scheme from the set of modulation schemes.

A method of wireless communications at a base station is described. The method may include receiving an indication of a handover procedure to handover a UE from a source cell to a target cell; determining a configuration for a PUSCH based on the indication, the configuration including at least one of a waveform configuration, a numerology configuration, or a modulation scheme configuration; transmitting, to the UE, a first message including an uplink grant indicating resources for transmitting the PUSCH, the uplink grant including an indication of the configuration for the PUSCH; and receiving, from the UE, a second message via the PUSCH having the configuration, the second message indicating a completion of the handover procedure.

An apparatus for wireless communications at a base station is described. The apparatus may include a processor, memory coupled with the processor, and instructions stored in the memory. The instructions may be executable by the processor to cause the apparatus to receive an indication of a handover procedure to handover a UE from a source cell to a target cell; determine a configuration for a PUSCH based on the indication, the configuration including at least one of a waveform configuration, a numerology configuration, or a modulation scheme configuration; transmit, to the UE, a first message including an uplink grant indicating resources for transmitting the PUSCH, the uplink grant including an indication of the configuration for the PUSCH; and receive, from the UE, a second message via the PUSCH having the configuration, the second message indicating a completion of the handover procedure.

Another apparatus for wireless communications at a base station is described. The apparatus may include means for receiving an indication of a handover procedure to handover a UE from a source cell to a target cell; determining a configuration for a PUSCH based on the indication, the configuration including at least one of a waveform configuration, a numerology configuration, or a modulation scheme configuration; transmitting, to the UE, a first message including an uplink grant indicating resources for transmitting the PUSCH, the uplink grant including an indication of the configuration for the PUSCH; and receiving, from the UE, a second message via the PUSCH having the configuration, the second message indicating a completion of the handover procedure.

A non-transitory computer-readable medium storing code for wireless communications at a base station is described. The code may include instructions executable by a processor to receive an indication of a handover procedure to handover a UE from a source cell to a target cell; determine a configuration for a PUSCH based on the indication, the configuration including at least one of a waveform configuration, a numerology configuration, or a modulation scheme configuration; transmit, to the UE, a first message including an uplink grant indicating resources for transmitting the PUSCH, the uplink grant including an indication of the configuration for the PUSCH; and receive, from the UE, a second message via the PUSCH having the configuration, the second message indicating a completion of the handover procedure.

Some examples of the method, apparatuses, and non-transitory computer-readable medium described herein may further include operations, features, means, or instructions for determining a capability of the base station to support one or more modulation schemes from a set of modulation schemes, and transmitting, to the source cell, an indication of the capability.

In some examples of the method, apparatuses, and non-transitory computer-readable medium described herein, the set of modulation schemes includes frequency-domain-based Pi/2 binary phase shift keying for a demodulation reference signal associated with the PUSCH and time-domain-based Pi/2 binary phase shift keying for the demodulation reference signal associated with the PUSCH.

In some examples of the method, apparatuses, and non-transitory computer-readable medium described herein, determining the configuration for the PUSCH may include operations, features, means, or instructions for identifying a set of waveforms for the PUSCH, and determining the waveform configuration using a waveform from the set of waveforms.

In some examples of the method, apparatuses, and non-transitory computer-readable medium described herein, determining the configuration for the PUSCH may include operations, features, means, or instructions for identifying a set of numerologies for the PUSCH, and determining the numerology configuration using a numerology from the set of numerologies. In some examples of the method, apparatuses, and non-transitory computer-readable medium described herein, determining the configuration for the PUSCH may include operations, features, means, or instructions for identifying a set of modulation schemes for the PUSCH, and determining the modulation scheme configuration using a modulation scheme from the set of modulation schemes.

A method of wireless communications at a UE is described. The method may include receiving, from a source cell, a handover command including an indication to perform a handover to a target cell; identifying a set of occasions for a PUSCH transmission associated with the handover, each of the occasions including a different set of time and frequency resources for transmitting the PUSCH; identifying one or more occasions of the set of occasions for transmitting the PUSCH; and transmitting, to the target cell, a message on the PUSCH via the one or more occasions, the message indicating a completion of the handover to the target cell.

An apparatus for wireless communications at a UE is described. The apparatus may include a processor, memory coupled with the processor, and instructions stored in the memory. The instructions may be executable by the processor to cause the apparatus to receive, from a source cell, a handover command including an indication to perform a handover to a target cell; identify a set of occasions for a PUSCH transmission associated with the handover, each of the occasions including a different set of time and frequency resources for transmitting the PUSCH; identify one or more occasions of the set of occasions for transmitting the PUSCH; and transmit, to the target cell, a message on the PUSCH via the one or more occasions, the message indicating a completion of the handover to the target cell.

Another apparatus for wireless communications at a UE is described. The apparatus may include means for receiving, from a source cell, a handover command including an indication to perform a handover to a target cell; identifying a set of occasions for a PUSCH transmission associated with the handover, each of the occasions including a different set of time and frequency resources for transmitting the PUSCH; identifying one or more occasions of the set of occasions for transmitting the PUSCH; and transmitting, to the target cell, a message on the PUSCH via the one or more occasions, the message indicating a completion of the handover to the target cell.

A non-transitory computer-readable medium storing code for wireless communications at a UE is described. The code may include instructions executable by a processor to receive, from a source cell, a handover command including an indication to perform a handover to a target cell; identify a set of occasions for a PUSCH transmission associated with the handover, each of the occasions including a different set of time and frequency resources for transmitting the PUSCH; identify one or more occasions of the set of occasions for transmitting the PUSCH; and transmit, to the target cell, a message on the PUSCH via the one or more occasions, the message indicating a completion of the handover to the target cell.

In some examples of the method, apparatuses, and non-transitory computer-readable medium described herein, identifying the one or more occasions of the set of occasions further may include operations, features, means, or instructions for identifying a beamforming correspondence between downlink resources transmitted by the target cell and the one or more occasions.

Some examples of the method, apparatuses, and non-transitory computer-readable medium described herein may further include operations, features, means, or instructions for receiving an indication of the beamforming correspondence between the downlink resources and the one or more occasions.

Some examples of the method, apparatuses, and non-transitory computer-readable medium described herein may further include operations, features, means, or instructions for receiving, from the target cell, one or more sets of the downlink resources, selecting at least one set of downlink resources of the one or more sets of the downlink resources based on a RSRP measurement of the one or more sets of the downlink resources, identifying a receive beam for receiving the selected at least one set of downlink resources, and transmitting, to the target cell, the message on the PUSCH on a transmit beam based on the identified receive beam.

In some examples of the method, apparatuses, and non-transitory computer-readable medium described herein, the identified one or more occasions of the set of occasions may be based on the selected at least one set of downlink resources.

In some examples of the method, apparatuses, and non-transitory computer-readable medium described herein, the beamforming correspondence includes a correspondence between one set of downlink resources and one occasion, a correspondence between one set of downlink resources and multiple occasions, a correspondence between multiple sets of downlink resources and one occasion, or a combination thereof.

In some examples of the method, apparatuses, and non-transitory computer-readable medium described herein, the downlink resources include SS/PBCH blocks, CSI-RSs, or a combination thereof.

Some examples of the method, apparatuses, and non-transitory computer-readable medium described herein may further include operations, features, means, or instructions for receiving an indication of a number of SS/PBCH blocks that may be transmitted by the target cell, and identifying the one or more occasions of the set of occasions based on the number of SS/PBCH blocks.

In some examples of the method, apparatuses, and non-transitory computer-readable medium described herein, the indication of the number of SS/PBCH blocks may be received via a system information block (SIB), radio resource control (RRC) signaling, or a combination thereof.

Some examples of the method, apparatuses, and non-transitory computer-readable medium described herein may further include operations, features, means, or instructions for receiving the CSI-RSs based on a CSI-RS based radio resource management (RRM) procedure.

Some examples of the method, apparatuses, and non-transitory computer-readable medium described herein may further include operations, features, means, or instructions for transmitting the message on the PUSCH via the one or more occasions based on beam sweeping the PUSCH over multiple occasions of the one or more occasions.

Some examples of the method, apparatuses, and non-transitory computer-readable medium described herein may further include operations, features, means, or instructions for determining a timing reference of the one or more occasions based on a boundary of a radio frame by which the UE may be allowed to perform the handover, a boundary of a radio frame or a boundary of a half radio frame where downlink resources may be detected from the target cell, a timing of a physical RACH (PRACH) occasion at the target cell, or a combination thereof.

Some examples of the method, apparatuses, and non-transitory computer-readable medium described herein may further include operations, features, means, or instructions for receiving, in the handover command, a system frame number (SFN) of the radio frame by which the UE may be allowed to perform the handover.

Some examples of the method, apparatuses, and non-transitory computer-readable medium described herein may further include operations, features, means, or instructions for determining a frequency reference of the one or more occasions based on a reference frequency for uplink and downlink transmissions, a RACH occasion frequency reference, a configured frequency reference received in the handover command, or a combination thereof.

In some examples of the method, apparatuses, and non-transitory computer-readable medium described herein, the reference frequency for uplink and downlink transmissions may be based on information received in a master information block (MIB), PBCH, or a combination thereof for a standalone deployment of the UE.

In some examples of the method, apparatuses, and non-transitory computer-readable medium described herein, the reference frequency for uplink and downlink transmissions may be based on a network configuration that indicates the reference frequency for a non-standalone deployment of the UE.

In some examples of the method, apparatuses, and non-transitory computer-readable medium described herein, the set of occasions overlaps one or more RACH occasions in time, frequency, or a combination thereof.

In some examples of the method, apparatuses, and non-transitory computer-readable medium described herein, the set of occasions may be FDMed, TDMed, or a combination thereof.

In some examples of the method, apparatuses, and non-transitory computer-readable medium described herein, one or more timing gaps between the set of occasions may be the same or may be different between consecutive occasions in a time domain.

In some examples of the method, apparatuses, and non-transitory computer-readable medium described herein, the handover does not include use of a RACH during the handover.

A method of wireless communications at a base station is described. The method may include receiving an indication of a handover procedure to handover a UE from a source cell to a target cell; determining a set of occasions for a PUSCH transmission associated with the handover and by the UE, each of the occasions including a different set of time and frequency resources for the UE to transmit the PUSCH; transmitting, to the UE, a first message including an uplink grant indicating downlink resources corresponding to one or more occasions of the set of occasions for transmitting the PUSCH; and receiving, from the UE, a second message on the PUSCH via the one or more occasions, the second message indicating a completion of the handover procedure.

An apparatus for wireless communications at a base station is described. The apparatus may include a processor, memory coupled with the processor, and instructions stored in the memory. The instructions may be executable by the processor to cause the apparatus to receive an indication of a handover procedure to handover a UE from a source cell to a target cell; determine a set of occasions for a PUSCH transmission associated with the handover and by the UE, each of the occasions including a different set of time and frequency resources for the UE to transmit the PUSCH; transmit, to the UE, a first message including an uplink grant indicating downlink resources corresponding to one or more occasions of the set of occasions for transmitting the PUSCH; and receive, from the UE, a second message on the PUSCH via the one or more occasions, the second message indicating a completion of the handover procedure.

Another apparatus for wireless communications at a base station is described. The apparatus may include means for receiving an indication of a handover procedure to handover a UE from a source cell to a target cell; determining a set of occasions for a PUSCH transmission associated with the handover and by the UE, each of the occasions including a different set of time and frequency resources for the UE to transmit the PUSCH; transmitting, to the UE, a first message including an uplink grant indicating downlink resources corresponding to one or more occasions of the set of occasions for transmitting the PUSCH; and receiving, from the UE, a second message on the PUSCH via the one or more occasions, the second message indicating a completion of the handover procedure.

A non-transitory computer-readable medium storing code for wireless communications at a base station is described. The code may include instructions executable by a processor to receive an indication of a handover procedure to handover a UE from a source cell to a target cell; determine a set of occasions for a PUSCH transmission associated with the handover and by the UE, each of the occasions including a different set of time and frequency resources for the UE to transmit the PUSCH; transmit, to the UE, a first message including an uplink grant indicating downlink resources corresponding to one or more occasions of the PUSCH; and receive, from the UE, a second message on the PUSCH via the one or more occasions, the second message indicating a completion of the handover procedure.

Some examples of the method, apparatuses, and non-transitory computer-readable medium described herein may further include operations, features, means, or instructions for transmitting an indication of a beamforming correspondence between the downlink resources and the one or more occasions.

In some examples of the method, apparatuses, and non-transitory computer-readable medium described herein, the indication includes a correspondence between one set of downlink resources and one occasion, a correspondence between one set of downlink resources and multiple occasions, a correspondence between multiple sets of downlink resources and one occasion, or a combination thereof.

Some examples of the method, apparatuses, and non-transitory computer-readable medium described herein may further include operations, features, means, or instructions for transmitting, to the UE, one or more sets of the downlink resources on one or more transmit beams, and receiving, from the UE, the second message on the PUSCH on a receive beam based on the one or more transmit beams.

In some examples of the method, apparatuses, and non-transitory computer-readable medium described herein, the downlink resources include SS/PBCH blocks, CSI-RSs, or a combination thereof.

Some examples of the method, apparatuses, and non-transitory computer-readable medium described herein may further include operations, features, means, or instructions for transmitting an indication of a number of SS/PBCH blocks that may be transmitted by the target cell, where the one or more occasions of the set of occasions may be based on the number of SS/PBCH blocks.

Some examples of the method, apparatuses, and non-transitory computer-readable medium described herein may further include operations, features, means, or instructions for transmitting the indication of the number of SS/PBCH blocks via a SIB, RRC signaling, or a combination thereof.

Some examples of the method, apparatuses, and non-transitory computer-readable medium described herein may further include operations, features, means, or instructions for transmitting the CSI-RSs based on a CSI-RS based RRM procedure.

In some examples of the method, apparatuses, and non-transitory computer-readable medium described herein, the set of occasions overlaps one or more RACH occasions in time, frequency, or a combination thereof.

In some examples of the method, apparatuses, and non-transitory computer-readable medium described herein, the set of occasions may be FDMed, TDMed, or a combination thereof.

In some examples of the method, apparatuses, and non-transitory computer-readable medium described herein, one or more timing gaps between the set of occasions may be the same or may be different between consecutive occasions in a time domain.

In some examples of the method, apparatuses, and non-transitory computer-readable medium described herein, the handover does not include use of a RACH during the handover.

DETAILED DESCRIPTION

Figure 1:
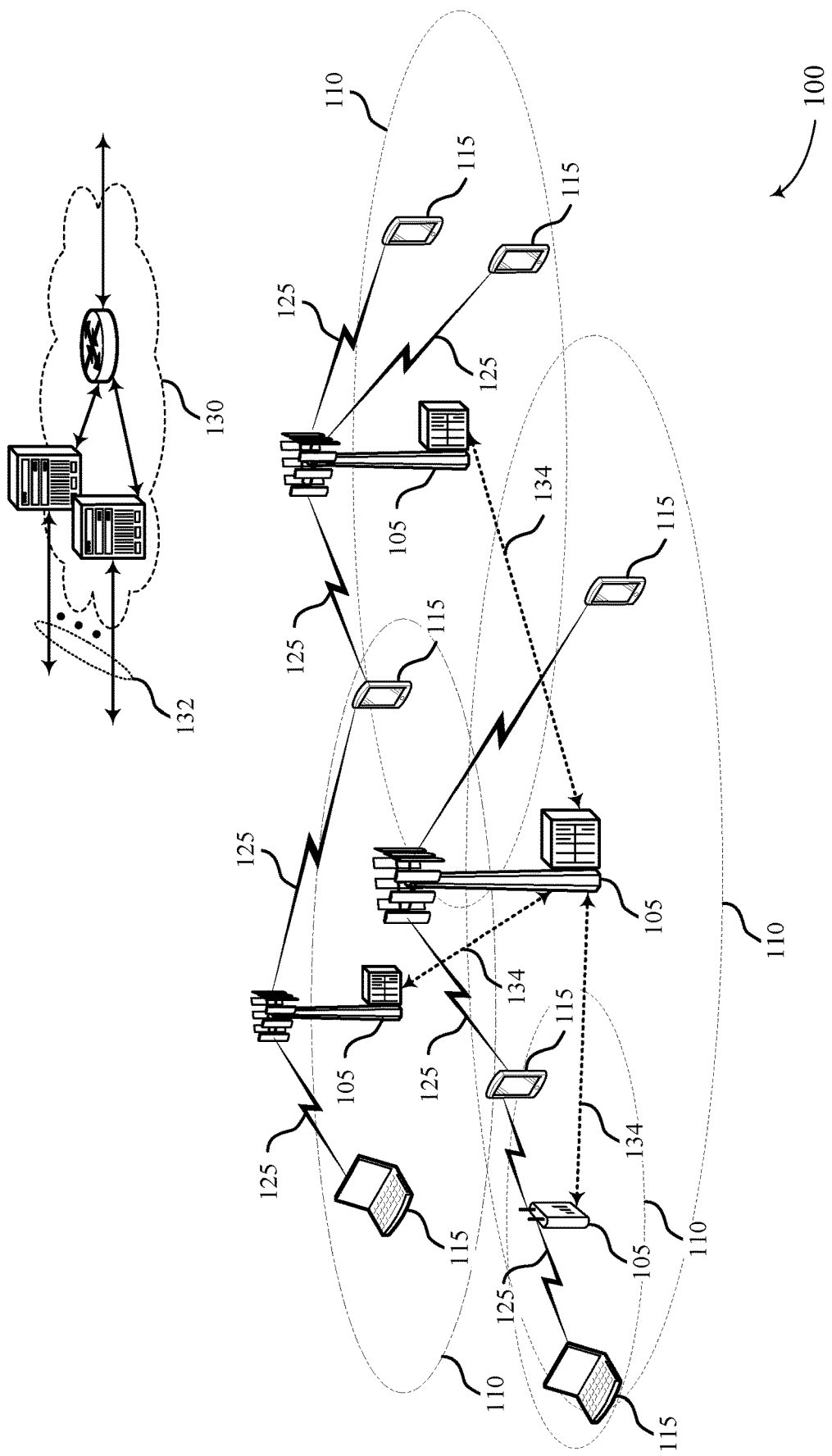
FIG. 1 illustrates an example of a wireless communications system that supports physical uplink shared channel (PUSCH) configurations and occasions for handover procedures in accordance with aspects of the present disclosure.

In some wireless networks, a source cell (e.g., a source base station) and a user equipment (UE) may perform a handover procedure to transfer the UE to a target cell (e.g., a target base station). For example, the UE may transmit a measurement report based on an event trigger (e.g., a signal strength of a neighboring cell satisfies a threshold), and the source cell may use the measurement report to determine whether to handover the UE (e.g., due to decreased radio link quality, UE mobility, or other conditions). After determining to handover the UE, the source cell may initiate a handover procedure for the UE with the target cell (e.g., initiate handover preparation procedures) and may send a handover command to the UE to notify the UE of the handover. The UE may acquire synchronization and system information from the target cell, and in some cases, the UE may perform a random access channel (RACH) procedure that includes a series of handshake messages between the UE and the target cell. Upon completion of the RACH procedure with the target cell, the UE may send a handover completion message (e.g., a radio resource control (RRC) reconfiguration complete message) via a physical uplink shared channel (PUSCH) to the target cell.

Alternatively, the UE and the target cell may perform a handover procedure that excludes the RACH procedure (e.g., a RACH-less handover procedure), which may reduce overall latency of the handover procedure. For instance, RACH-less handover procedures may eliminate the multiple handshake messages between the UE and target base station as part of the RACH procedure, thereby decreasing the amount of time before the UE resumes communications with the target cell. As a result, the UE may transmit the handover completion message via PUSCH to the target cell upon completion of the RACH-less handover.

Some wireless networks (e.g., Long Term Evolution (LTE) networks) may use a same waveform type and a same numerology for all communications. As such, an indication of a configuration for PUSCH carrying the handover completion message may not be provided to the UE. However, other networks (e.g., new radio (NR) networks) may utilize different waveforms and flexible numerologies for wireless communications. For instance, an NR network may support multiple PUSCH waveforms, multiple PUSCH numerologies, and multiple modulation schemes (e.g., for a demodulation reference signal (DMRS) associated with the PUSCH). As a result of the various communications parameters supported by such networks, an indication of the PUSCH configuration for transmitting the handover completion message may ensure the UE utilizes communications parameters that enable efficient communications with the target base station after completing the RACH-less handover.

In accordance with aspects of the present disclosure, various techniques may provide for the indication of an uplink configuration for a PUSCH used to transmit a handover completion message. For example, a UE may identify a waveform configuration used to transmit the handover completion message via the PUSCH. In some examples, the UE may use a same PUSCH waveform as a waveform specified for a message (e.g., Msg3) in a four-step RACH procedure (e.g., indicated in system information), or may use a PUSCH waveform type indicated in an uplink grant corresponding to the handover completion message. As described herein, an uplink grant may be transmitted within a handover command from a source cell or within a downlink transmission from a target cell. In some examples, the UE may use a same waveform type as a PUSCH waveform transmitted in an active uplink bandwidth part (BWP) of the source cell. The UE may also identify a numerology (e.g., a subcarrier spacing and a cyclic prefix length) for transmission of the handover completion message. In some examples, the UE may use a same numerology as specified for a message (e.g., Msg3) in a four-step RACH procedure (e.g., indicated in system information), or may use a numerology indicated in an uplink grant corresponding to the handover completion message. In other examples, the UE may use a same numerology as a PUSCH numerology corresponding to an active uplink BWP of the source cell. Additionally or alternatively, the numerology of the PUSCH and the numerology of an active uplink BWP of the target cell may be the same.

In some aspects, a system may support a default PUSCH configuration, which may be used based on whether a configuration is indicated by a cell. For instance, as described herein, a UE may utilize the PUSCH waveform configuration and/or PUSCH numerology configuration when the configuration is indicated by an uplink grant. However, in cases where the configuration for the PUSCH is not indicated via the uplink grant, the PUSCH waveform used may be same as the waveform type used for transmitting PUSCH in Msg3 in the four-step RACH procedure and signaled via system information (e.g., system information block 1 (SIB1)). In other examples, when the configuration is not included in the uplink grant, the PUSCH waveform may be the same as the PUSCH waveform transmitted in an active BWP of the source and/or target cell. Likewise, in cases where the PUSCH numerology configuration is not indicated by the uplink grant, the UE may select a same numerology as specified for Msg3 in the four-step RACH procedure or may select a PUSCH numerology corresponding to an active uplink BWP of the source cell and/or the target cell. Accordingly, a particular configuration may be selected as a default configuration, which may be used in cases where the PUSCH configuration is not indicated by a cell, thereby ensuring that the UE is able to identify a configuration when transmitting the handover completion message.

In some cases, the UE may also identify a modulation scheme (e.g., a binary phase shift keying (BPSK) DMRS modulation scheme) to use for transmitting the handover completion message via the PUSCH. For example, the UE may use a version of BPSK DMRS modulation corresponding to the DMRS for the PUSCH that carries the handover completion message, where the BPSK version may be indicated in an uplink grant (e.g., received from the target or source cell). In some cases, a bit in the uplink grant may be reserved (e.g., not used) if certain BPSK DMRS modulations are not configured for the UE and/or the target cell. Additionally, if the uplink grant is transmitted via the handover command from the source cell, the target cell may indicate its BPSK DMRS modulation capabilities to the source cell as part of the handover preparation communications. In some cases, a UE may use similar methods to identify a modulation scheme for a payload associated with message A (MsgA) of a two-step RACH procedure.

In some cases, the RACH procedure may have provided a convenient opportunity (e.g., occasion) for the UE to complete the handover procedure (e.g., via the handover complete message at the end of the RACH procedure). With the elimination of the of the RACH procedure, techniques may be desired to define occasions where the UE is able to transmit the handover completion message via a PUSCH indicating the completion of the RACH-less handover procedure.

As described herein, a UE may identify one or more PUSCH occasions to transmit a message via a PUSCH that completes the handover procedure (e.g., RACH-less handover procedure) from a source base station (e.g., a source cell) to a target base station (e.g., a target cell). For example, the target base station may determine a set of PUSCH occasions that are available for transmitting the PUSCH, where each of the set of PUSCH occasions includes a different set of time-frequency resources. The target base station may then transmit a first message of the handover procedure that indicates which PUSCH occasions of the set of PUSCH occasions the UE can use for the PUSCH transmission (e.g., in addition to the synchronization and system information from the target cell). Subsequently, the UE may identify and use one of the PUSCH occasions to transmit a second message via the PUSCH that indicates the handover procedure is complete. Additionally, the PUSCH occasions may be frequency division multiplexed (FDMed), time division multiplexed (TDMed), or a combination thereof, where the PUSCH occasions are multiplexed in frequency first and then in time. In some cases, the PUSCH occasions may enable multi-beam support at the UE, where each of the PUSCH occasions correspond to a separate beam that the UE can use for transmitting the handover complete message.

Accordingly, the UE may identify these PUSCH occasions for the PUSCH transmission based on downlink resources (e.g., sets of downlink resources) in the first message that correspond to the PUSCH occasions. In some cases, the downlink resources may include synchronization signal (SS)/physical broadcast channel (PBCH) blocks, channel state information reference signals (CSI-RSs), or a combination thereof, that correspond to different PUSCH occasions. For example, each set of downlink resources (e.g., SS/PBCH blocks, CSI-RSs, etc.) may correspond to a single PUSCH occasion, each set of downlink resources may correspond to multiple PUSCH occasions, multiple sets of downlink resources may correspond to a single PUSCH occasion, or a combination thereof. In some cases, the UE may identify a beamforming correspondence (e.g., an association) between the downlink resources and the PUSCH occasions that the UE can use for the PUSCH transmission. That is, the UE may receive one or more sets of downlink resources from the target base station, select at least one set of the downlink resources (e.g., based on a reference signal received power (RSRP) measurement of all of the downlink resources), identify a receive beam used to receive the selected set(s) of downlink resources, and transmit the second message via the PUSCH on a transmit beam that corresponds to the identified receive beam. Additionally or alternatively, if the UE does not support beamforming correspondence, the UE may transmit the second message via the PUSCH based on a beam-sweeping procedure over the set of PUSCH occasions. In some cases, the UE may determine a timing reference and a frequency reference for the PUSCH occasions (e.g., based on radio frame boundaries, occasions configured for RACH messages, reference frequencies).

Aspects of the disclosure are initially described in the context of wireless communications systems. Additionally, aspects of the disclosure are illustrated through an additional wireless communications system and a PUSCH occasion configuration. Aspects of the disclosure are further illustrated by and described with reference to a method flow, process flows, apparatus diagrams, system diagrams, and flowcharts that relate to PUSCH configurations and occasions for handover procedures (e.g., RACH-less handover procedures).

FIG. 1 illustrates an example of a wireless communications system 100 that supports PUSCH configurations and occasions for RACH-less handover procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low-cost or low-complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM.

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may employ different modulation schemes for different types of transmissions. For example, wireless communications system 100 may employ a BPSK modulation scheme, such as $\pi/2$ BPSK, for DMRS or data transmissions. Additionally, modulation schemes such as π/2 BPSK may have different versions or schemes for modulation. For example, a π/2 BPSK DMRS modulation may correspond to a first version of π/2 BPSK (e.g., frequency-domain-based π/2 BPSK) or to a second version of π/2 BPSK (e.g., time-domain-based π/2 BPSK). For instance, the first version of π/2 BPSK may be based on a Zadoff-Chu sequence generated in the frequency domain, whereas the second version of π/2 BPSK may be based on sequences generated in the time domain, which may include Gold sequences and computer-generated sequences (e.g., based on a DMRS sequence length/size). In some cases, wireless devices (e.g., UEs 115 and base stations 105) may have different capabilities corresponding to the available modulation schemes employed by wireless communications system 100. In some examples, some base stations 105 or UEs 115 may be able to support one type or version of a modulation scheme (e.g., frequency-domain based π/2 BPSK DMRS modulation) and not another type of modulation scheme (e.g., time-domain-based π/2 BPSK DMRS modulation), which may also correspond to different versions of a wireless communications standard.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS, SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical hybrid ARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1, and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including: downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading an MIB (either a new version or a copy), the UE 115 may try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, it may transmit a RACH preamble (e.g., a message 1 (Msg1)) to a base station 105. For example, the RACH preamble may be randomly selected from a set of 64 predetermined sequences. This random selection may enable the base station 105 to distinguish between multiple UEs 115 trying to access the system simultaneously. The base station 105 may respond with a random access response (e.g., a second message (Msg2)) that provides an uplink resource grant, a timing advance, and a temporary C-RNTI. The UE 115 may then transmit an RRC connection request (e.g., a third message (Msg3)) along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange). The base station 105 may respond to the connection request with a contention resolution message (e.g., a fourth message (Msg4)) addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) it may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure.

In wireless communications system 100, a source cell (e.g., a source base station 105) and a UE 115 may perform a handover procedure to transfer the UE to a target cell (e.g., a target base station 105). It is to be understood that such procedures may occur between cells or between base stations 105, and that any procedure discussed herein that applies to base stations 105 may also apply to cells. The source base station 105 may initiate a handover procedure (e.g., a RACH-less handover) for the UE 115 with the target base station 105 (e.g., initiate handover preparation procedures) and may send a handover command to the UE 115 to notify the UE 115 of the handover. The UE 115 may also acquire synchronization information from the target base station 105 and may send a handover completion message (e.g., an RRC reconfiguration complete message) via a PUSCH to the target base station 105 (e.g., as part of the RACH-less handover).

In order to reduce handover procedure latency and improve uplink communication quality, a UE 115 may employ methods to identify a PUSCH configuration for the handover completion message. For example, the UE 115 may determine a PUSCH waveform, a PUSCH numerology, and a modulation scheme (e.g., a BPSK DMRS modulation version) for transmitting the handover completion message. In some cases, however, when the RACH procedure is eliminated from the handover procedure, the UE 115 may not know how to transmit the handover completion message via the PUSCH (e.g., what time and frequency resources to transmit the PUSCH on, a beam to use for transmitting the PUSCH, etc.).

Wireless communications system 100 may support efficient techniques for determining occasions for a UE 115 to transmit a handover completion message via a PUSCH (e.g., PUSCH occasions) to a target base station 105. For example, the target base station 105 may determine a set of PUSCH occasions that are available for transmitting the PUSCH, where each of the set of PUSCH occasions includes a different set of time-frequency resources, and then transmit a first message of the handover procedure that indicates which PUSCH occasions of the set of PUSCH occasions the UE 115 can use for the PUSCH transmission. In some cases, the UE 115 may identify these PUSCH occasions for the PUSCH transmission based on downlink resources in the first message that correspond to the PUSCH occasions. For example, the UE 115 may identify a beamforming correspondence (e.g., association) between the downlink resources and the PUSCH occasions that the UE can use for the PUSCH transmission. In some cases, the downlink resources may include SS/PBCH blocks, CSI-RSs, or a combination thereof. Additionally or alternatively, if the UE 115 does not support beamforming correspondence, the UE 115 may transmit the PUSCH based on a beam-sweeping procedure over the set of PUSCH occasions. In some cases, the PUSCH occasions may also support multi-beam communications between the UE 115 and target base station 105.

In some cases, the UE 115 may identify a waveform used to transmit the handover completion message. In some examples, the UE 115 may use a same waveform as a waveform specified for Msg3 of a four-step RACH procedure, or may use a waveform indicated in an uplink grant corresponding to the handover completion message. In some examples, the UE 115 may use a same waveform as a PUSCH waveform transmitted in an active uplink BWP of the source base station 105. The UE 115 may also identify a numerology (e.g., a subcarrier spacing and a cyclic prefix length) for transmission of the handover completion message. In some examples, the UE 115 may use a same numerology as specified for Msg3 of a four-step RACH procedure, or may use a numerology indicated in an uplink grant for the handover completion message. In other examples, the UE 115 may use a same numerology as a PUSCH numerology transmitted in an active uplink BWP of the source base station 105 or an active BWP of the target base station 105. Additionally, the UE 115 may identify a modulation scheme (e.g., a $\pi/2$ BPSK DMRS modulation version) to use for transmitting the handover completion message. For example, the UE 115 may use a $\pi/2$ BPSK DMRS modulation version specified in an uplink grant corresponding to the handover completion message. The UE 115 may also use similar methods to identify a modulation scheme for the payload associated with MsgA of two-step RACH.

Figure 2:
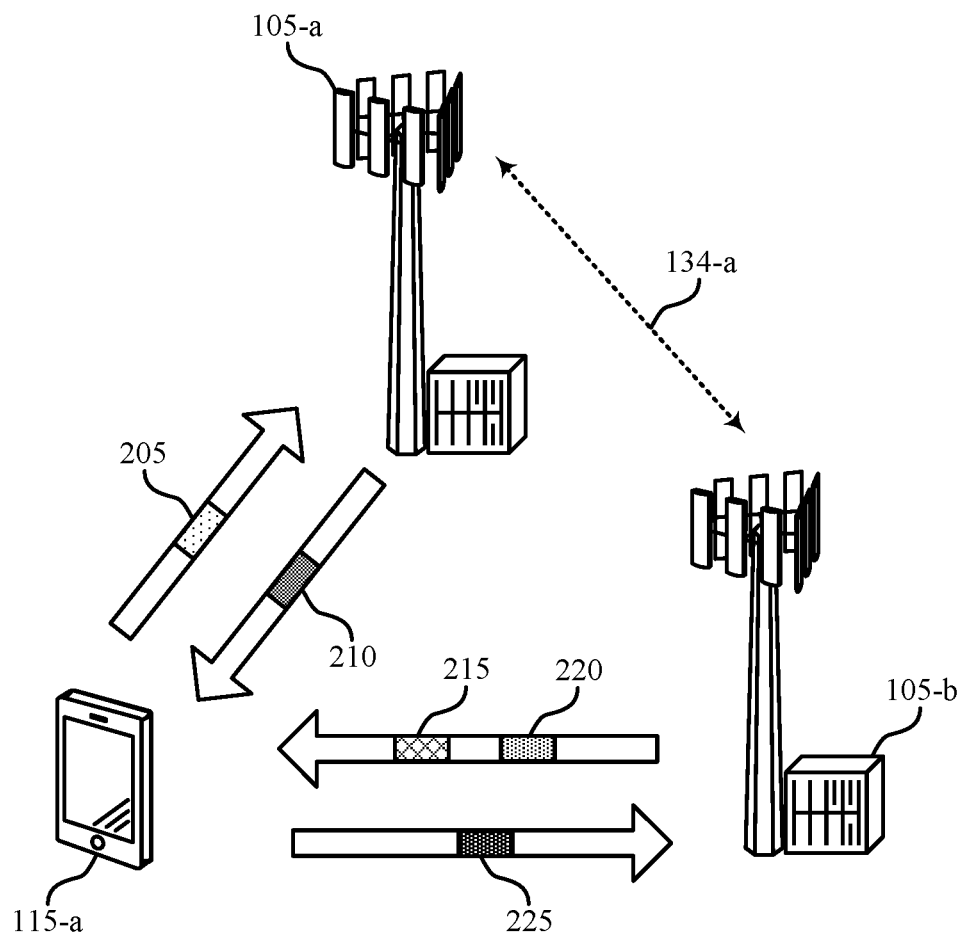
FIG. 2 illustrates an example of a wireless communications system that supports PUSCH configurations and occasions for handover procedures in accordance with aspects of the present disclosure.

FIG. 2 illustrates an example of a wireless communications system 200 that supports PUSCH configurations and occasions for RACH-less handover procedures in accordance with aspects of the present disclosure. In some examples, wireless communications system 200 may implement aspects of wireless communications system 100 and may include a UE 115-a and base stations 105-a and 105-b, which may be examples of a UE 115 and base stations 105 described with reference to FIG. 1. In some cases, base stations 105-a and 105-b may perform a handover procedure with respect to UE 115-a, such as a RACH-less handover (e.g., a handover without a RACH procedure). It is to be understood that such procedures may occur between cells, and that any procedure discussed herein that applies to base stations 105 may also apply to cells.

In some cases, a source base station 105 (e.g., a source cell) may determine to perform a handover procedure for a UE 115 in communication with the source base station 105. For example, the source base station 105 may request a measurement report (e.g., measurements based on received SSBs, channel state information reference signals (CSI-RSs)) from the UE 115 and may use the measurement report to determine to perform the handover procedure. The source base station 105 may determine to handover the UE 115 to a target base station 105 (e.g., a target cell) based on the measurement report from the UE 115 and may initiate the handover procedure with the target base station 105 (e.g., via a backhaul link). The source base station 105 may send a handover command (e.g., via an RRC reconfiguration message) to the UE 115 to notify the UE 115 of the handover. Accordingly, the UE 115 may acquire synchronization information (e.g., SIB1, remaining minimum system information (RMSI)) from the target base station 105. In some cases, the UE 115 may perform a RACH procedure with the target base station 105 to determine a timing advance (e.g., contained in message 2 (Msg2) of a four-step RACH procedure) and request transmission resources (e.g., uplink and/or downlink transmission resources). Additionally, the UE 115 may send a handover completion message (e.g., an RRC configuration complete message) to the target base station 105 via assigned uplink transmission resources (e.g., via a PUSCH).

In some cases, the UE 115 and the target base station 105 may not perform a RACH procedure as part of a handover (e.g., in a RACH-less handover). For example, the UE 115 and the target base station 105 may refrain from performing a RACH procedure in order to meet mobility enhancement objectives and reduce handover procedure latency. Although the UE 115 may send the handover completion message (e.g., via a PUSCH) to the target base station 105 as part of the RACH-less handover, some networks may not be configured to specify an uplink configuration (e.g., waveform, numerology, modulation scheme, etc.) for the handover completion message. For instance, some networks may not use different waveforms or numerologies (e.g., a waveform type and/or numerologies for transmissions may be fixed), and thus an indication of a particular configuration for PUSCH transmissions may not be needed. However, other systems may support multiple PUSCH configurations, and the UE may thus need to identify the PUSCH configuration used by a target base station when transmitting the handover completion message via PUSCH. Additionally or alternatively, with the elimination of the of the RACH procedure, techniques may be desired to define occasions where UE 115-a is able to transmit the handover completion message via a PUSCH indicating the completion of the RACH-less handover procedure.

To reduce handover latency and improve communications efficiency, a UE 115 may employ techniques for determining an uplink configuration (e.g., PUSCH configuration) for the handover completion message. Further, the UE 115 may operate under a variable timing advance when completing RACH-less handover (e.g., due to the lack of a timing advance command from the target base station 105, which may be sent in a RACH procedure). Accordingly, a UE 115, such as UE 115-a, may determine an uplink waveform (e.g., PUSCH waveform), an uplink numerology (e.g., PUSCH numerology), and an uplink modulation scheme (e.g., a π/2 BPSK DMRS modulation version) for transmitting the handover completion message.

In some cases, UE 115-a may be in communication with base station 105-a (e.g., via uplink and/or downlink transmissions), where base station 105-a may be referred to as a source base station 105-a. Source base station 105-a may determine to perform a handover procedure for UE 115-a, based on a triggering event (e.g., the movement of UE 115-a, a change in communication quality). For example, base station 105-a may request a measurement report 205 from UE 115-a, and base station 105-a may base the handover procedure on information included in measurement report 205. In some cases, UE 115-a may send measurement report 205 (e.g., based on SSB, CSI-RS) to base station 105-a, and base station 105-a may determine to hand over UE 115-a to target base station 105-b based on measurement report 205. As discussed above, base station 105-a may communicate with base station 105-b (e.g., via backhaul link 134-a, which may be an example of an X2 interface) to begin handover preparation procedures. Base station 105-a may also send a handover command 210 (e.g., via an RRC reconfiguration message) to UE 115-a to notify UE 115-a of the handover. To complete the handover, UE 115-a may acquire synchronization information 215 (e.g., SIB1, RMSI, or the like) from base station 105-b and may send a handover completion message 225 (e.g., RRC reconfiguration complete message) to base station 105-b.

In some cases, UE 115-a may identify uplink configuration parameters for a PUSCH used to transmit handover completion message 225. For example, UE 115-a may identify a waveform used to transmit handover completion message 225 via the PUSCH, such as a DFT-S-OFDM or CP-OFDM waveform. In some examples, UE 115-a may use a same waveform type as a waveform type specified for Msg3 of a four-step RACH procedure, as indicated by a field in synchronization information 215 (e.g., SIB1) received from base station 105-b. In some examples, UE 115-a may use a waveform type indicated in an uplink grant for handover completion message 225, where the uplink grant may be obtained via handover command 210 from base station 105-a or via a downlink message 220 (e.g., over a physical downlink control channel (PDCCH)) from base station 105-b (e.g., if not provided in the handover command). In other examples, UE 115-a may use a same waveform type as a PUSCH waveform corresponding to an active uplink BWP of base station 105-a, where the active uplink BWP may be used by UE 115-a for communications with base station 105-a.

UE 115-a may also identify a numerology for transmission of handover completion message 225 via the PUSCH to base station 105-b, where the numerology may include a subcarrier spacing and a cyclic prefix length. For example, subcarrier spacings of 15 kHz, 30 kHz, 60 kHz, etc., may exist for transmissions in frequency range 1 (FR1) (e.g., below 6 GHz), and UE 115-a may identify a subcarrier spacing and corresponding cyclic prefix length to use for transmission of handover completion message 225. In some examples, UE 115-a may use a same numerology as specified for Msg3 of a four-step RACH procedure, as indicated in synchronization information 215 (e.g., an MIB) from base station 105-b. In some cases, the numerology for Msg3 may also be equivalent to the numerology of the initial uplink BWP for base station 105-b. In some examples, UE 115-a may use a numerology indicated in an uplink grant for handover completion message 225, where the uplink grant may be obtained via handover command 210 from base station 105-a or via a downlink message 220 (e.g., over a PDCCH) from base station 105-b (e.g., if not provided in the handover command). In some cases, the numerology indicated in the uplink grant may be the same as or different from the numerology of an active uplink BWP of base station 105-a. In other examples, UE 115-a may use a same numerology as a PUSCH numerology corresponding to an active uplink BWP of base station 105-a, where the active uplink BWP may be used by UE 115-a for communications with base station 105-a.

In some cases, a default configuration may be utilized to ensure UE 115-a is able to identify a configuration to use for the transmission of PUSCH. For instance, there may be cases where the PUSCH configuration may not be indicated via the uplink grant, or UE 115-a may not detect the PUSCH configuration in the uplink grant. As a result, UE 115-a may determine that the configuration is not included in a received grant (e.g., from either base station 105-a or base station 105-b), and UE 115-a may select a configuration for the PUSCH (e.g., including the RRC reconfiguration complete message) using the default configuration. Accordingly, a network may configure the default configuration for the PUSCH configuration to be used by UEs 115 within wireless communications system 200. Additionally or alternatively, the default configuration for the PUSCH configuration may be predetermined.

As an illustrative example, in cases where the configuration for the PUSCH is not indicated via the uplink grant (or when UE 115-a determines that the configuration is not detected within the uplink grant), the PUSCH waveform used may be same as the waveform type used for transmitting PUSCH in Msg3 in the four-step RACH procedure and signaled via system information (e.g., SIB1). In other examples, when the configuration is not included in the uplink grant, the PUSCH waveform may be the same as the PUSCH waveform transmitted in an active BWP of base station 105-a and/or base station 105-b. Likewise, in cases where the PUSCH numerology configuration is not indicated by the uplink grant (or not detected), UE 115-*a* may select a same numerology as specified for Msg3 in the four-step RACH procedure or may select a PUSCH numerology corresponding to an active uplink BWP of base station 105-*a* and/or base station 105-*b*. As such, regardless of whether the uplink grant includes the PUSCH configuration (e.g., including the configuration of a waveform, numerology, and/or modulation scheme for PUSCH), UE 115-*a* may have information regarding at least one PUSCH configuration that may be used when transmitting handover completion message 225.

As described herein, wireless devices such as base station 105-*b* and UE 115-*a* may support different modulation schemes. For example, base station 105-*b* and UE 115-*a* may support one or more versions of π/2 BPSK DMRS modulation (e.g., frequency-domain-based π/2 BPSK DMRS or time-domain-based π/2 BPSK DMRS). In some cases, π/2 BPSK DMRS modulation may enable UE 115-*a* to operate under a variable timing advance error because π/2 BPSK DMRS may be less sensitive to timing advance errors. UE 115-*a* may identify a modulation scheme to use for transmitting handover completion message 225 over the PUSCH. UE 115-*a* may use a modulation scheme (e.g., a version of π/2 BPSK DMRS) indicated by one bit in an uplink grant for handover completion message 225, where the uplink grant may be included in handover command 210 from base station 105-*a* or may be included in a downlink message 220 (e.g., over a PDCCH) from base station 105-*b*. In some cases, the bit in the uplink grant may be reserved (e.g., not used) if one or more types of modulation (e.g., π/2 BPSK DMRS modulation versions) are not supported by UE 115-*a* or base station 105-*b*. If the uplink grant is transmitted via handover command 210 from base station 105-*a*, base station 105-*b* may indicate its modulation capabilities to base station 105-*a* as a part of the handover preparation communications via backhaul link 134-*a* (e.g., via X2). In some examples, UE 115-*a* may use similar methods to identify a modulation scheme for a payload associated with MsgA of a two-step RACH procedure.

In some cases, UE 115-*a* may identify a set of PUSCH occasions over which the PUSCH may be transmitted. Each PUSCH occasion may include respective time-frequency resources for transmitting the PUSCH. Additionally, the set of PUSCH occasions may enable a multi-beam system for UE 115-*a* in wireless communications system 200 (e.g., one PUSCH occasion may correspond to one transmit beam for UE 115-*a*). In some cases, the PUSCH occasions may overlap (e.g., in time and/or frequency) with occasions designated for a RACH procedure. For example, the occasions for the RACH procedure (e.g., RACH occasions) may be used for physical RACH (PRACH) resources that UE 115-*a* may use for transmitting a first message of the RACH procedure (e.g., a Msg1 of a 4-step RACH procedure, a MsgA of a 2-step RACH procedure). While the RACH occasions may not be used by UE 115-*a* based on the RACH-less handover, UE 115-*a* may need to be aware of which PUSCH occasions overlap with RACH occasions to reduce the chance of collisions or signal interference with other UEs 115 in the system. Additionally, in conventional or legacy systems, multiple PUSCH occasions (and/or RACH occasions) may not be needed for the respective communications based on UE 115-*a* supporting a single beam at a time.

The set of PUSCH occasions may be FDMed, TDMed, or a combination thereof. For example, the PUSCH occasions may be multiplexed in frequency across a first TTI (e.g., a slot) and then in time across the same frequency (or set of frequencies). When the set of PUSCH occasions are TDMed across multiple TTIs, a timing gap between consecutive TDMed PUSCH occasions may be the same or different, where the same or different timing gaps are known to UE 115-*a*. For example, a first timing gap may be used between a first TTI and a second TTI that each include one or more separate PUSCH occasions, and a second timing gap may be used between the second TTI and a third TTI, where the second timing gap may be the same as or may be different from the first timing gap. Additionally, UE 115-*a* may determine a timing reference and a frequency reference for the PUSCH occasions (e.g., based on radio frame boundaries, RACH occasions, reference frequencies).

In some cases, UE 115-*a* may determine or identify a subset of PUSCH occasions from the set of PUSCH occasions to use for the transmission of handover completion message 225 on a corresponding PUSCH based on one or more downlink resources 220 that target base station 105-*b* transmits to UE 115-*a*. For example, the total set of PUSCH occasions may include a first number of PUSCH occasions (e.g., up to 64 total PUSCH occasions), but a second number of PUSCH occasions may be available for UE 115-*a* to use for transmitting the PUSCH carrying handover completion message 225. Accordingly, UE 115-*a* may identify this second number of PUSCH occasions for the PUSCH transmission based on a beamforming correspondence (e.g., association) between downlink resources 220 and the set of PUSCH occasions (e.g., each set of downlink resources 220 may correspond to one or more transmit beams or PUSCH occasions). For example, each set of downlink resources 220 may correspond to a single PUSCH occasion, each set of downlink resources 220 may correspond to multiple PUSCH occasions, multiple sets of downlink resources 220 may correspond to a single PUSCH occasion (e.g., for frequencies below six (6) GHz), or a combination thereof. In some cases, target base station 105-*b* may signal this beamforming correspondence to UE 115-*a*. Downlink resources 220 may include SS/PBCH blocks and/or CSI-RSs (e.g., when CSI-RS based radio resource management (RRM) is supported).

If UE 115-*a* supports beamforming correspondence between downlink resources 220 and the PUSCH occasions, UE 115-*a* may receive one or more sets of downlink resources 220 from target base station 105-*b*, select at least one set of downlink resources 220 (e.g., based on an RSRP measurement of all of downlink resources 220 to determine a strongest or second strongest beam carrying the corresponding downlink resources 220), identify a receive beam used to receive the selected set(s) of downlink resources 220, and transmit handover completion message 225 via the PUSCH on a transmit beam that corresponds to the identified receive beam. Accordingly, based on the selected set of downlink resources 220, UE 115-*a* may determine which PUSCH occasion to use for transmitting the PUSCH. Additionally or alternatively, if UE 115-*a* does not support beamforming correspondence, UE 115-*a* may transmit handover completion message 225 via the PUSCH based on a beam-sweeping procedure over the set of PUSCH occasions.

After UE 115-*a* transmits handover completion message 225 on the PUSCH of one of the identified PUSCH occasions, UE 115-*a* and target base station 105-*b* may begin communications with each other.

Figure 3:
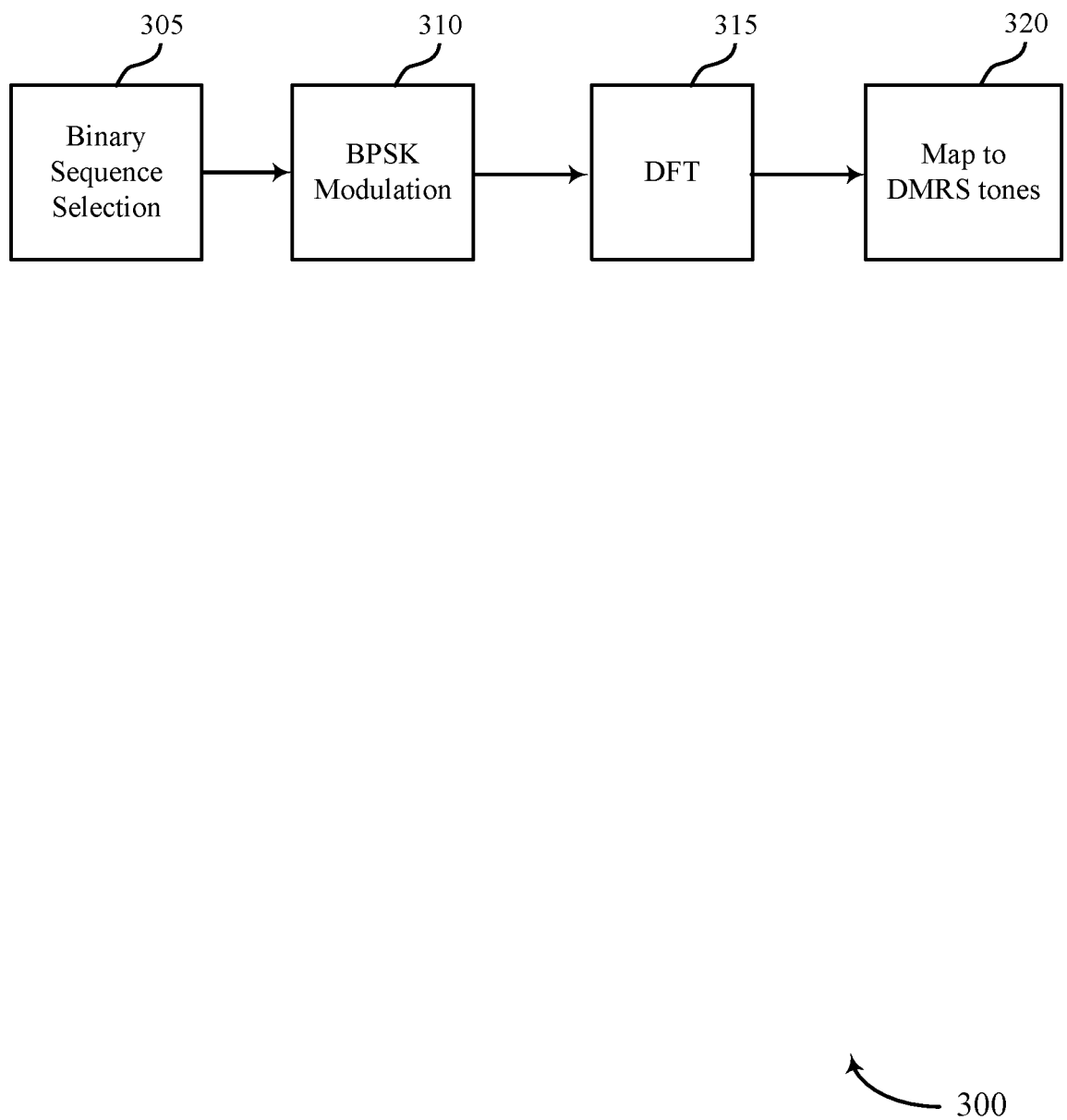
FIG. 3 illustrates an example of a method flow that supports PUSCH configurations and occasions for handover procedures in accordance with aspects of the present disclosure.

FIG. 3 illustrates an example of a method flow 300 that supports PUSCH configurations and occasions for RACH-less handover procedures in accordance with aspects of the present disclosure. In some examples, method flow 300 may implement aspects of wireless communications systems 100 and/or 200 and may be performed by a UE 115, which may be an example of a UE 115 described with reference to FIGS. 1 and 2. In some cases, the UE 115 may implement method flow 300 when transmitting DMRS associated with a handover completion message as part of a handover procedure (e.g., a RACH-less handover) with one or more base stations 105 (e.g., or one or more cells). In some cases, the UE 115 may also implement method flow 300 when transmitting DMRS associated with MsgA of a two-step RACH procedure.

At 305, the UE 115 may generate a binary sequence for the DMRS associated with the handover completion message (e.g., a DMRS associated with PUSCH carrying the RRC reconfiguration complete message). In some cases, the binary sequence may depend on a DMRS modulation scheme (e.g., $\pi/2$ BPSK DMRS modulation version) used by the UE 115, where the modulation scheme may be indicated via an uplink resource grant for the handover completion message (e.g., prior to 305). For example, the modulation scheme may be $\pi/2$ BPSK DMRS modulation and the modulation version may be based on the capabilities of the UE 115. It is noted that, while a specific example given herein may discuss $\pi/2$ BPSK DMRS modulation, the example may apply to any modulation scheme.

In some cases, the capabilities of UE 115 may be signaled via UE capability reporting, and may further be signaled by one bit within the capability report. In some examples, one RRC parameter (e.g., in an RRC reconfiguration message such as the handover command) may be used to configure the UE 115 with the version of $\pi/2$ BPSK DMRS modulation to use for the handover completion message (e.g., frequency-domain-based $\pi/2$ BPSK or time-domain-based $\pi/2$ BPSK). In some cases, the version of $\pi/2$ BPSK DMRS modulation may be based on the capabilities of a target base station 105 (e.g., as reported over a backhaul link). Accordingly, the $\pi/2$ BPSK DMRS modulation version may be based on the capabilities of both the UE 115 and the target base station 105. If either the target base station 105 or the UE 115 is incapable of one version of $\pi/2$ BPSK DMRS modulation, the other version may be selected. Similarly, if either the target base station 105 or the UE 115 is incapable of $\pi/2$ BPSK DMRS modulation, the modulation process may take place according to another scheme.

In some examples, if the UE 115 is configured to transmit DMRS using frequency-domain-based $\pi/2$ BPSK, the DMRS sequence may be based on a Zadoff Chu sequence generated in the frequency domain. A frequency-domain-based $\pi/2$ BPSK DMRS modulation scheme may have a high peak to average power ratio (PAPR) (e.g., relatively higher than data modulated using $\pi/2$ BPSK). If the UE 115 is configured to transmit DMRS using time-domain-based $\pi/2$ BPSK, the DMRS sequence may be based on sequences generated in the time domain. For example, a DMRS sequence less than or equal to 30 may use a Gold sequence, such as output from a Gold sequence generator used for CP-OFDM, and a DMRS sequence greater than 30 may use a computer generated sequence. In some cases, time-domain-based $\pi/2$ BPSK DMRS modulation may have a lower PAPR when compared with a frequency-domain-based $\pi/2$ BPSK DMRS modulation, and a lower PAPR may enable relatively larger cell coverage. Further, $\pi/2$ BPSK DMRS modulation (e.g., frequency-domain-based or time-domain-based) may be less sensitive to timing advance errors, which may enable the UE 115 to more accurately send the handover completion message in a RACH-less handover (e.g., because the timing advance was not established during a RACH procedure).

At 310, the UE 115 may modulate the selected sequence using an identified modulation scheme (e.g., a version of $\pi/2$ BPSK DMRS modulation). At 315, the UE 115 may perform a discrete Fourier transform (DFT) on the modulated sequence. At 320, the UE 115 may map the modulated and transformed sequence to the appropriate DMRS tones for transmission (e.g., for a transmission corresponding to the handover completion message). Thus, as described herein, a UE 115 may employ various techniques for determining an uplink configuration (e.g., PUSCH configuration) for the handover completion message, where the $\pi/2$ BPSK DMRS may be a configuration used for the handover completion message in accordance with one or more aspects of method flow 300.

Figure 4:
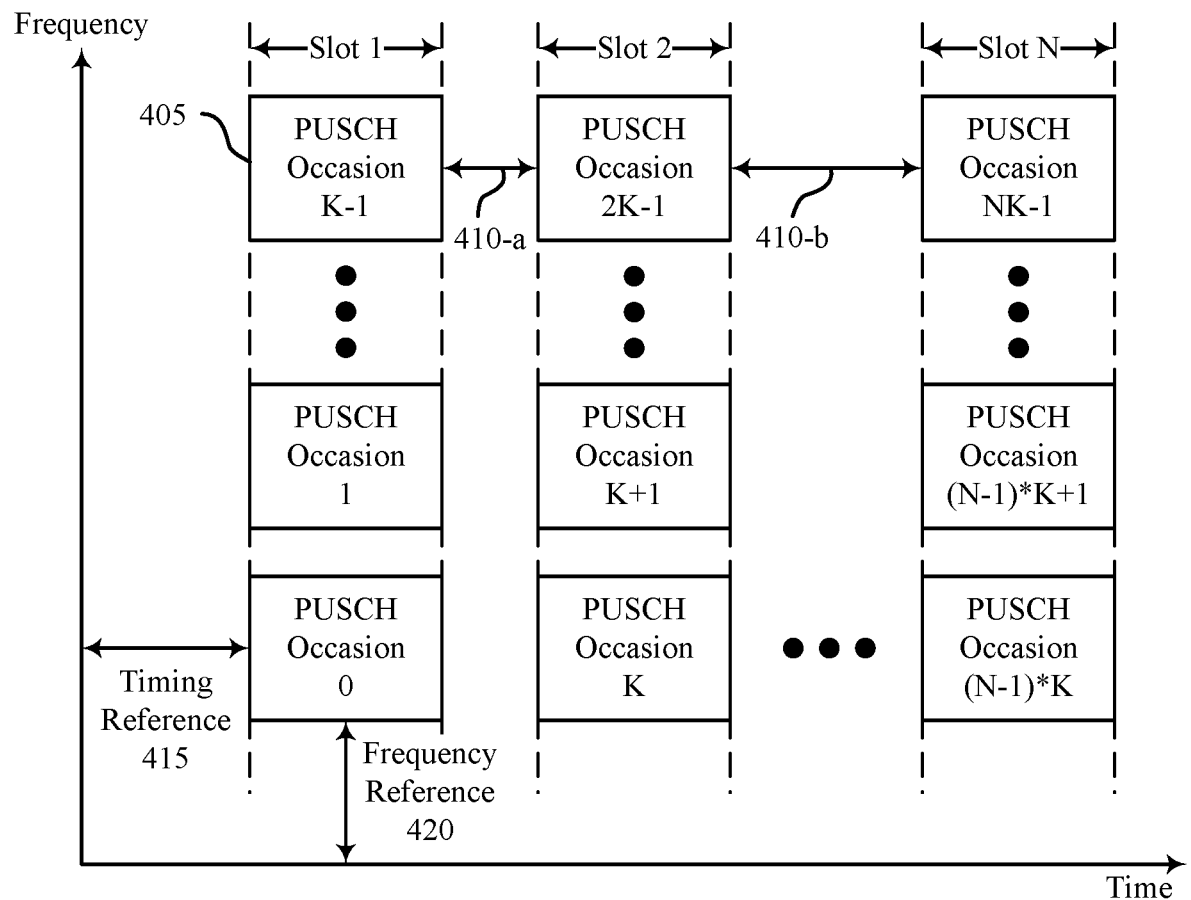
FIG. 4 illustrates an example of a PUSCH occasion configuration that supports PUSCH configurations and occasions for handover procedures in accordance with aspects of the present disclosure.

FIG. 4 illustrates an example of a PUSCH occasion configuration 400 that supports PUSCH configurations and occasions for RACH-less handover procedures in accordance with aspects of the present disclosure. In some examples, PUSCH occasion configuration 400 may implement aspects of wireless communications systems 100 and/or 200. PUSCH occasion configuration 400 may include a set of PUSCH occasions 405 that a UE 115 may use for transmitting a PUSCH (e.g., carrying a handover completion message as described above) as part of a handover procedure from a source base station 105 to a target base station 105 without performing a RACH procedure (e.g., a RACH-less handover procedure). It is to be understood that such procedures may occur between cells, and that any procedure discussed herein that applies to base stations 105 may also apply to cells.

As described above with reference to FIG. 2, the PUSCH occasions 405 may be FDMed, TDMed, or a combination thereof. For example, the PUSCH occasions 405 may be first multiplexed in frequency, where PUSCH occasions 0, 1, and up to K−1 are first multiplexed across the frequencies of a first slot (e.g., slot one (1)). Then, the PUSCH occasions 405 may be multiplexed in time, where PUSCH occasions K, K+1, and up to 2*K−1 are multiplexed in a second slot (e.g., slot two (2)) consecutively after the first slot. The multiplexing in time (e.g., TDM) may continue up to an n-th slot (e.g., slot N) that include PUSCH occasions (N−1)*K, (N−1)*K+1, and up to N*K−1. Additionally, as also described above with reference to FIG. 2, a time gap 410 may occur between consecutive TDMed PUSCH occasions 405. For example, a first time gap 410-*a* may occur between the first slot and the second slot, while a second time gap 410-*b* may occur between the second slot and the n-th slot (e.g., assuming the second slot and the n-th slot are consecutively occurring), where the first time gap 410-*a* and the second time gap 410-*b* may be the same or different. While slots are shown with reference to FIG. 4 for the time domain, it is to be understood that any TTI length (e.g., symbol period, slot, sub-slot, or the like) may be used for the PUSCH occasion multiplexing.

Additionally, one or more of the PUSCH occasions 405 may overlap (e.g., in time and/or frequency) with one or more RACH occasions configured by the target base station 105. For example, PUSCH occasions 0, 1, K, K+1, (N−1)*K, and (N−1)*K+1 may be used as RACH occasions for other UEs 115 in communication with the target base station 105. As such, the target base station 105 may indicate which PUSCH occasions 405 overlap existing RACH occasions to the UE 115 to enable the UE 115 from refraining from using those PUSCH occasions for a corresponding PUSCH transmission.

In some cases, the UE 115 may also determine a timing reference 415 and a frequency reference 420 for the PUSCH occasions 405. For example, the UE 115 may determine timing reference 415 based on a boundary of a radio frame where the UE 115 may start the handover procedure from the source base station 105 to the target base station 105. In this example, the radio frame may be a radio frame after the UE 115 acquires synchronization information from the target base station 105 (e.g., time/frequency synchronization, SIB1, RMSI). In some cases, the target base station 105 may signal a system frame number (SFN) of this radio frame to the UE 115 (e.g., as part of a handover command message, RRC reconfiguration message). Additionally or alternatively, the UE 115 may determine timing reference 415 based on a boundary of a radio frame or a boundary of a half frame where downlink resources (e.g., SS/PBCH blocks) are detected from the target base station 105. In some aspects, the UE 115 may determine timing reference 415 based on a timing of RACH occasions (or PRACH occasions) at the target base station 105. Accordingly, in some cases, the UE 115 may determine timing reference 415 for the first slot of PUSCH occasions and then determine the timings of the subsequent slots based on the time gaps 410 (e.g., that are known to the UE 115 based on configuration information from the target base station 105 and/or configured by the network).

Additionally, the UE 115 may determine frequency reference 420 based on a reference frequency for uplink transmissions. For example, the reference frequency may be a reference frequency for both uplink and downlink transmissions (e.g., point A frequency) based on information from the target base station 105 or from the network. In some cases, the UE 115 may determine the reference frequency based on information in a MIB or PBCH in standalone deployments (e.g., the UE 115 operates in one radio access technology (RAT), where a primary cell (PCell) operates in the one RAT, such as NR). Additionally or alternatively, the network may configure the reference frequency location for non-standalone deployments (e.g., the UE 115 operates in multiple RATS, where the PCell operates in a first RAT, such as LTE, and a secondary cell (SCell) operates in a second RAT, such as NR). In some aspects, the UE 115 may determine frequency reference 420 based on a RACH occasion frequency reference for the target base station 105. Additionally or alternatively, the UE 115 may determine frequency reference 420 based on configuration information transmitted by the target base station 105 via a handover command message. Accordingly, in some cases, the UE 115 may determine frequency reference 420 for a first PUSCH occasion 405 (e.g., PUSCH occasion 0) and then determine frequency locations for every other PUSCH occasion 405 in relation to the first PUSCH occasion 405.

In some cases, as described above with reference to FIG. 2, the UE 115 may determine the PUSCH occasions 405 that may be used to transmit the handover completion message in a corresponding PUSCH based on downlink resources transmitted by the target base station 105. For example, the downlink resources may include SS/PBCH blocks, and the UE 115 may determine a beam correspondence between the SS/PBCH blocks and the PUSCH occasions 405. Additionally, the number of PUSCH occasions 405 may correspond to a number of transmitted SS/PBCH blocks signaled in a SIB1 or via RRC signaling. For example, the target base station 105 may transmit up to 64 SS/PBCH blocks (e.g., corresponding to 64 beams) that may each correspond to a separate PUSCH occasion 405. However, the target base station 105 may transmit less than the 64 possible SS/PBCH blocks, where the number of SS/PBCH blocks transmitted is signaled to the UE 115 via the SIB1 or RRC signaling (e.g., indicated through a bitmap that indicates which SS/PBCH blocks are transmitted). Accordingly, the number of SS/PBCH blocks transmitted by the target base station 105 may then correspond to the number of PUSCH occasions 405 that the UE 115 may use for the PUSCH transmission.

Additionally or alternatively, the downlink resources may include CSI-RSs, where the CSI-RSs are transmitted by the target base station 105 when the target base station 105 and the UE 115 support a CSI-RS based RRM procedure. Accordingly, the target base station 105 may use these CSI-RSs to indicate the PUSCH occasions 405 that the UE 115 may use for the PUSCH transmission (e.g., through beam correspondence between beams for receiving the CSI-RSs and beams for transmitting the PUSCH on the PUSCH occasions 405).

For both SS/PBCH blocks and CSI-RSs, the UE 115 may identify the number of PUSCH occasions 405 for the PUSCH transmission based on a beamforming correspondence (e.g., association) between the downlink resources (e.g., SS/PBCH blocks, CSI-RSs, etc.) and the PUSCH occasions 405 (e.g., each set of downlink resources may correspond to one or more PUSCH occasions 405 that are each in turn associated with one transmit beam from the UE 115). For example, each set of downlink resources may correspond to a single PUSCH occasion 405, each set of downlink resources may correspond to multiple PUSCH occasions 405, multiple sets of downlink resources may correspond to a single PUSCH occasion 405 (e.g., for frequencies below six (6) GHz), or a combination thereof. In some cases, the target base station 105 may signal this beamforming correspondence to the UE 115.

If the UE 115 supports beamforming correspondence between the downlink resources and the PUSCH occasions 405, the UE 115 may receive one or more sets of the downlink resources from the target base station 105 and select at least one set of the downlink resources. For example, the UE 115 may measure an RSRP (or a different power measurement) of all of the downlink resources to determine a strongest or second strongest beam carrying the corresponding downlink resources and select the downlink resources (and corresponding beam that the downlink resources were received on). Based on the selected downlink resources, the UE 115 may identify the beam (e.g., a receive beam) used to receive the selected set(s) of downlink resources. Subsequently, the UE 115 may transmit a handover completion message via the PUSCH on a transmit beam that corresponds to the identified receive beam in the corresponding PUSCH occasion 405. That is, based on the selected set of downlink resources, the UE 115 may determine which PUSCH occasion 405 (e.g., with the corresponding transmit beam) to use for transmitting the PUSCH. Additionally or alternatively, if the UE 115 does not support beamforming correspondence, the UE 115 may transmit the handover completion message via the PUSCH based on a beam-sweeping procedure over the set of PUSCH occasions 405.

Figure 5:
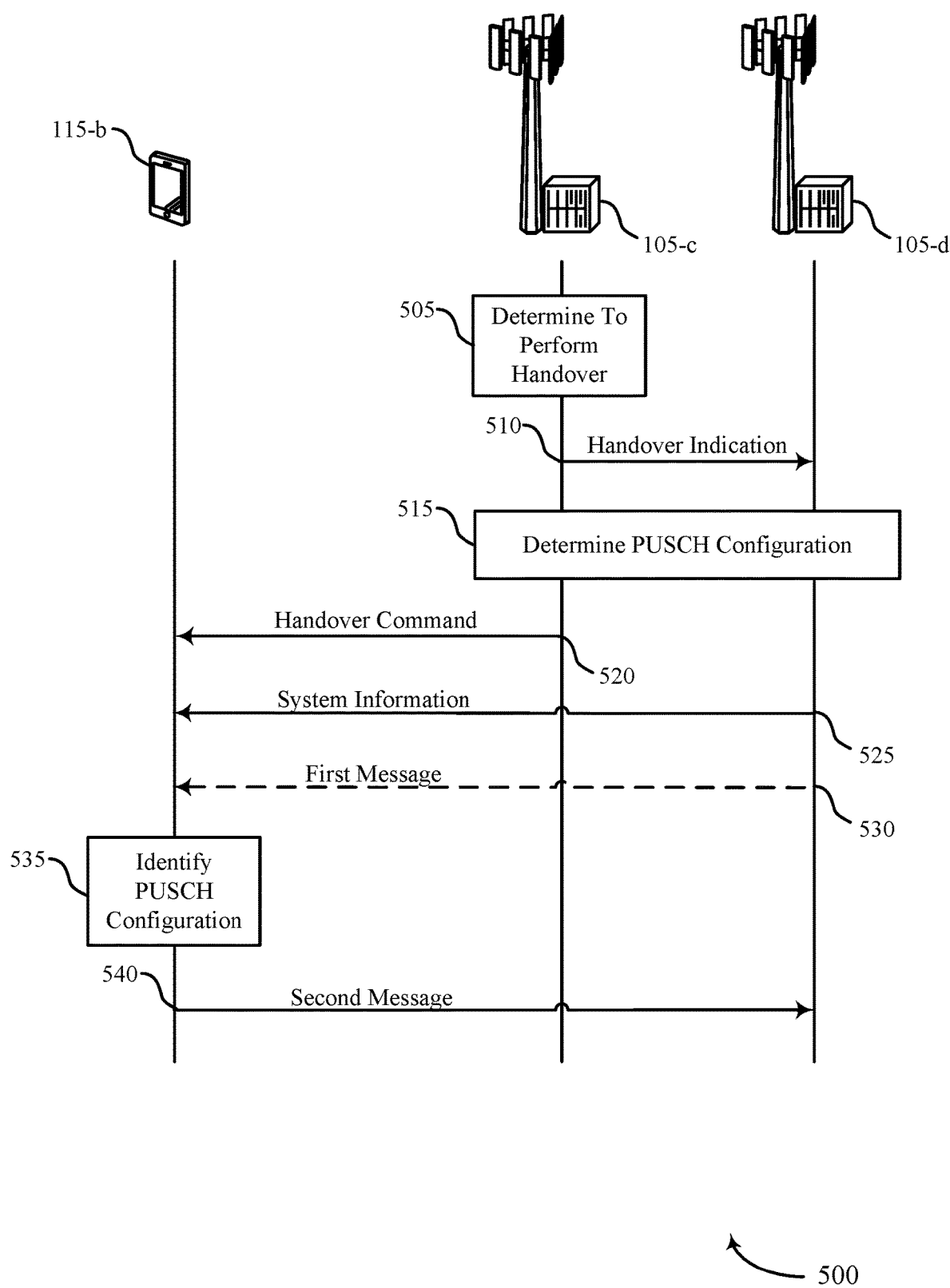
FIGS. 5 and 6 illustrate examples of process flows in a system that support PUSCH configurations and occasions for handover procedures in accordance with aspects of the present disclosure.

FIG. 5 illustrates an example of a process flow 500 in a system that supports PUSCH configurations and occasions for RACH-less handover procedures in accordance with aspects of the present disclosure. In some examples, process flow 500 may implement aspects of wireless communications system 100 and/or 200 and may include a UE 115-*b* and base stations 105-*c* and 105-*d*, which may be examples of a UE 115 and base stations 105 described with reference to FIGS. 1-4. Process flow 500 may also implement aspects of method flow 300. In some cases, base stations 105-*c* and 105-*d* may perform a handover procedure with respect to UE 115-b, such as a RACH-less handover. It is to be understood that such procedures may occur between cells, and that any procedure discussed herein that applies to base stations 105 may also apply to cells.

In the following description of the process flow 500, the operations between UE 115-b and base stations 105-c and 105-d may be transmitted in a different order than the order shown, or the operations performed by base stations 105-c and 105-d and UE 115-b may be performed in different orders or at different times. Certain operations may also be left out of the process flow 500, or other operations may be added to the process flow 500. It is to be understood that while base stations 105-c and 105-d and UE 115-b are shown performing a number of the operations of process flow 500, any wireless device may perform the operations shown.

At 505, a source base station 105-c (e.g., a source cell) may determine to handover UE 115-b from base station 105-c to a target base station 105-d (e.g., a target cell) using a RACH-less handover procedure. For example, base station 105-c may determine to perform the handover based on a triggering event and a measurement report from UE 115-b. In some cases, the measurement report by UE 115-b may be triggered by a signal strength from a neighboring cell (e.g., from base station 105-d) that satisfies a threshold signal strength. In such cases, base station 105-c may base the determination to handover UE 115-c (e.g., to base station 105-d) based on the information within the received measurement report.

At 510, base station 105-c may transmit an indication of the RACH-less handover procedure to base station 105-d (e.g., to handover UE 115-b from base station 105-c to base station 105-d).

At 515, base stations 105-c and 105-d may determine a configuration for a PUSCH based on the determination or the indication of the handover, respectively, the configuration including at least one of a waveform configuration, a numerology configuration, or a modulation scheme configuration. For example, a waveform configuration may be a DFT-S-OFDM waveform or a CP-OFDM waveform, a numerology configuration may include subcarrier spacing and cyclic prefix length, and a modulation scheme may indicate a version (e.g., Rel. 15 or Rel. 16) of a modulation scheme. In some examples, the modulation scheme may include frequency-domain-based $\pi/2$ BPSK for a DMRS associated with the PUSCH or time-domain-based $\pi/2$ BPSK for the DMRS associated with the PUSCH. In some cases, base stations 105-c and 105-d may determine the PUSCH configuration as they communicate handover preparation procedures over one or more backhaul links. In some cases, the PUSCH configuration determination may take place individually at base stations 105-c and 105-d. For example, one or both of base stations 105-c and 105-d may identify a set of waveforms for the PUSCH and may determine the waveform configuration using a waveform from the set of waveforms. Similarly, one or both of base stations 105-c and 105-d may identify a set of numerologies for the PUSCH and may determine the numerology configuration using a numerology from the set of numerologies. Additionally, one or both of base stations 105-c and 105-d may identify a set of modulation schemes for the PUSCH and may determine the modulation scheme configuration using a modulation scheme from the set of modulation schemes.

In some examples, as part of handover preparation procedures between base stations 105-c and 105-c, base station 105-d may determine a capability of base station 105-d to support one or more modulation schemes from the set of modulation schemes and may transmit, to base station 105-c, an indication of the capability. In some cases, the configuration for the PUSCH may be based on the capability of base station 105-d.

At 520, base station 105-c may transmit, to UE 115-b, a handover command including an indication to perform a RACH-less handover to base station 105-d. In some cases, the handover command may include an uplink grant indicating resources for transmitting via the PUSCH to base station 105-d, where the uplink grant may include an indication of the configuration for the PUSCH. In some cases, the handover command may include an RRC reconfiguration message.

At 525, base station 105-d may transmit (e.g., broadcast), to UE 115-b, system information including an indication of a waveform configuration and numerology configuration of an initial uplink BWP of base station 105-d. In some examples, the waveform configuration may be the same as a waveform configuration for RACH Msg3, where the waveform configuration may be indicated in system information. For example, the indication of the waveform configuration may be received within a common field of a common configuration information element (e.g., a field in SIB1). In some examples, the numerology of the initial uplink BWP may be the same as a numerology of RACH Msg3 and may be indicated in system information (e.g., MIB).

At 530, in some examples, base station 105-d may transmit, to UE 115-b, a first message including an uplink grant indicating resources for transmitting via the PUSCH, where the uplink grant may include an indication of the configuration for the PUSCH. In some cases, the first message may include DCI that includes the uplink grant.

At 535, UE 115-b may identify a configuration for the PUSCH based on the handover command or the DCI of base station 105-d, where the configuration may include at least one of a waveform configuration, a numerology configuration, or a modulation scheme configuration.

In some cases, UE 115-b may identify, within the uplink grant, an indication of the waveform configuration and may select a waveform for the PUSCH from a set of waveforms based on the indication of the waveform configuration. In some cases, UE 115-b may identify, within the uplink grant, an indication of the numerology configuration and may select a numerology for the PUSCH from a set of numerologies based on the indication of the numerology configuration. The selected numerology may be the same as a numerology of an active uplink BWP of base station 105-c, or may be different from a numerology of an active uplink BWP of base station 105-c. In some cases, UE 115-b may identify, within the uplink grant, an indication of the modulation scheme configuration and may select a modulation scheme for the PUSCH from a set of modulation schemes based on the indication of the modulation scheme configuration. In some examples, the indication of the modulation scheme configuration may include one or more reserved bits within the uplink grant.

In some other cases, UE 115-b may select a waveform for the PUSCH from a set of waveforms based on the indication of the waveform configuration received within the system information from base station 105-d. For example, if a field (e.g., Msg3-transformPrecoder) in the system information (e.g., SIB1) is enabled, UE 115-b may use a DFT-S-OFDM waveform, and may otherwise use a CP-OFDM waveform. In some cases, UE 115-b may determine a waveform of an active BWP of base station 105-c and may select the waveform of the active BWP for the PUSCH, where the determination to select the waveform based on the BWP may be based on network standards or specifications. In some cases, UE 115-*b* may determine a numerology of an initial uplink BWP of base station 105-*d*, based on the indication of the numerology of the initial uplink BWP received within the system information from base station 105-*d*, and may select the numerology of the initial uplink BWP for the PUSCH. Additionally or alternatively, UE 115-*b* may determine a numerology of an active uplink BWP of a cell provided by base station 105-*c* and may select the numerology of the active uplink BWP for the PUSCH, where the determination to select the numerology based on the active uplink BWP may be based on network standards or specifications.

At 540, UE 115-*b* may transmit, to base station 105-*d*, a second message (e.g., a handover completion message) via the PUSCH and having the identified configuration, where the message may indicate a completion of the RACH-less handover procedure to base station 105-*d*. In some examples, the second message may include an RRC reconfiguration complete message.

Figure 6:
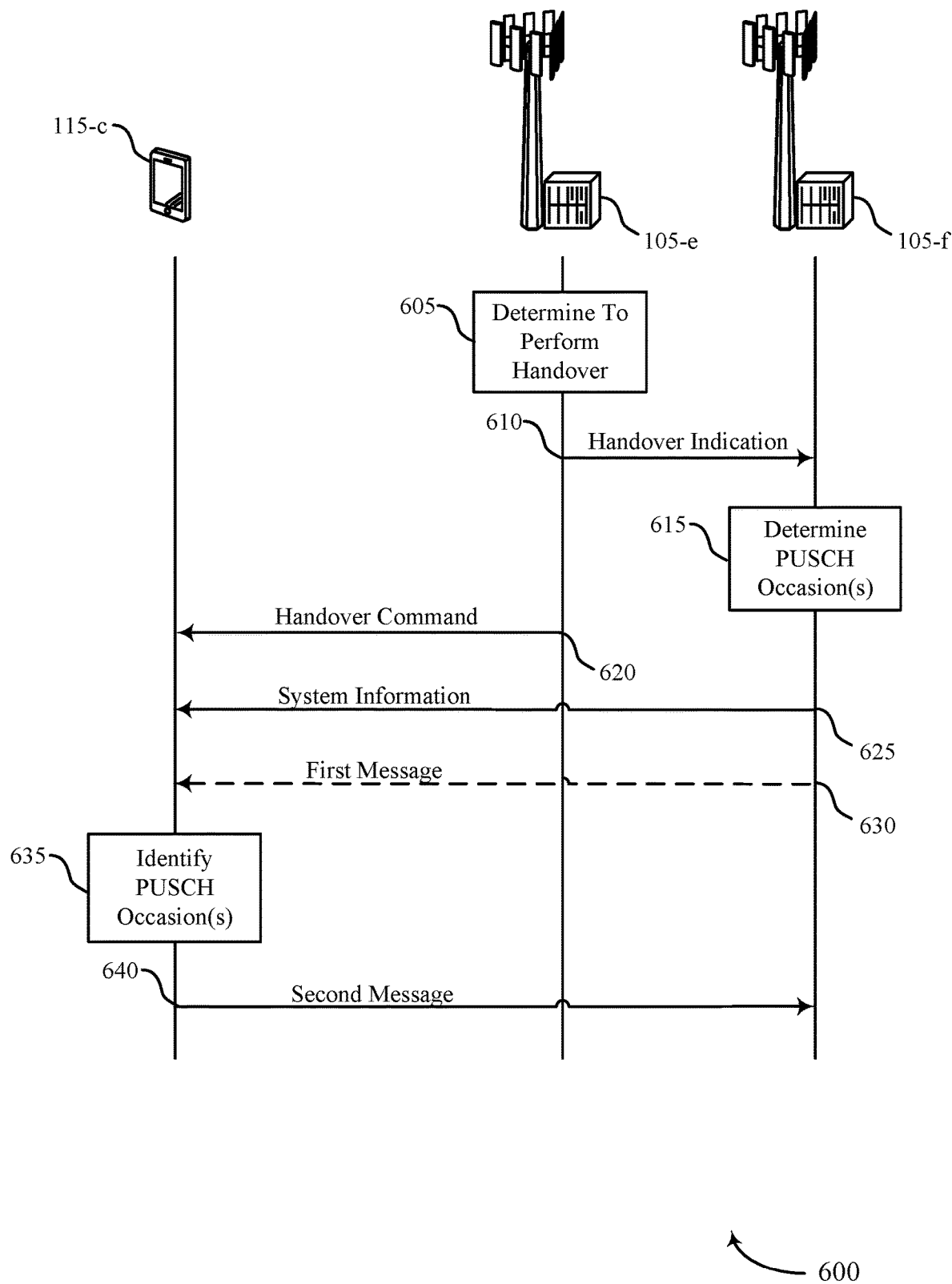

FIG. 6 illustrates an example of a process flow 600 in a system that supports PUSCH configurations and occasions for RACH-less handover procedures in accordance with aspects of the present disclosure. In some examples, process flow 600 may implement aspects of wireless communications systems 100 and/or 200. Process flow 600 may include a UE 115-*c* and base stations 105-*e* and 105-*f*, which may be examples of a UE 115 and base stations 105 described with reference to FIGS. 1-5. In some cases, base stations 105-*e* and 105-*f* may perform a handover procedure with respect to UE 115-*c*, such as a RACH-less handover. It is to be understood that such procedures may occur between cells, and that any procedure discussed herein that applies to base stations 105 may also apply to cells.

In the following description of the process flow 600, the operations between UE 115-*c* and base stations 105-*e* and 105-*f* may be transmitted in a different order than the order shown, or the operations performed by base stations 105-*e* and 105-*f* and UE 115-*c* may be performed in different orders or at different times. Certain operations may also be left out of the process flow 600, or other operations may be added to the process flow 600. It is to be understood that while base stations 105-*e* and 105-*f* and UE 115-*c* are shown performing a number of the operations of process flow 600, any wireless device may perform the operations shown.

At 605, a source base station 105-*e* (e.g., a source cell) may determine to handover UE 115-*c* from base station 105-*e* to a target base station 105-*f* (e.g., a target cell) using a RACH-less handover procedure. For example, base station 105-*e* may determine to perform the handover based on a triggering event and a measurement report from UE 115-*c*. In some cases, the measurement report by UE 115-*c* may be triggered by a signal strength from a neighboring cell (e.g., from base station 105-*f*) that satisfies a threshold signal strength. In such cases, base station 105-*e* may base the determination to handover UE 115-*c* (e.g., to base station 105-*f*) based on the information within the received measurement report.

At 610, base station 105-*e* may transmit an indication of the RACH-less handover procedure to base station 105-*f* (e.g., to handover UE 115-*c* from base station 105-*e* to base station 105-*f*).

At 615, base station 105-*f* may determine a set of occasions (e.g., PUSCH occasions) for a PUSCH transmission associated with the handover and by UE 115-*c*, each of the occasions including a different set of time and frequency resources for UE 115-*c* to transmit the PUSCH. In some cases, the set of occasions may overlap one or more RACH occasions in time, frequency, or a combination thereof. Additionally or alternatively, the set of occasions may be FDMed, TDMed, or a combination thereof. In some cases, one or more timing gaps may also occur between the set of occasions, where the timing gaps may be the same or different between consecutive occasions in a time domain.

At 620, base station 105-*e* may transmit, to UE 115-*c*, a handover command including an indication to perform a RACH-less handover to base station 105-*f*. In some cases, the handover command may include an SFN of a radio frame by which UE 115-*c* is allowed to perform the handover.

At 625, base station 105-*f* may transmit (e.g., broadcast), to UE 115-*c*, system information including the set of occasions that UE 115-*c* may use for the PUSCH transmission. Additionally, the system information may include synchronization information (e.g., via SIB1).

At 630, in some examples, base station 105-*f* may transmit, to UE 115-*c*, a first message including an uplink grant indicating downlink resources corresponding to one or more occasions of the set of occasions for transmitting the PUSCH. Additionally, base station 105-*f* may transmit, to UE 115-*c*, an indication of a beamforming correspondence between the downlink resources and the one or more occasions. In some cases, the indication may include a correspondence between one set of downlink resources and one occasion, a correspondence between one set of downlink resources and multiple occasions, a correspondence between multiple sets of downlink resources and one occasion, or a combination thereof.

In some aspects, the downlink resources may include SS/PBCH blocks, CSI-RSs, or a combination thereof. Accordingly, for the SS/PBCH blocks, base station 105-*f* may transmit an indication of a number of SS/PBCH blocks that are transmitted by base station 105-*f*, where the one or more occasions of the set of occasions are based on the number of SS/PBCH blocks, and base station 105-*f* may transmit this indication of the number of SS/PBCH blocks via a SIB (e.g., SIB1), RRC signaling, or a combination thereof. For the CSI-RSs, base station 105-*f* may transmit the CSI-RSs based on a CSI-RS based RRM procedure.

At 635, UE 115-*c* may identify the set of occasions for the PUSCH transmission associated with the handover and then may identify one or more occasions of the set of occasions for transmitting the PUSCH. For example, UE 115-*c* may identify a beamforming correspondence between downlink resources transmitted by base station 105-*f* and the one or more occasions. In some cases, UE 115-*c* may identify the one or more occasions based on the number of SS/PBCH blocks transmitted by base station 105-*f*.

In some aspects, UE 115-*c* may determine a timing reference of the one or more occasions based on a boundary of the radio frame by which the UE is allowed to perform the handover, a boundary of the radio frame or a boundary of a half radio frame where downlink resources (e.g., SS/PBCH blocks) are detected from base station 105-*f*, a timing of a RACH (or PRACH) occasion at base station 105-*f*, or a combination thereof. Additionally, UE 115-*c* may determine a frequency reference of the one or more occasions based on a reference frequency for uplink and downlink transmissions, a RACH occasion frequency reference, a configured frequency reference received in the handover command at 620, or a combination thereof. In some cases, the reference frequency for uplink and downlink transmissions may be based on information received in a MIB, PBCH, or a combination thereof for a standalone deployment of UE 115-c. Additionally or alternatively, the reference frequency for uplink and downlink transmissions may be based on a network configuration that indicates the reference frequency for a non-standalone deployment of UE 115-c.

At 640, UE 115-c may transmit, to base station 105-f, a second message on the PUSCH via the one or more occasions, the second message indicating a completion of the handover to base station 105-f. In some cases, UE 115-c may receive, from base station 105-f, one or more sets of the downlink resources; select at least one set of downlink resources of the one or more sets of the downlink resources based on an RSRP measurement of the one or more sets of the downlink resources, where the identified one or more occasions of the set of occasions is based on the selected at least one set of downlink resources; identify a receive beam for receiving the selected at least one set of downlink resources; and then transmit, to base station 105-f, the second message on the PUSCH on a transmit beam based on the identified receive beam. Additionally or alternatively, UE 115-c may transmit the second message on the PUSCH via the one or more occasions based on beam sweeping the PUSCH over multiple occasions of the one or more occasions.

Figure 7:
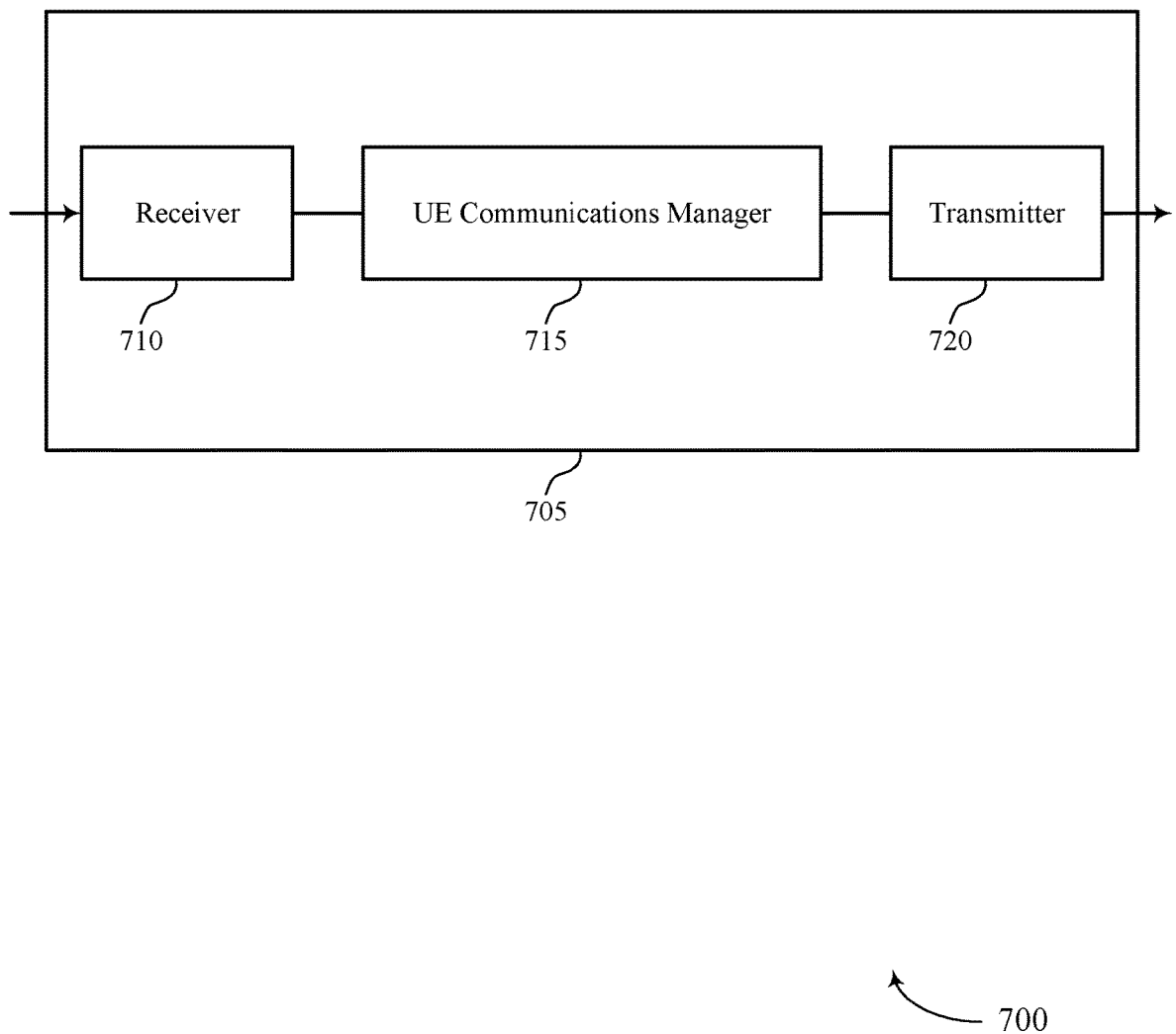
FIGS. 7 through 9 show block diagrams of devices that support PUSCH configurations and occasions for handover procedures in accordance with aspects of the present disclosure.

FIG. 7 shows a block diagram 700 of a device 705 that supports PUSCH configurations and occasions for handover procedures (e.g., RACH-less handover procedures) in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to PUSCH configurations and occasions for handover procedures). Information may be passed on to other components of the device 705. The receiver 710 may be an example of aspects of the transceiver 1220 described with reference to FIG. 12. The receiver 710 may utilize a single antenna or a set of antennas.

The UE communications manager 715 may receive, from a source cell, a handover command including an indication to perform a handover to a target cell. In some cases, the UE communications manager 715 may identify a configuration for a PUSCH based on the handover command or downlink control information of the target cell, the configuration including at least one of a waveform configuration, a numerology configuration, or a modulation scheme configuration. In some cases, the UE communications manager 715 may transmit, to the target cell, a message via the PUSCH having the identified configuration, the message indicating a completion of the handover to the target cell. The UE communications manager 715 may be an example of aspects of the UE communications manager 1210 described herein.

In some examples, the UE communications manager 715 may also receive, from a source cell, a handover command including an indication to perform a handover to a target cell. In some cases, the UE communications manager 715 may identify a set of occasions for a PUSCH transmission associated with the handover, each occasion of the set of occasions including a different set of time and frequency resources for the PUSCH transmission. Additionally, the UE communications manager 715 may identify one or more occasions of the set of occasions for transmitting the PUSCH transmission. In some examples, the UE communications manager 715 may transmit, to the target cell, a message on the PUSCH via the one or more occasions, the message indicating a completion of the handover to the target cell. The UE communications manager 715 may be an example of aspects of the UE communications manager 1210 described herein.

The UE communications manager 715, or its sub-components, may be implemented in hardware, code (e.g., software or firmware) executed by a processor, or any combination thereof. If implemented in code executed by a processor, the functions of the UE communications manager 715 or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the UE communications manager 715 may be implemented as an integrated circuit or chipset for a mobile device modem, and the receiver 710 and transmitter 720 may be implemented as analog components (for example, amplifiers, filters, antennas, etc.) coupled with the mobile device modem to enable wireless transmission and reception.

The UE communications manager 715 as described herein may be implemented to realize one or more potential advantages. Various implementations may reduce latency associated with RACH handover procedures. At least some implementations may enable the UE communications manager 715 to determine an appropriate PUSCH configuration to be used in a handover completion message sent to a target cell. At least some implementations may enable the UE communications manager 715 to identify one or more sets of time-frequency resources (e.g., occasions) for transmitting a PUSCH that completes a handover procedure without performing a RACH procedure.

Based on implementing the latency reduction techniques as described herein, one or more processors of the device 705 (for example, processor(s) controlling or incorporated with one or more of receiver 710, UE communications manager 715, and transmitter 720) may improve communication quality and/or efficiency. For example, a UE and a target base station may perform a RACH-less handover procedure, which may eliminate the multiple handshake messages that occur as part of a RACH procedure. Accordingly, the amount of interruption time before the UE resumes communications with the target cell may be reduced through the identification of a PUSCH configuration and one or more PUSCH transmission occasions.

The transmitter 720 may transmit signals generated by other components of the device 705. In some examples, the transmitter 720 may be collocated with a receiver 710 in a transceiver module. For example, the transmitter 720 may be an example of aspects of the transceiver 1220 described with reference to FIG. 12. The transmitter 720 may utilize a single antenna or a set of antennas.

Figure 8:
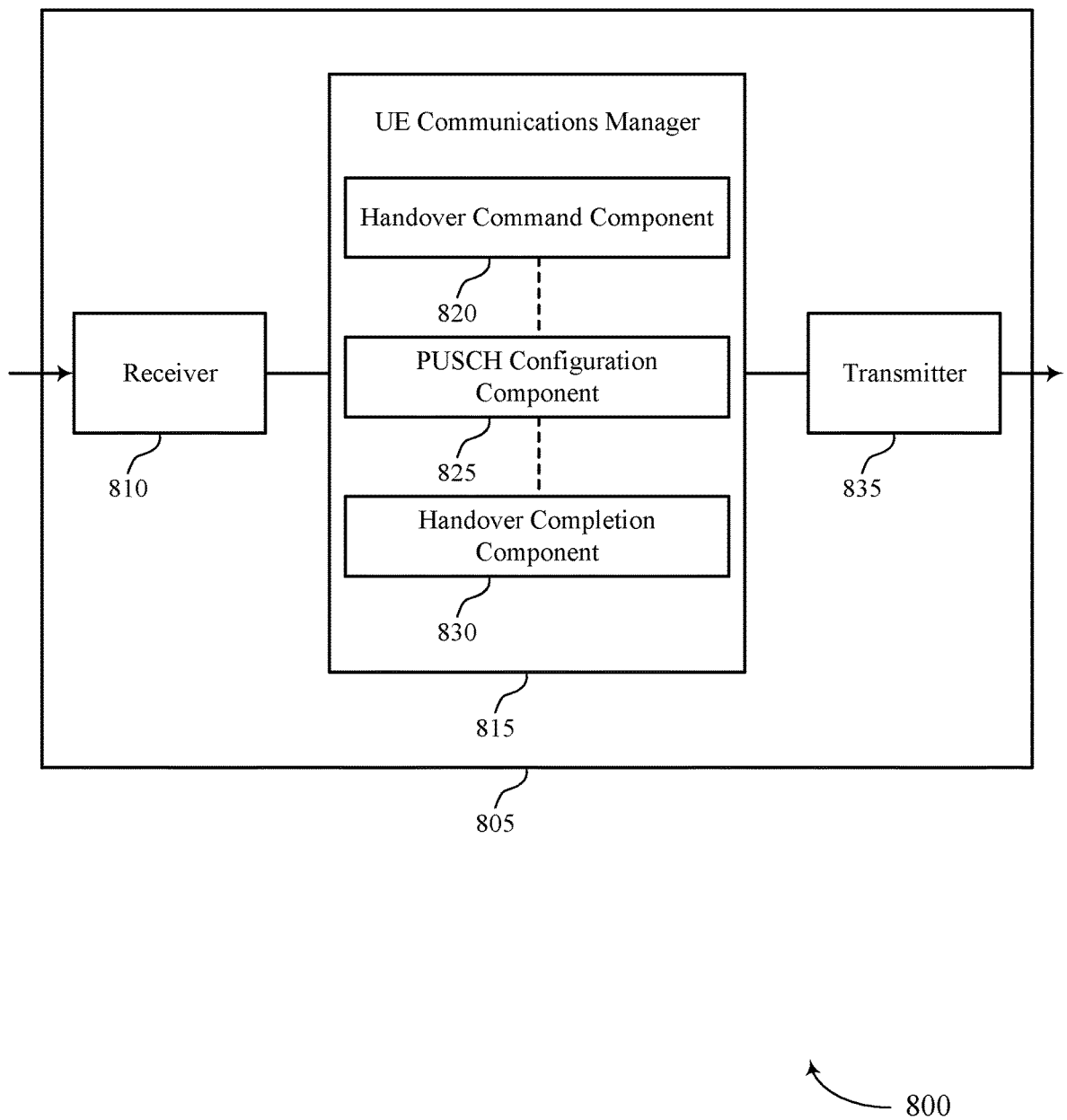

FIG. 8 shows a block diagram 800 of a device 805 that supports PUSCH configurations and occasions for handover procedures in accordance with aspects of the present disclosure. The device 805 may be an example of aspects of a device 705 or a UE 115 as described herein. The device 805 may include a receiver 810, a UE communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to PUSCH configurations and occasions for handover procedures). Information may be passed on to other components of the device 805. The receiver 810 may be an example of aspects of the transceiver 1220 described with reference to FIG. 12. The receiver 810 may utilize a single antenna or a set of antennas.

The UE communications manager 815 may be an example of aspects of the UE communications manager 715 as described herein. The UE communications manager 815 may include a handover command component 820, a PUSCH configuration component 825, and a handover completion component 830. The UE communications manager 815 may be an example of aspects of the UE communications manager 1210 described herein.

The handover command component 820 may receive, from a source cell, a handover command including an indication to perform a handover to a target cell. The PUSCH configuration component 825 may identify a configuration for a PUSCH based on the handover command or downlink control information of the target cell, the configuration including at least one of a waveform configuration, a numerology configuration, or a modulation scheme configuration. The handover completion component 830 may transmit, to the target cell, a message via the PUSCH having the identified configuration, the message indicating a completion of the handover to the target cell.

The transmitter 835 may transmit signals generated by other components of the device 805. In some examples, the transmitter 835 may be collocated with a receiver 810 in a transceiver module. For example, the transmitter 835 may be an example of aspects of the transceiver 1220 described with reference to FIG. 12. The transmitter 835 may utilize a single antenna or a set of antennas.

Figure 9:
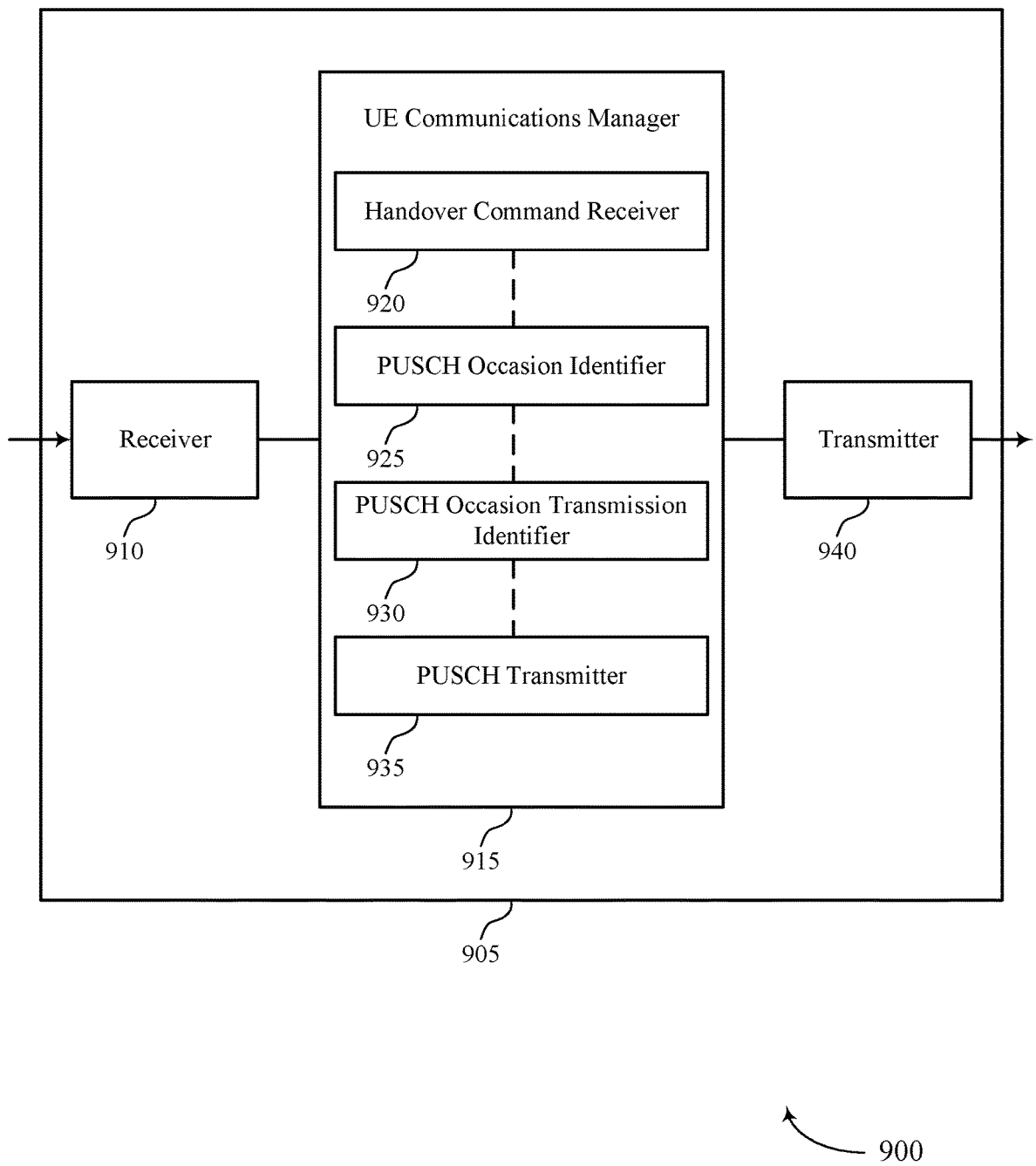

FIG. 9 shows a block diagram 900 of a device 905 that supports PUSCH configurations and occasions for handover procedures in accordance with aspects of the present disclosure. The device 905 may be an example of aspects of a device 705, a device 805, or a UE 115 as described herein. The device 905 may include a receiver 910, a UE communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to PUSCH configurations and occasions for handover procedures). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may be an example of aspects of the UE communications manager 715 or the UE communications manager 815 as described herein. The UE communications manager 915 may include a handover command receiver 920, a PUSCH occasion identifier 925, a PUSCH occasion transmission identifier 930, and a PUSCH transmitter 935. The UE communications manager 915 may be an example of aspects of the UE communications manager 1210 described herein.

The handover command receiver 920 may receive, from a source cell, a handover command including an indication to perform a handover to a target cell. The PUSCH occasion identifier 925 may identify a set of occasions for a PUSCH transmission associated with the handover, each occasion of the set of occasions including a different set of time and frequency resources for the PUSCH transmission.

The PUSCH occasion transmission identifier 930 may identify one or more occasions of the set of occasions for transmitting the PUSCH transmission. The PUSCH transmitter 935 may transmit, to the target cell, a message on the PUSCH via the one or more occasions of the set of occasions, the message indicating a completion of the handover to the target cell.

The transmitter 940 may transmit signals generated by other components of the device 905. In some examples, the transmitter 940 may be collocated with a receiver 910 in a transceiver module. For example, the transmitter 940 may be an example of aspects of the transceiver 1220 described with reference to FIG. 12. The transmitter 940 may utilize a single antenna or a set of antennas.

Figure 10:
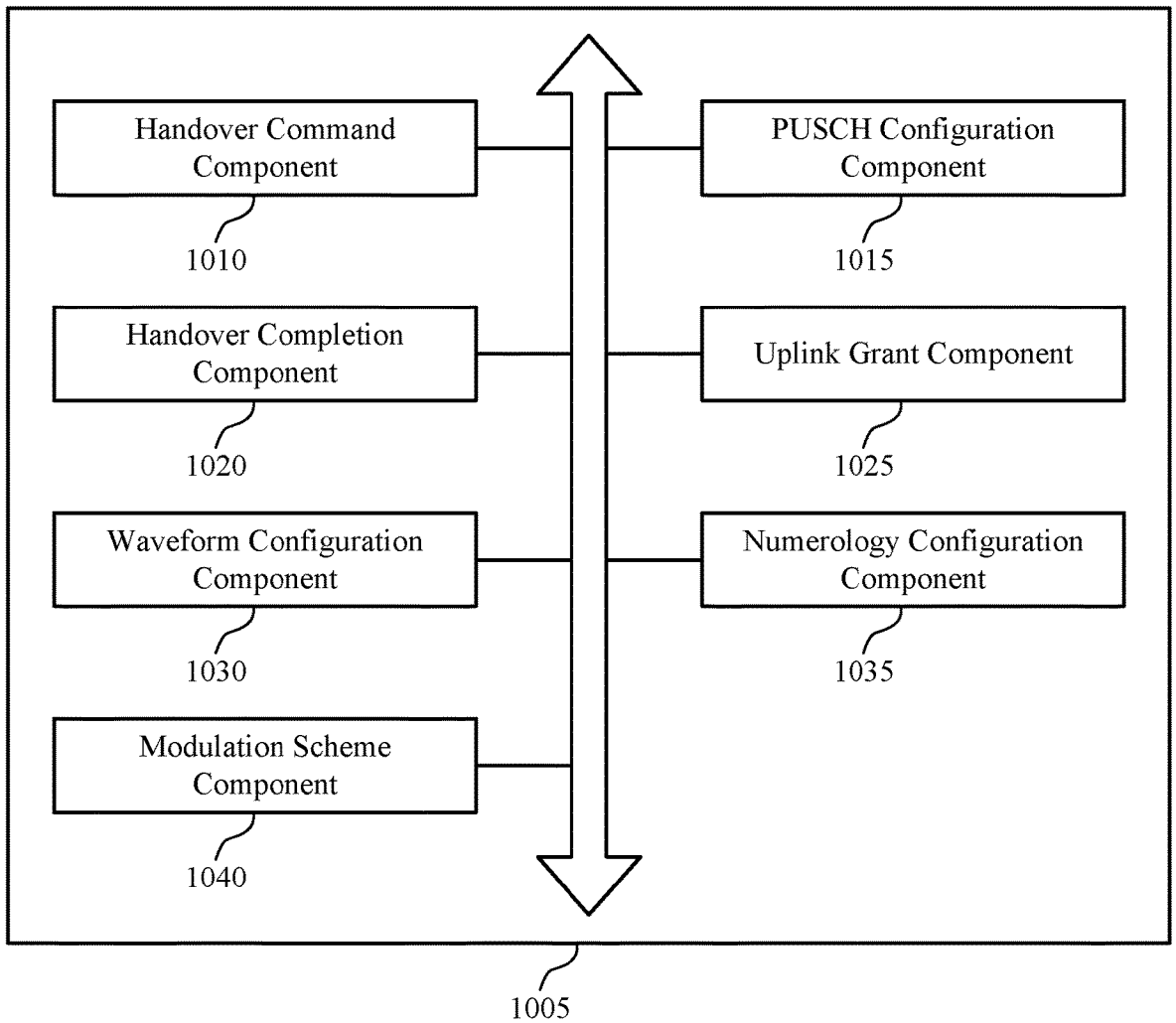
FIGS. 10 and 11 show block diagrams of communications managers that support PUSCH configurations and occasions for handover procedures in accordance with aspects of the present disclosure.

FIG. 10 shows a block diagram 1000 of a UE communications manager 1005 that supports PUSCH configurations and occasions for handover procedures in accordance with aspects of the present disclosure. The communications manager 1005 may be an example of aspects of a UE communications manager 715, a UE communications manager 815, a UE communications manager 915, or a UE communications manager 1210 as described herein. The UE communications manager 1005 may include a handover command component 1010, a PUSCH configuration component 1015, a handover completion component 1020, an uplink grant component 1025, a waveform configuration component 1030, a numerology configuration component 1035, and a modulation scheme component 1040. Each of these modules may communicate, directly or indirectly, with one another (e.g., via one or more buses).

The handover command component 1010 may receive, from a source cell, a handover command including an indication to perform a handover to a target cell. The PUSCH configuration component 1015 may identify a configuration for a PUSCH based on the handover command or downlink control information of the target cell, the configuration including at least one of a waveform configuration, a numerology configuration, or a modulation scheme configuration. The handover completion component 1020 may transmit, to the target cell, a message via the PUSCH having the identified configuration, the message indicating a completion of the handover to the target cell. In some cases, the message includes a radio resource control reconfiguration complete message.

The uplink grant component 1025 may receive an uplink grant indicating resources for transmitting the PUSCH, the uplink grant including an indication of the configuration for the PUSCH. In some examples, the uplink grant component 1025 may receive, from the target cell, the downlink control information including the uplink grant. In some cases, the uplink grant is included in the handover command.

In some cases, the uplink grant component 1025 may receiving an uplink grant indicating resources for transmitting the physical uplink shared channel and may determine whether an indication of the configuration for the physical uplink shared channel is included in the uplink grant. In some cases, the PUSCH configuration component 1015 may identify the configuration for the physical uplink shared channel based at least in part on a determination that the indication of the configuration is absent from the uplink grant.

The waveform configuration component 1030 may identify, within the uplink grant, an indication of the waveform configuration. In some examples, the waveform configuration component 1030 may select a waveform from a set of waveforms based on the indication of the waveform configuration. In some examples, the waveform configuration component 1030 may receive, from the target cell, system information including an indication of the waveform configuration. In some examples, the waveform configuration component 1030 may determine a waveform of a BWP of the source cell. In some examples, the waveform configuration component 1030 may select the waveform of the BWP for the PUSCH. In some cases, the indication of the waveform configuration is received within a field of a common configuration information element.

In some cases, the waveform configuration component 1030 may select a waveform from a set of waveforms based on an indication of the waveform configuration in system information received from the target cell, where the selection is based on the indication of the configuration being absent from the uplink grant. In some examples, the waveform configuration component 1030 may determine a waveform of an active bandwidth part of the source cell and select the waveform of the active bandwidth part for the physical uplink shared channel, where the selection is based on the indication of the configuration being absent from the uplink grant.

The numerology configuration component 1035 may identify, within the uplink grant, an indication of the numerology configuration. In some aspects, the numerology configuration component 1035 may select a numerology from a set of numerologies based on the indication of the numerology configuration. In some examples, the numerology configuration component 1035 may determine a numerology of an initial uplink BWP of the target cell. In some cases, the numerology configuration component 1035 may select the numerology of the initial uplink BWP for the PUSCH. In some examples, the numerology configuration component 1035 may determine a numerology of an active uplink BWP of the source cell. In some examples, the numerology configuration component 1035 may select the numerology of the active uplink BWP for the PUSCH. In some cases, the selected numerology is the same as a numerology of an active uplink BWP of the source cell. In some cases, the selected numerology is different from a numerology of an active uplink BWP of the source cell.

In some cases, the numerology configuration component 1035 may select a numerology from a set of numerologies based on an indication of the numerology configuration in system information received from the target cell, where the selection is based on the indication of the configuration being absent from the uplink grant. In some examples, the numerology configuration component 1035 may determine a numerology of an active bandwidth part of the source cell. In some aspects, the numerology configuration component 1035 may select the numerology of the active bandwidth part for the physical uplink shared channel, where the selection is based on the indication of the configuration being absent from the uplink grant. In some examples, the numerology configuration comprises a configuration of a numerology for the PUSCH or a numerology of an active bandwidth part for transmitting the PUSCH.

The modulation scheme component 1040 may identify, within the uplink grant, an indication of the modulation scheme configuration. In some examples, the modulation scheme component 1040 may select a modulation scheme from a set of modulation schemes based on the indication of the modulation scheme configuration. In some cases, the modulation scheme includes frequency-domain-based $\pi/2$ BPSK for a DMRS associated with the PUSCH or time-domain-based $\pi/2$ BPSK for the DMRS associated with the PUSCH. In some cases, the indication of the modulation scheme configuration includes one or more reserved bits within the uplink grant.

Figure 11:
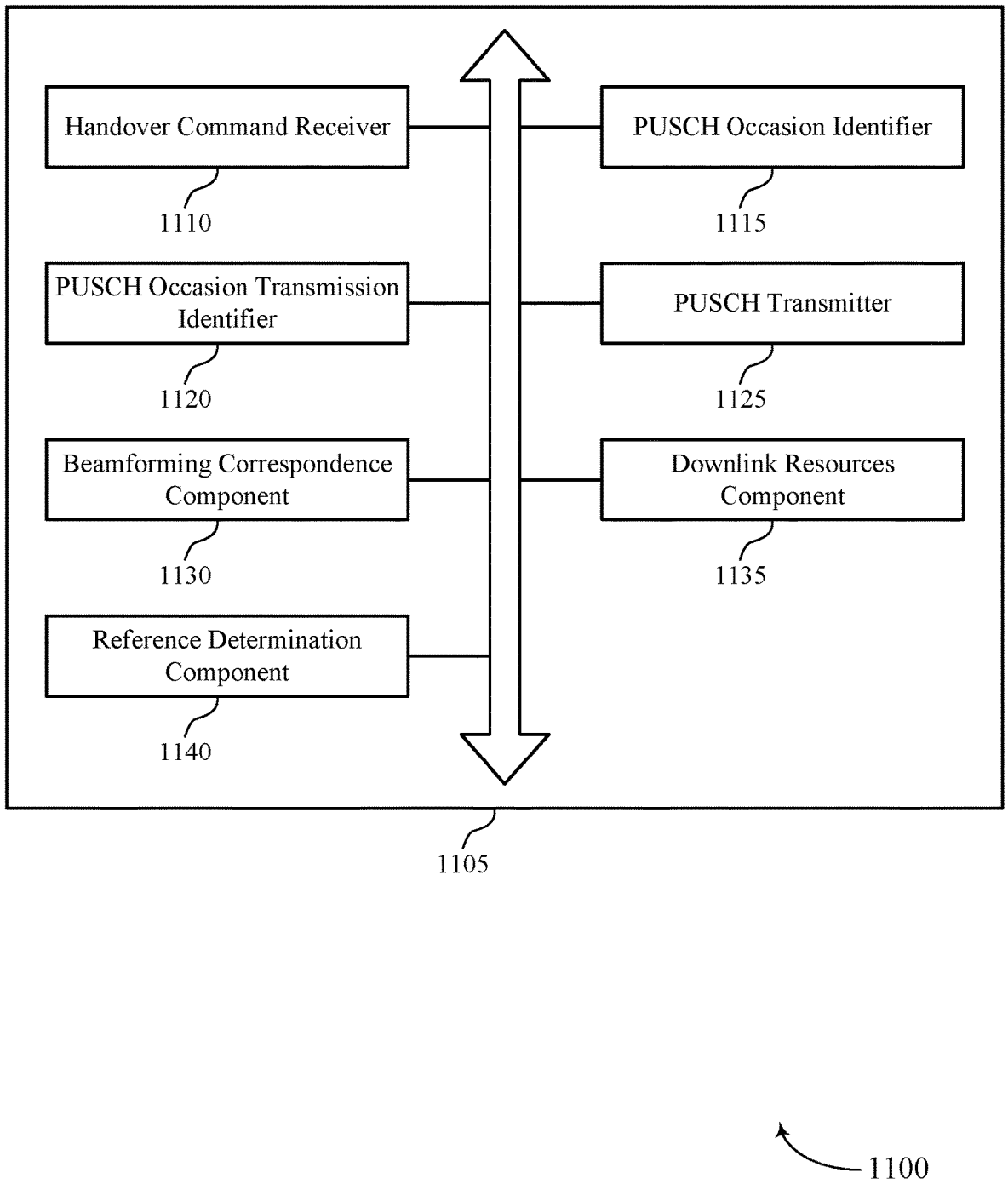

FIG. 11 shows a block diagram 1100 of a UE communications manager 1105 that supports PUSCH configurations and occasions for handover procedures in accordance with aspects of the present disclosure. The UE communications manager 1105 may be an example of aspects of a UE communications manager 715, a UE communications manager 815, a UE communications manager 915, a UE communications manager 1005, or a UE communications manager 1210 as described herein. The UE communications manager 1105 may include a handover command receiver 1110, a PUSCH occasion identifier 1115, a PUSCH occasion transmission identifier 1120, a PUSCH transmitter 1125, a beamforming correspondence component 1130, a downlink resources component 1135, and a reference determination component 1140. Each of these modules may communicate, directly or indirectly, with one another (e.g., via one or more buses).

The handover command receiver 1110 may receive, from a source cell, a handover command including an indication to perform a handover to a target cell. In some cases, the handover may not include use of a RACH during the handover.

The PUSCH occasion identifier 1115 may identify a set of occasions for a PUSCH transmission associated with the handover, each occasion of the set of occasions including a different set of time and frequency resources for the PUSCH transmission. In some cases, the set of occasions may overlap one or more RACH occasions in time, frequency, or a combination thereof. Additionally, the set of occasions may be FDMed, TDMed, or a combination thereof. In some cases, one or more timing gaps between the set of occasions may be the same or may be different between consecutive occasions in a time domain. The PUSCH occasion transmission identifier 1120 may identify one or more occasions of the set of occasions for the PUSCH transmission.

The PUSCH transmitter 1125 may transmit, to the target cell, a message on the PUSCH via the one or more occasions of the set of occasions, the message indicating a completion of the handover to the target cell. In some examples, the PUSCH transmitter 1125 may transmit the message on the PUSCH via the one or more occasions of the set of occasions based on beam sweeping the PUSCH over multiple occasions of the one or more occasions.

The beamforming correspondence component 1130 may identify a beamforming correspondence between downlink resources transmitted by the target cell and the one or more occasions. In some examples, the beamforming correspondence component 1130 may receive an indication of the beamforming correspondence between the downlink resources and the one or more occasions. In some cases, the beamforming correspondence may include a correspondence between one set of downlink resources and one occasion, a correspondence between one set of downlink resources and multiple occasions, a correspondence between multiple sets of downlink resources and one occasion, or a combination thereof.

In some cases, the beamforming correspondence component 1130 may receive, from the target cell, one or more sets of the downlink resources; may select at least one set of downlink resources of the one or more sets of the downlink resources based on a reference signal received power measurement of the one or more sets of the downlink resources; may identify a receive beam for receiving the selected at least one set of downlink resources; and may transmit, to the target cell, the message on the PUSCH on a transmit beam based on the identified receive beam. In some cases, the identified one or more occasions of the set of occasions may be based on the selected at least one set of downlink resources.

In some cases, the downlink resources may include SS/PBCH blocks, CSI-RSs, or a combination thereof. The downlink resources component 1135 may receive an indication of a number of SS/PBCH blocks that are transmitted by the target cell and may identify the one or more occasions of the set of occasions based on the number of SS/PBCH blocks. In some cases, the indication of the number of SS/PBCH blocks may be received via a SIB, RRC signaling, or a combination thereof. Additionally or alternatively, the downlink resources component 1135 may receive the CSI-RSs based on a CSI-RS based RRM procedure.

The reference determination component 1140 may determine a timing reference of the one or more occasions of the set of occasions based on a boundary of a radio frame by which the UE is allowed to perform the handover, a boundary of a radio frame or a boundary of a half radio frame where downlink resources are detected from the target cell, a timing of a PRACH (e.g., RACH) occasion at the target cell, or a combination thereof. In some examples, the reference determination component 1140 may receive, in the handover command, a system frame number of the radio frame by which the UE is allowed to perform the handover.

Additionally or alternatively, the reference determination component 1140 may determine a frequency reference of the one or more occasions of the set of occasions based on a reference frequency for uplink and downlink transmissions, a RACH occasion frequency reference, a configured frequency reference received in the handover command, or a combination thereof. In some cases, the reference frequency for uplink and downlink transmissions may be based on information received in a MIB, PBCH, or a combination thereof for a standalone deployment of the UE. Additionally or alternatively, the reference frequency for uplink and downlink transmissions may be based on a network configuration that indicates the reference frequency for a non-standalone deployment of the UE.

Figure 12:
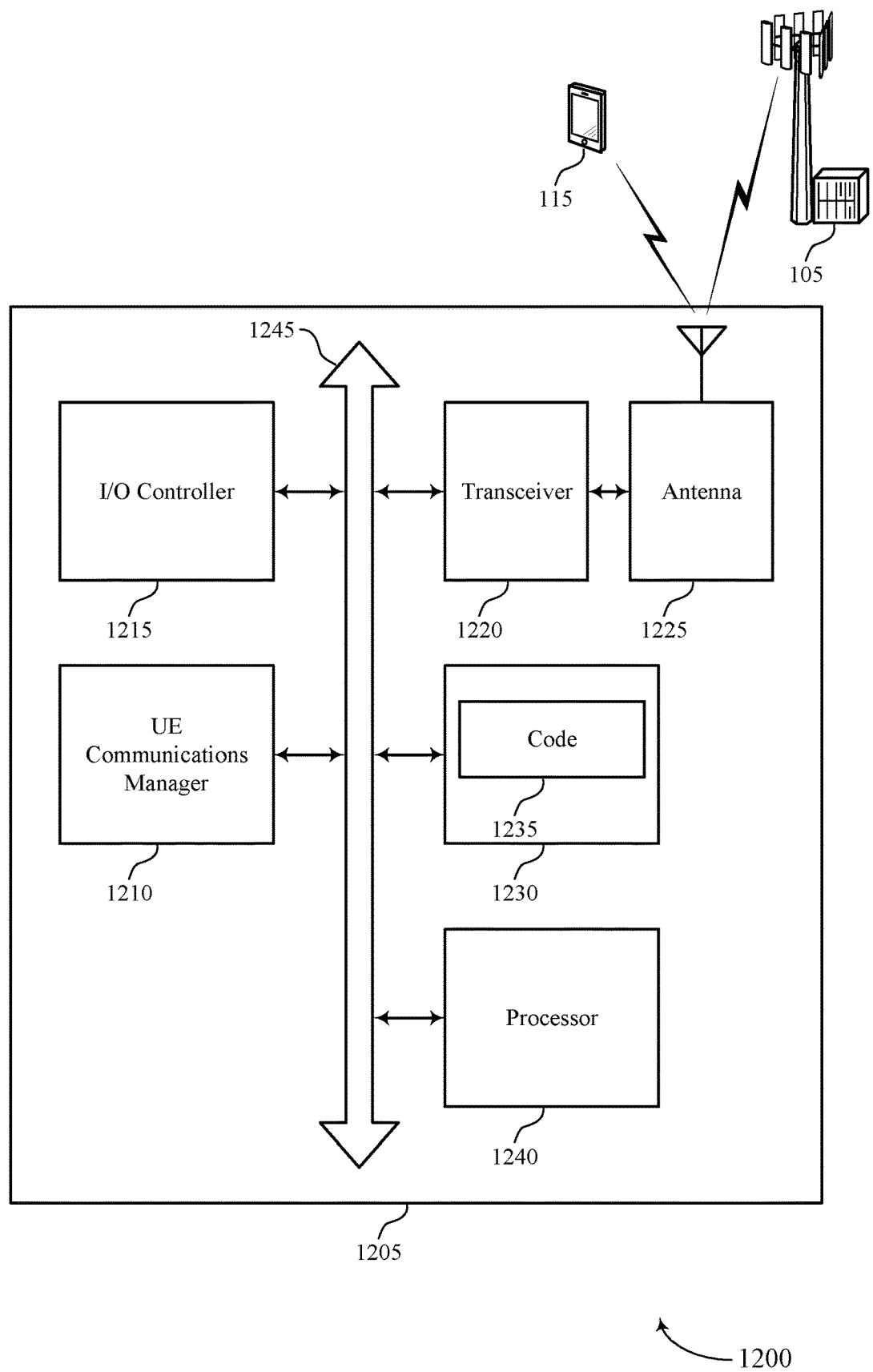
FIG. 12 shows a diagram of a system including a device that supports PUSCH configurations and occasions for handover procedures in accordance with aspects of the present disclosure.

FIG. 12 shows a diagram of a system 1200 including a device 1205 that supports PUSCH configurations and occasions for handover procedures in accordance with aspects of the present disclosure. The device 1205 may be an example of or include the components of device 705, device 805, device 905, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a source cell, a handover command including an indication to perform a handover to a target cell. In some cases, the UE communications manager 1210 may identify a configuration for a PUSCH based on the handover command or downlink control information of the target cell, the configuration including at least one of a waveform configuration, a numerology configuration, or a modulation scheme configuration. The UE communications manager 1210 may transmit, to the target cell, a message via the PUSCH having the identified configuration, the message indicating a completion of the handover to the target cell.

In some cases, the UE communications manager 1210 may identify a set of occasions for a PUSCH transmission associated with the handover, each occasion of the set of occasions including a different set of time and frequency resources for the PUSCH transmission. Additionally, the UE communications manager 1210 may identify one or more occasions of the set of occasions for the PUSCH transmission. In some cases, the UE communications manager 1210 may transmit, to the target cell, a message on the PUSCH via the one or more occasions of the set of occasions, the message indicating a completion of the handover to the target cell.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting PUSCH configurations and occasions for handover procedures).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
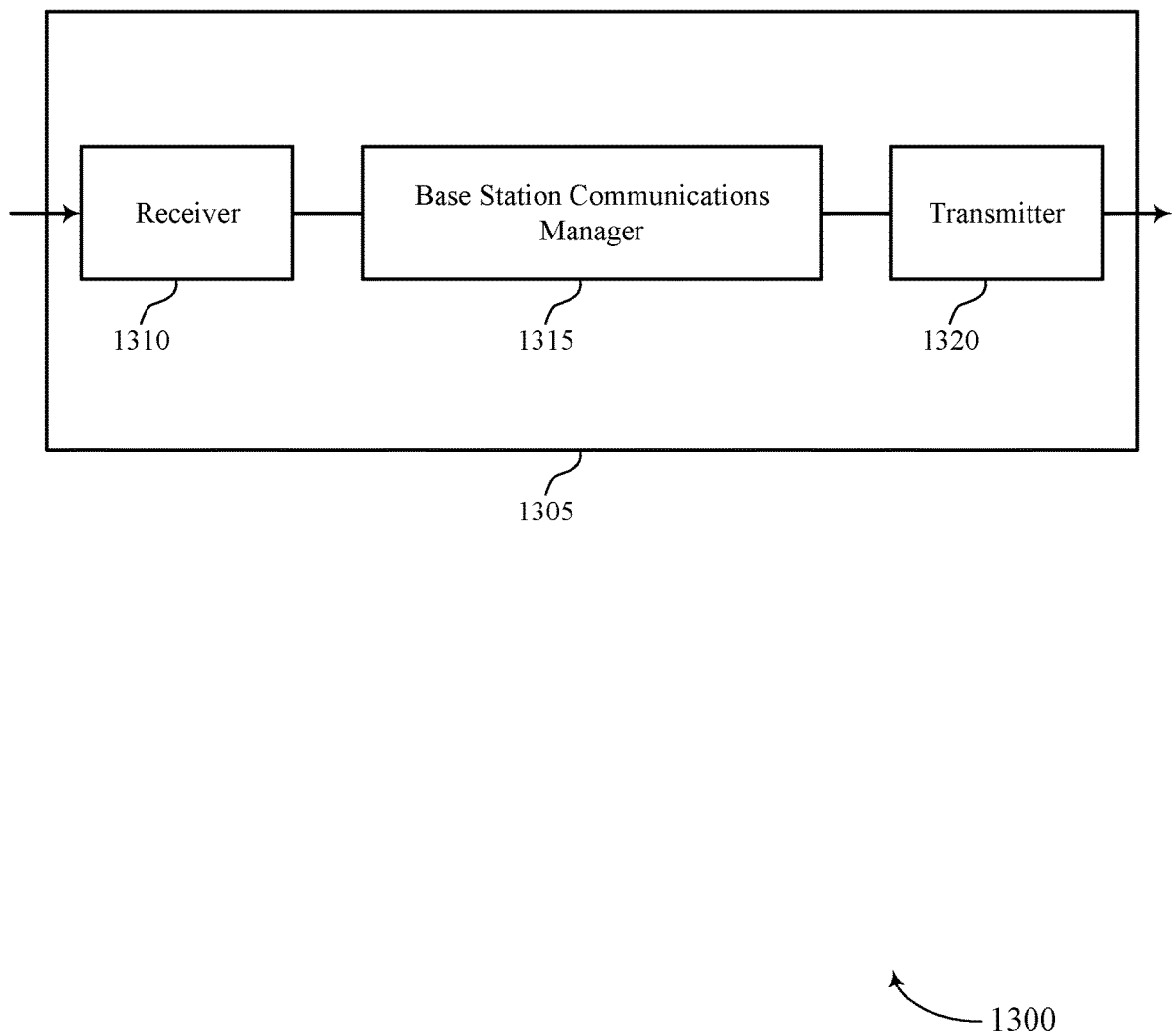
FIGS. 13 through 15 show block diagrams of devices that support PUSCH configurations and occasions for handover procedures in accordance with aspects of the present disclosure.

FIG. 13 shows a block diagram 1300 of a device 1305 that supports PUSCH configurations and occasions for handover procedures in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to PUSCH configurations and occasions for handover procedures). Information may be passed on to other components of the device 1305. The receiver 1310 may be an example of aspects of the transceiver 1820 described with reference to FIG. 18. The receiver 1310 may utilize a single antenna or a set of antennas.

The base station communications manager 1315 may determine to handover a UE from the base station to a target cell using a handover procedure; determine a configuration for a PUSCH based on the determination, the configuration including at least one of a waveform configuration, a numerology configuration, or a modulation scheme configuration; and transmit, to the UE, a handover command including an uplink grant indicating resources for transmitting the PUSCH to the target cell, the uplink grant including an indication of the configuration for the PUSCH. The base station communications manager 1315 may also receive an indication of a handover procedure to handover a UE from a source cell to a target cell; determine a configuration for a PUSCH based on the indication, the configuration including at least one of a waveform configuration, a numerology configuration, or a modulation scheme configuration; transmit, to the UE, a first message including an uplink grant indicating resources for transmitting the PUSCH, the uplink grant including an indication of the configuration for the PUSCH; and receive, from the UE, a second message via the PUSCH having the configuration, the second message indicating a completion of the handover procedure. The base station communications manager 1315 may be an example of aspects of the base station communications manager 1810 described herein.

In some cases, the base station communications manager 1315 may determine a set of occasions for a PUSCH transmission associated with the handover and by the UE, each of the occasions including a different set of time and frequency resources for the UE to transmit the PUSCH transmission. The base station communications manager 1315 may transmit, to the UE, a first message including an uplink grant indicating downlink resources corresponding to one or more occasions of the set of occasions for transmitting the PUSCH transmission. Additionally, the base station communications manager 1315 may receive, from the UE, a second message on the PUSCH via the one or more occasions of the set of occasions, the second message indicating a completion of the handover procedure. The base station communications manager 1315 may be an example of aspects of the base station communications manager 1810 described herein.

The base station communications manager 1315, or its sub-components, may be implemented in hardware, code (e.g., software or firmware) executed by a processor, or any combination thereof. If implemented in code executed by a processor, the functions of the base station communications manager 1315 or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some cases, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1820 described with reference to FIG. 18. The transmitter 1320 may utilize a single antenna or a set of antennas.

Figure 14:
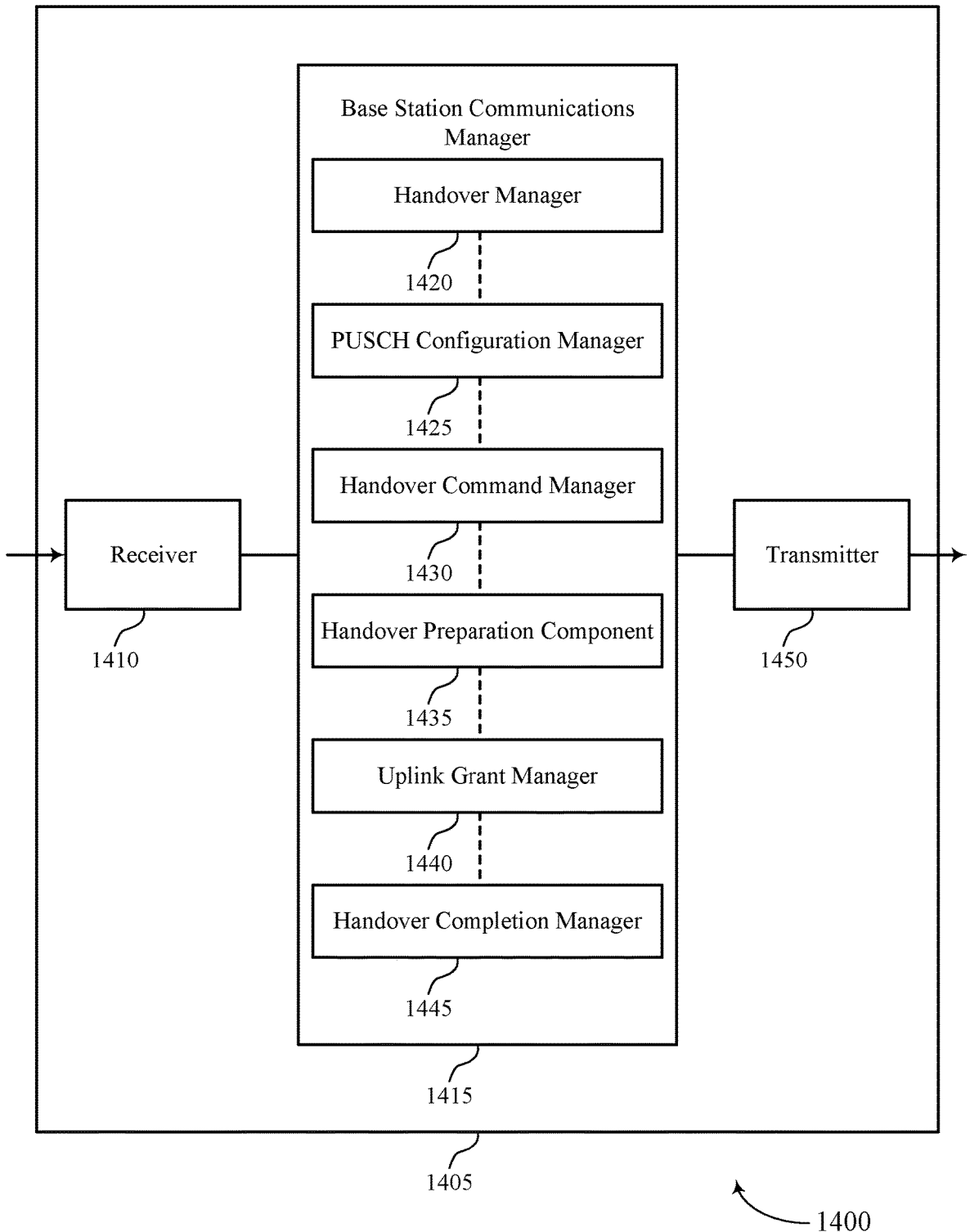

FIG. 14 shows a block diagram 1400 of a device 1405 that supports PUSCH configurations and occasions for handover procedures in accordance with aspects of the present disclosure. The device 1405 may be an example of aspects of a device 1305 or a base station 105 as described herein. The device 1405 may include a receiver 1410, a base station communications manager 1415, and a transmitter 1450. The device 1405 may also include a processor. Each of these components may be in communication with one another (e.g., via one or more buses).

The receiver 1410 may receive information such as packets, user data, or control information associated with various information channels (e.g., control channels, data channels, and information related to PUSCH configurations and occasions for handover procedures, etc.). Information may be passed on to other components of the device 1405. The receiver 1410 may be an example of aspects of the transceiver 1820 described with reference to FIG. 18. The receiver 1410 may utilize a single antenna or a set of antennas.

The base station communications manager 1415 may be an example of aspects of the base station communications manager 1315 as described herein. The base station communications manager 1415 may include a handover manager 1420, a PUSCH configuration manager 1425, a handover command manager 1430, a handover preparation component 1435, an uplink grant manager 1440, and a handover completion manager 1445. The base station communications manager 1415 may be an example of aspects of the base station communications manager 1810 described herein.

The handover manager 1420 may determine to handover a UE from the base station to a target cell using a handover procedure. The PUSCH configuration manager 1425 may determine a configuration for a PUSCH based on the determination, the configuration including at least one of a waveform configuration, a numerology configuration, or a modulation scheme configuration. The PUSCH configuration manager 1425 may determine a configuration for a PUSCH based on the indication, the configuration including at least one of a waveform configuration, a numerology configuration, or a modulation scheme configuration. The handover command manager 1430 may transmit, to the UE, a handover command including an uplink grant indicating resources for transmitting the PUSCH to the target cell, the uplink grant including an indication of the configuration for the PUSCH.

The handover preparation component 1435 may receive an indication of a handover procedure to handover a UE from a source cell to a target cell. The uplink grant manager 1440 may transmit, to the UE, a first message including an uplink grant indicating resources for transmitting the PUSCH, the uplink grant including an indication of the configuration for the PUSCH. The handover completion manager 1445 may receive, from the UE, a second message via the PUSCH having the configuration, the second message indicating a completion of the handover procedure.

The transmitter 1450 may transmit signals generated by other components of the device 1405. In some examples, the transmitter 1450 may be collocated with a receiver 1410 in a transceiver module. For example, the transmitter 1450 may be an example of aspects of the transceiver 1820 described with reference to FIG. 18. The transmitter 1450 may utilize a single antenna or a set of antennas.

Figure 15:
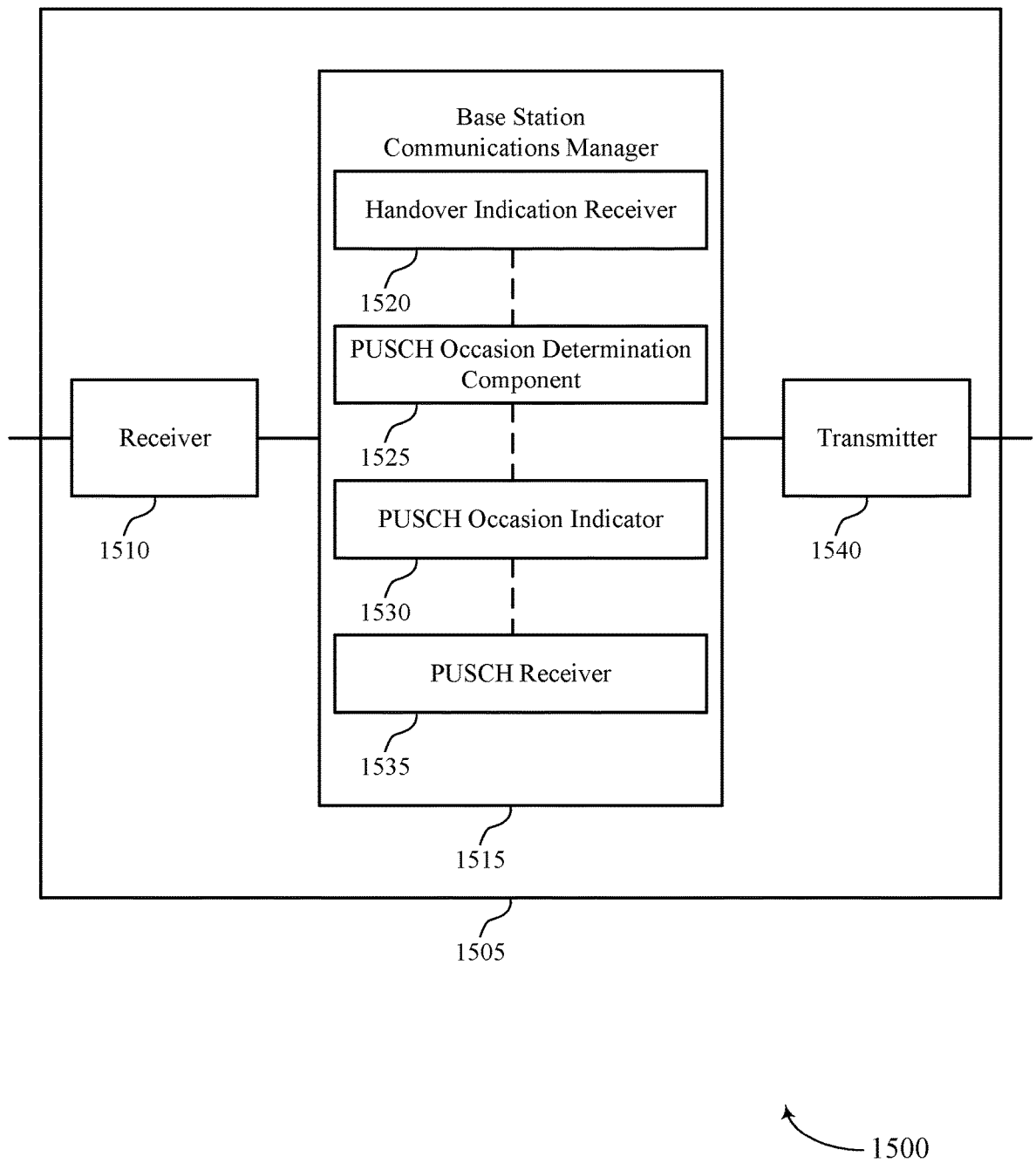

FIG. 15 shows a block diagram 1500 of a device 1505 that supports PUSCH configurations and occasions for handover procedures in accordance with aspects of the present disclosure. The device 1505 may be an example of aspects of a device 1305, a device 1405, or a base station 105 as described herein. The device 1505 may include a receiver 1510, a base station communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to PUSCH configurations and occasions for handover procedures). Information may be passed on to other components of the device 1505. The receiver 1510 may be an example of aspects of the transceiver 1820 described with reference to FIG. 18. The receiver 1510 may utilize a single antenna or a set of antennas.

The base station communications manager 1515 may be an example of aspects of the base station communications manager 1315 as described herein. The base station communications manager 1515 may include a handover indication receiver 1520, a PUSCH occasion determination component 1525, a PUSCH occasion indicator 1530, and a PUSCH receiver 1535. The base station communications manager 1515 may be an example of aspects of the base station communications manager 1810 described herein.

The handover indication receiver 1520 may receive an indication of a handover procedure to handover a UE from a source cell to a target cell. The PUSCH occasion determination component 1525 may determine a set of occasions for a PUSCH transmission associated with the handover and by the UE, each occasion of the set of occasions including a different set of time and frequency resources for the UE to transmit the PUSCH transmission. The PUSCH occasion indicator 1530 may transmit, to the UE, a first message including an uplink grant indicating downlink resources corresponding to one or more occasions of the set of occasions for transmitting the PUSCH transmission. The PUSCH receiver 1535 may receive, from the UE, a second message on the PUSCH via the one or more occasions of the set of occasions, the second message indicating a completion of the handover procedure.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1820 described with reference to FIG. 18. The transmitter 1540 may utilize a single antenna or a set of antennas.

Figure 16:
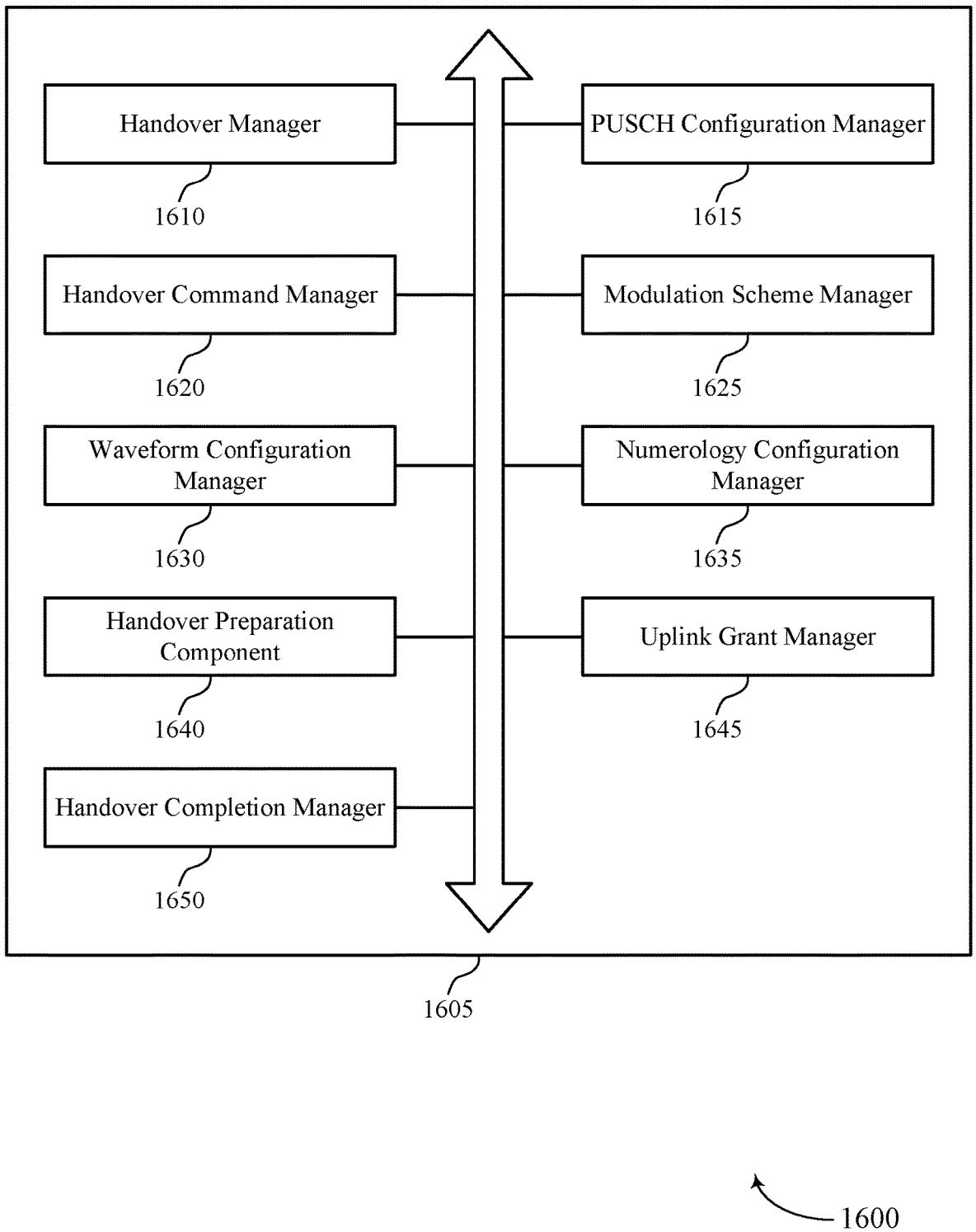
FIGS. 16 and 17 show block diagrams of communications managers that support PUSCH configurations and occasions for handover procedures in accordance with aspects of the present disclosure.

FIG. 16 shows a block diagram 1600 of a base station communications manager 1605 that supports PUSCH configurations and occasions for handover procedures in accordance with aspects of the present disclosure. The base station communications manager 1605 may be an example of aspects of a base station communications manager 1315, a base station communications manager 1415, a base station communications manager 1515, or a base station communications manager 1810 as described herein. The base station communications manager 1605 may include a handover manager 1610, a PUSCH configuration manager 1615, a handover command manager 1620, a modulation scheme manager 1625, a waveform configuration manager 1630, a numerology configuration manager 1635, a handover preparation component 1640, an uplink grant manager 1645, and a handover completion manager 1650. Each of these modules may communicate, directly or indirectly, with one another (e.g., via one or more buses).

The handover manager 1610 may determine to handover a UE from the base station to a target cell using a handover procedure. The PUSCH configuration manager 1615 may determine a configuration for a PUSCH based on the determination, the configuration including at least one of a waveform configuration, a numerology configuration, or a modulation scheme configuration. In some examples, the PUSCH configuration manager 1615 may determine a configuration for a PUSCH based on the indication, the configuration including at least one of a waveform configuration, a numerology configuration, or a modulation scheme configuration. The handover command manager 1620 may transmit, to the UE, a handover command including an uplink grant indicating resources for transmitting the PUSCH to the target cell, the uplink grant including an indication of the configuration for the PUSCH.

The handover preparation component 1640 may receive an indication of a handover procedure to handover a UE from a source cell to a target cell. The uplink grant manager 1645 may transmit, to the UE, a first message including an uplink grant indicating resources for transmitting the PUSCH, the uplink grant including an indication of the configuration for the PUSCH. The handover completion manager 1650 may receive, from the UE, a second message via the PUSCH having the configuration, the second message indicating a completion of the handover procedure.

The modulation scheme manager 1625 may receive, from the target cell, an indication of a capability of the target cell to support one or more modulation schemes from a set of modulation schemes, where the configuration for the PUSCH is based on the capability of the target cell. In some examples, the modulation scheme manager 1625 may identify a set of modulation schemes for the PUSCH. In some examples, the modulation scheme manager 1625 may determine the modulation scheme configuration using a modulation scheme from the set of modulation schemes. In some cases, the modulation scheme manager 1625 may determine a capability of the base station to support one or more modulation schemes from a set of modulation schemes. In some aspects, the modulation scheme manager 1625 may transmit, to the source cell, an indication of the capability. In some examples, the modulation scheme manager 1625 may identify a set of modulation schemes for the PUSCH. In some aspects, the modulation scheme manager 1625 may determine the modulation scheme configuration using a modulation scheme from the set of modulation schemes. In some cases, the set of modulation schemes includes frequency-domain-based π/2 BPSK for a DMRS associated with the PUSCH and time-domain-based π/2 BPSK for the DMRS associated with the PUSCH. In some cases, the set of modulation schemes includes frequency-domain-based π/2 BPSK for a DMRS associated with the PUSCH and time-domain-based π/2 BPSK for the DMRS associated with the PUSCH.

The waveform configuration manager 1630 may identify a set of waveforms for the PUSCH. In some examples, the waveform configuration manager 1630 may determine the waveform configuration using a waveform from the set of waveforms. In some cases, the waveform configuration manager 1630 may identify a set of waveforms for the PUSCH. In some examples, the waveform configuration manager 1630 may determine the waveform configuration using a waveform from the set of waveforms.

The numerology configuration manager 1635 may identify a set of numerologies for the PUSCH. In some aspects, the numerology configuration manager 1635 may determine the numerology configuration using a numerology from the set of numerologies. In some examples, the numerology configuration manager 1635 may identify a set of numerologies for the PUSCH, and may determine the numerology configuration using a numerology from the set of numerologies.

Figure 17:
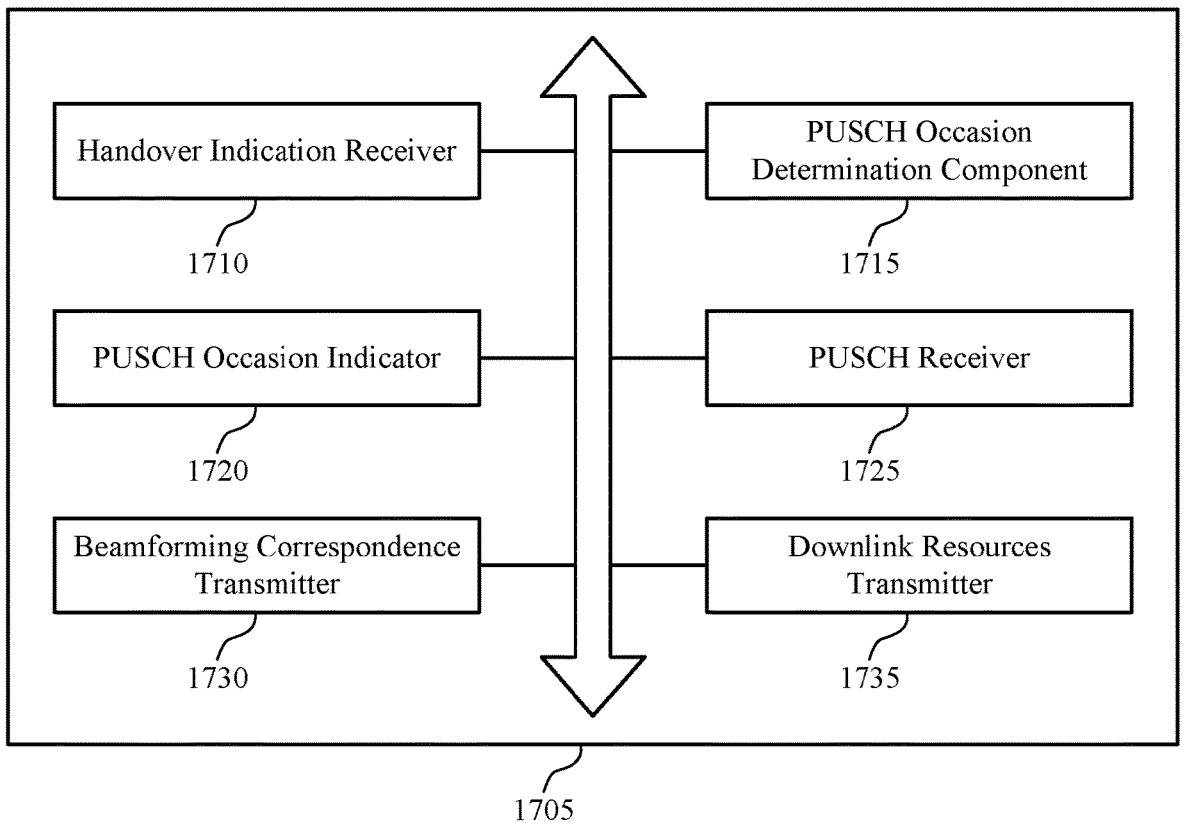

FIG. 17 shows a block diagram 1700 of a base station communications manager 1705 that supports PUSCH configurations and occasions for handover procedures in accordance with aspects of the present disclosure. The base station communications manager 1705 may be an example of aspects of a base station communications manager 1315, a base station communications manager 1415, a base station communications manager 1515, a base station communications manager 1605, or a base station communications manager 1810 as described herein. The base station communications manager 1705 may include a handover indication receiver 1710, a PUSCH occasion determination component 1715, a PUSCH occasion indicator 1720, a PUSCH receiver 1725, a beamforming correspondence transmitter 1730, and a downlink resources transmitter 1735. Each of these modules may communicate, directly or indirectly, with one another (e.g., via one or more buses).

The handover indication receiver 1710 may receive an indication of a handover procedure to handover a UE from a source cell to a target cell. In some cases, the handover may not include use of a RACH during the handover.

The PUSCH occasion determination component 1715 may determine a set of occasions for a PUSCH transmission associated with the handover and by the UE, each occasion of the set of occasions including a different set of time and frequency resources for the UE to transmit the PUSCH transmission. In some cases, the set of occasions may overlap one or more RACH occasions in time, frequency, or a combination thereof. Additionally, the set of occasions may be FDMed, TDMed, or a combination thereof. In some cases, one or more timing gaps between the set of occasions may be the same or may be different between consecutive occasions in a time domain.

The PUSCH occasion indicator 1720 may transmit, to the UE, a first message including an uplink grant indicating downlink resources corresponding to one or more occasions of the set of occasions for transmitting the PUSCH transmission.

The PUSCH receiver 1725 may receive, from the UE, a second message on the PUSCH via the one or more occasions of the set of occasions, the second message indicating a completion of the handover procedure. In some examples, the PUSCH receiver 1725 may transmit, to the UE, one or more sets of the downlink resources on one or more transmit beams and may receive, from the UE, the second message on the PUSCH on a receive beam based on the one or more transmit beams.

The beamforming correspondence transmitter 1730 may transmit an indication of a beamforming correspondence between the downlink resources and the one or more occasions. In some cases, the indication may include a correspondence between one set of downlink resources and one occasion, a correspondence between one set of downlink resources and multiple occasions, a correspondence between multiple sets of downlink resources and one occasion, or a combination thereof.

In some cases, the downlink resources include SS/PBCH blocks, CSI-RSs, or a combination thereof. The downlink resources transmitter 1735 may transmit an indication of a number of SS/PBCH blocks that are transmitted by the target cell, where the one or more occasions of the set of occasions are based on the number of SS/PBCH blocks. In some examples, the downlink resources transmitter 1735 may transmit the indication of the number of SS/PBCH blocks via a SIB, RRC signaling, or a combination thereof. Additionally or alternatively, the downlink resources transmitter 1735 may transmit the CSI-RSs based on a CSI-RS based RRM procedure.

Figure 18:
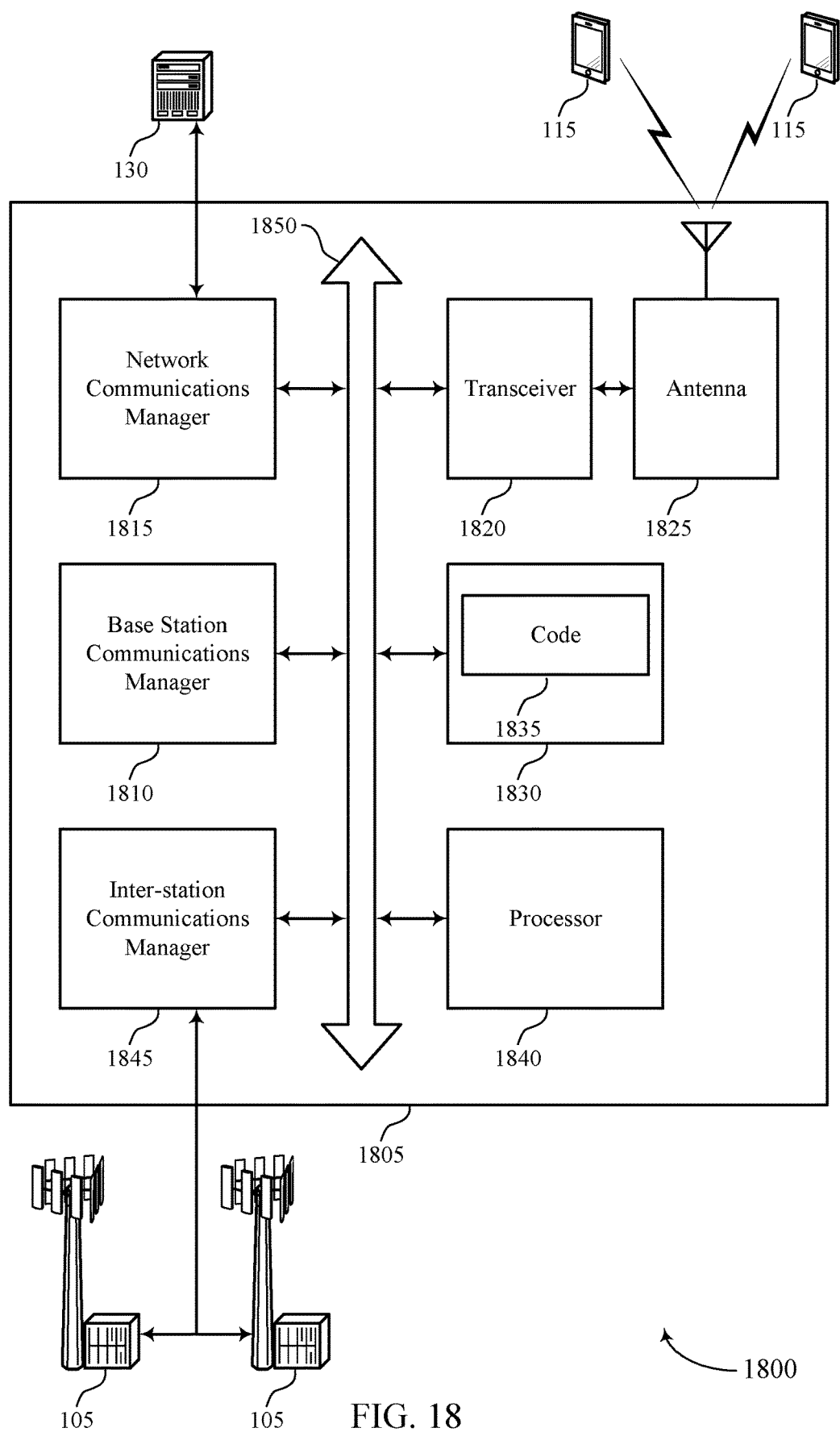
FIG. 18 shows a diagram of a system including a device that supports PUSCH configurations and occasions for handover procedures in accordance with aspects of the present disclosure.

FIG. 18 shows a diagram of a system 1800 including a device 1805 that supports PUSCH configurations and occasions for handover procedures in accordance with aspects of the present disclosure. The device 1805 may be an example of or include the components of device 1305, device 1405, device 1505, or a base station 105 as described herein. The device 1805 may include components for bi-directional voice and data communications including components for transmitting and receiving communications, including a base station communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The base station communications manager 1810 may determine to handover a UE from the base station to a target cell using a handover procedure (e.g., a RACH-less handover procedure). The base station communications manager 1810 may determine a configuration for a PUSCH based on the determination, the configuration including at least one of a waveform configuration, a numerology configuration, or a modulation scheme configuration, and transmit, to the UE, a handover command including an uplink grant indicating resources for transmitting the PUSCH to the target cell, the uplink grant including an indication of the configuration for the PUSCH. The base station communications manager 1810 may also receive an indication of a handover procedure to handover a UE from a source cell to a target cell and may determine a configuration for a PUSCH based on the indication, the configuration including at least one of a waveform configuration, a numerology configuration, or a modulation scheme configuration. Additionally, the base station communications manager 1810 may transmit, to the UE, a first message including an uplink grant indicating resources for transmitting the PUSCH, the uplink grant including an indication of the configuration for the PUSCH, and receive, from the UE, a second message via the PUSCH having the configuration, the second message indicating a completion of the handover procedure.

In some cases, the base station communications manager 1810 may determine a set of occasions for a PUSCH transmission associated with the handover and by the UE, each occasion of the set of occasions including a different set of time and frequency resources for the UE to transmit the PUSCH transmission. The base station communications manager 1810 may transmit, to the UE, a first message including an uplink grant indicating downlink resources corresponding to one or more occasions of the set of occasions for transmitting the PUSCH transmission. Additionally, the base station communications manager 1810 may receive, from the UE, a second message on the PUSCH via the one or more occasions of the set of occasions, the second message indicating a completion of the handover procedure.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device 1805 may include a single antenna 1825. However, in some cases the device 1805 may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting PUSCH configurations and occasions for handover procedures).

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
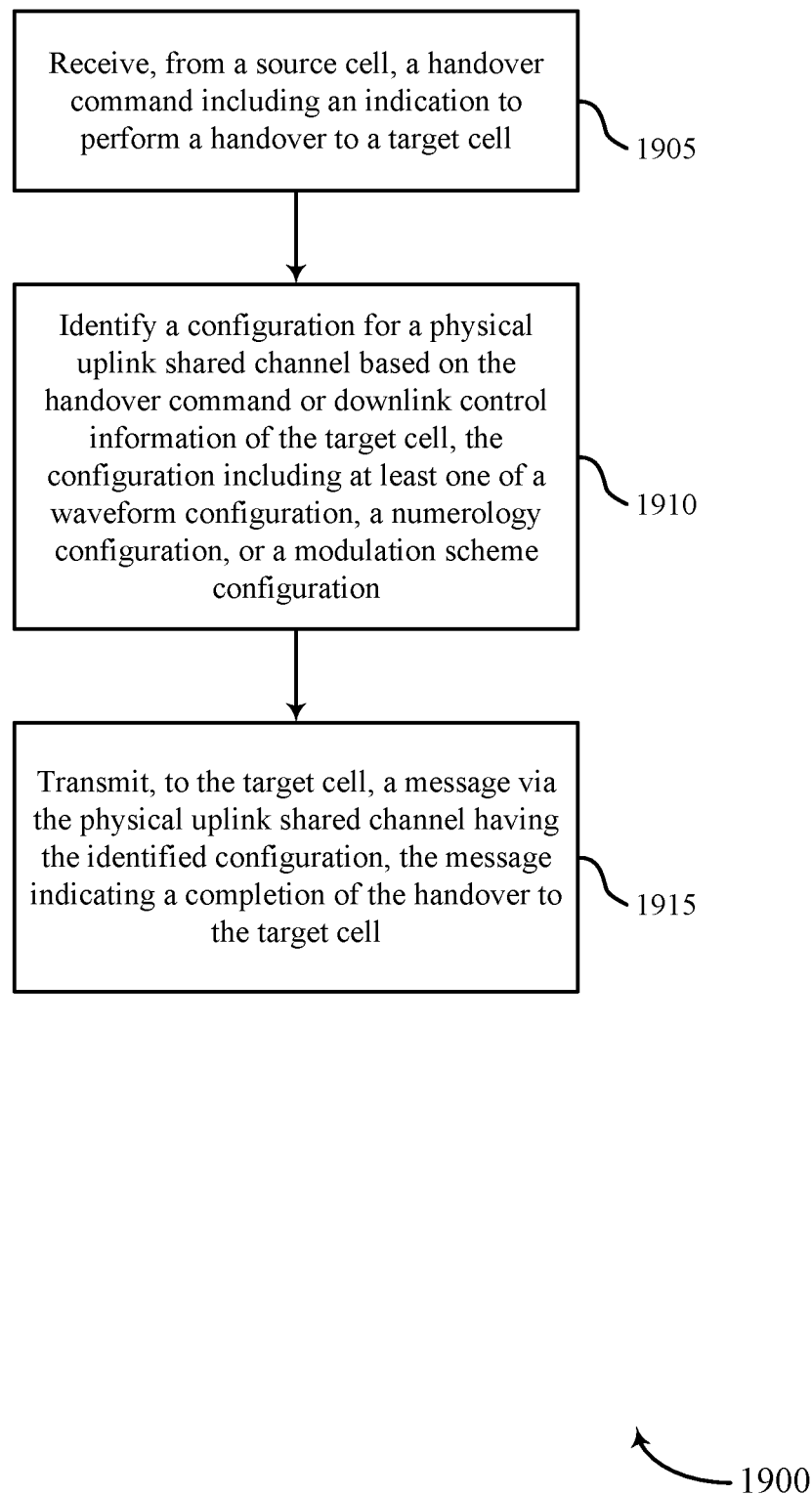
FIGS. 19 through 27 show flowcharts illustrating methods that support PUSCH configurations and occasions for handover procedures in accordance with aspects of the present disclosure.

FIG. 19 shows a flowchart illustrating a method 1900 that supports PUSCH configurations and occasions for handover procedures in accordance with aspects of the present disclosure. The operations of method 1900 may be implemented by a UE 115 or its components as described herein. For example, the operations of method 1900 may be performed by a UE communications manager as described with reference to FIGS. 7 through 12. In some examples, a UE may execute a set of instructions to control the functional elements of the UE to perform the functions described below. Additionally or alternatively, a UE may perform aspects of the functions described below using special-purpose hardware.

At 1905, the UE may receive, from a source cell, a handover command including an indication to perform a handover to a target cell. The operations of 1905 may be performed according to the methods described herein. In some examples, aspects of the operations of 1905 may be performed by a handover command component as described with reference to FIGS. 7 through 12.

At 1910, the UE may identify a configuration for a PUSCH based on the handover command or downlink control information of the target cell, the configuration including at least one of a waveform configuration, a numerology configuration, or a modulation scheme configuration. The operations of 1910 may be performed according to the methods described herein. In some examples, aspects of the operations of 1910 may be performed by a PUSCH configuration component as described with reference to FIGS. 7 through 12.

At 1915, the UE may transmit, to the target cell, a message via the PUSCH having the identified configuration, the message indicating a completion of the handover to the target cell. The operations of 1915 may be performed according to the methods described herein. In some examples, aspects of the operations of 1915 may be performed by a handover completion component as described with reference to FIGS. 7 through 12.

Figure 20:
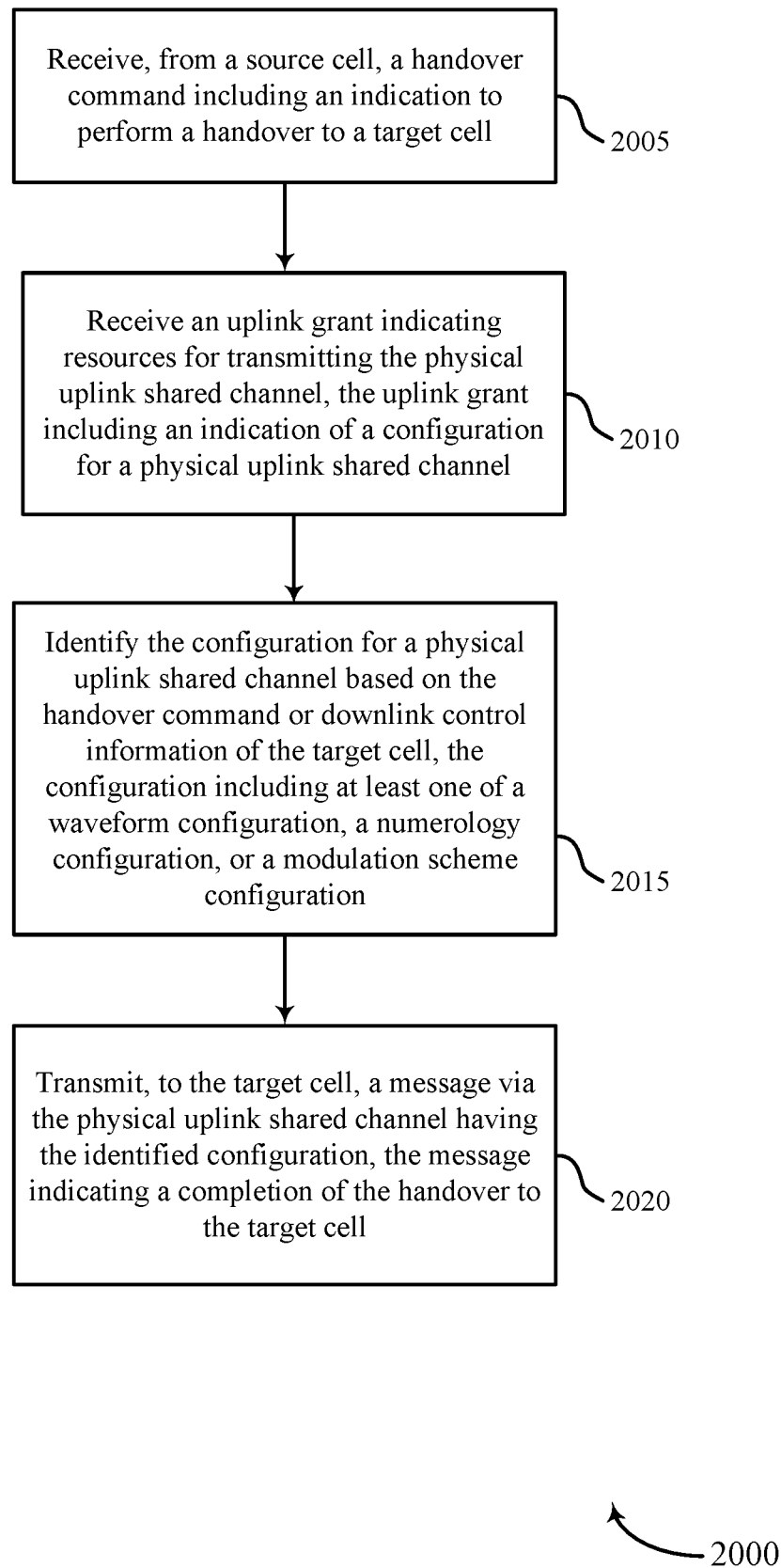

FIG. 20 shows a flowchart illustrating a method 2000 that supports PUSCH configurations and occasions for handover procedures in accordance with aspects of the present disclosure. The operations of method 2000 may be implemented by a UE 115 or its components as described herein. For example, the operations of method 2000 may be performed by a UE communications manager as described with reference to FIGS. 7 through 12. In some examples, a UE may execute a set of instructions to control the functional elements of the UE to perform the functions described below. Additionally or alternatively, a UE may perform aspects of the functions described below using special-purpose hardware.

At 2005, the UE may receive, from a source cell, a handover command including an indication to perform a handover to a target cell. The operations of 2005 may be performed according to the methods described herein. In some examples, aspects of the operations of 2005 may be performed by a handover command component as described with reference to FIGS. 7 through 12.

At 2010, the UE may receive an uplink grant indicating resources for transmitting the PUSCH, the uplink grant including an indication of a configuration for a PUSCH. The operations of 2010 may be performed according to the methods described herein. In some examples, aspects of the operations of 2010 may be performed by an uplink grant component as described with reference to FIGS. 7 through 12.

At 2015, the UE may identify the configuration for the PUSCH based on the handover command or downlink control information of the target cell, the configuration including at least one of a waveform configuration, a numerology configuration, or a modulation scheme configuration. The operations of 2015 may be performed according to the methods described herein. In some examples, aspects of the operations of 2015 may be performed by a PUSCH configuration component as described with reference to FIGS. 7 through 12.

At 2020, the UE may transmit, to the target cell, a message via the PUSCH having the identified configuration, the message indicating a completion of the handover to the target cell. The operations of 2020 may be performed according to the methods described herein. In some examples, aspects of the operations of 2020 may be performed by a handover completion component as described with reference to FIGS. 7 through 12.

Figure 21:
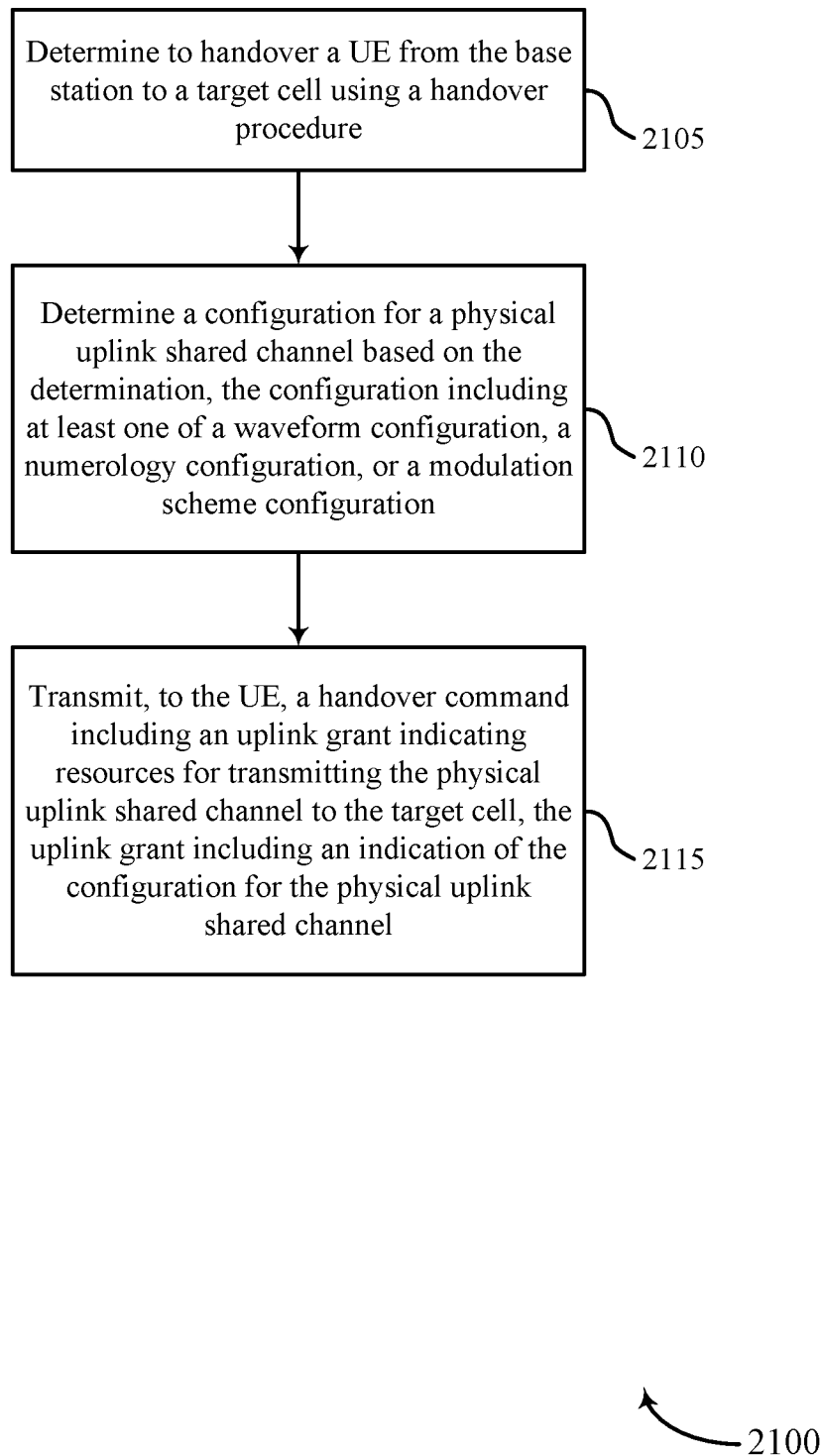

FIG. 21 shows a flowchart illustrating a method 2100 that supports PUSCH configurations and occasions for handover procedures in accordance with aspects of the present disclosure. The operations of method 2100 may be implemented by a base station 105 or its components as described herein. For example, the operations of method 2100 may be performed by a base station communications manager as described with reference to FIGS. 13 through 18. In some examples, a base station may execute a set of instructions to control the functional elements of the base station to perform the functions described below. Additionally or alternatively, a base station may perform aspects of the functions described below using special-purpose hardware.

At 2105, the base station may determine to handover a UE from the base station to a target cell using a handover procedure. The operations of 2105 may be performed according to the methods described herein. In some examples, aspects of the operations of 2105 may be performed by a handover manager as described with reference to FIGS. 13 through 18.

At 2110, the base station may determine a configuration for a PUSCH based on the determination, the configuration including at least one of a waveform configuration, a numerology configuration, or a modulation scheme configuration. The operations of 2110 may be performed according to the methods described herein. In some examples, aspects of the operations of 2110 may be performed by a PUSCH configuration manager as described with reference to FIGS. 13 through 18.

At 2115, the base station may transmit, to the UE, a handover command including an uplink grant indicating resources for transmitting the PUSCH to the target cell, the uplink grant including an indication of the configuration for the PUSCH. The operations of 2115 may be performed according to the methods described herein. In some examples, aspects of the operations of 2115 may be performed by a handover command manager as described with reference to FIGS. 13 through 18.

Figure 22:
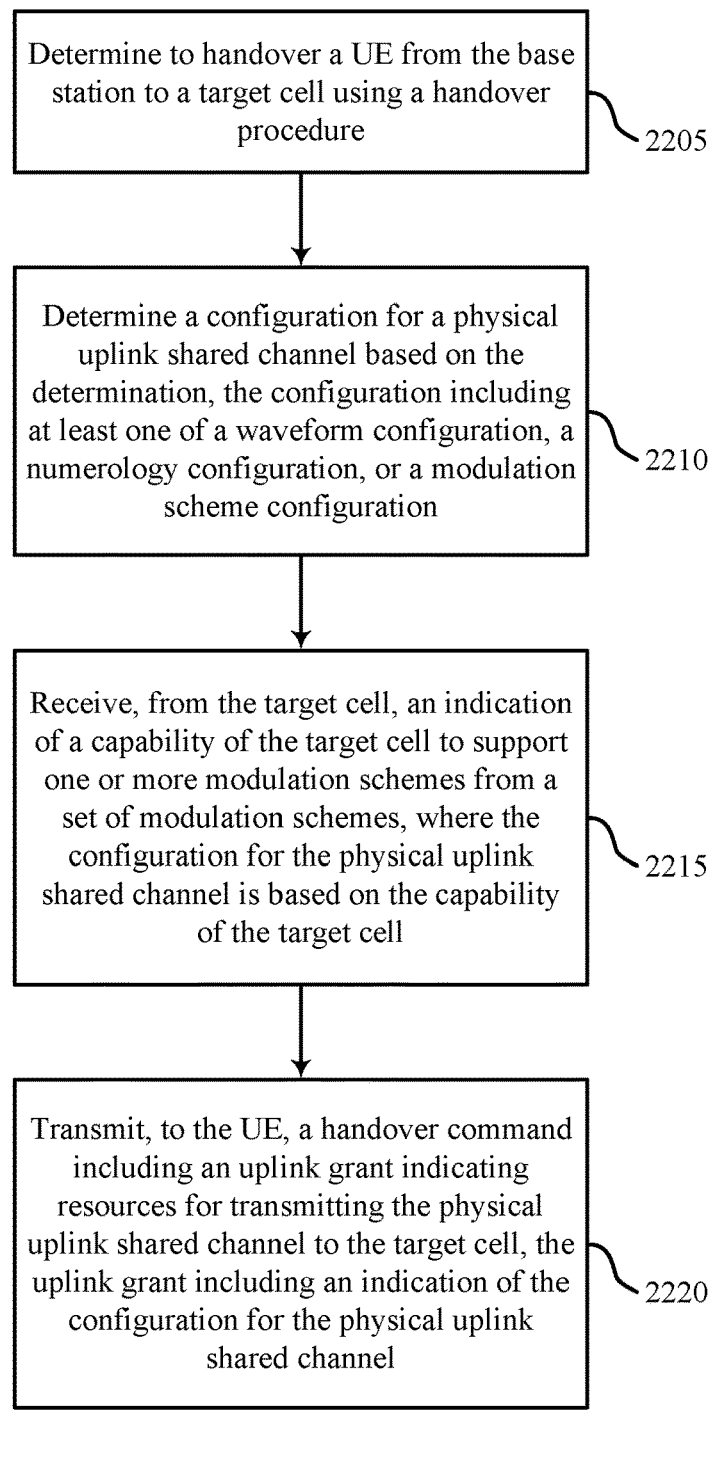

FIG. 22 shows a flowchart illustrating a method 2200 that supports PUSCH configurations and occasions for handover procedures in accordance with aspects of the present disclosure. The operations of method 2200 may be implemented by a base station 105 or its components as described herein. For example, the operations of method 2200 may be performed by a base station communications manager as described with reference to FIGS. 13 through 18. In some examples, a base station may execute a set of instructions to control the functional elements of the base station to perform the functions described below. Additionally or alternatively, a base station may perform aspects of the functions described below using special-purpose hardware.

At 2205, the base station may determine to handover a UE from the base station to a target cell using a handover procedure. The operations of 2205 may be performed according to the methods described herein. In some examples, aspects of the operations of 2205 may be performed by a handover manager as described with reference to FIGS. 13 through 18.

At 2210, the base station may determine a configuration for a PUSCH based on the determination, the configuration including at least one of a waveform configuration, a numerology configuration, or a modulation scheme configuration. The operations of 2210 may be performed according to the methods described herein. In some examples, aspects of the operations of 2210 may be performed by a PUSCH configuration manager as described with reference to FIGS. 13 through 18.

At 2215, the base station may receive, from the target cell, an indication of a capability of the target cell to support one or more modulation schemes from a set of modulation schemes, where the configuration for the PUSCH is based on the capability of the target cell. The operations of 2215 may be performed according to the methods described herein. In some examples, aspects of the operations of 2215 may be performed by a modulation scheme manager as described with reference to FIGS. 13 through 18.

At 2220, the base station may transmit, to the UE, a handover command including an uplink grant indicating resources for transmitting the PUSCH to the target cell, the uplink grant including an indication of the configuration for the PUSCH. The operations of 2220 may be performed according to the methods described herein. In some examples, aspects of the operations of 1220 may be performed by a handover command manager as described with reference to FIGS. 13 through 18.

Figure 23:
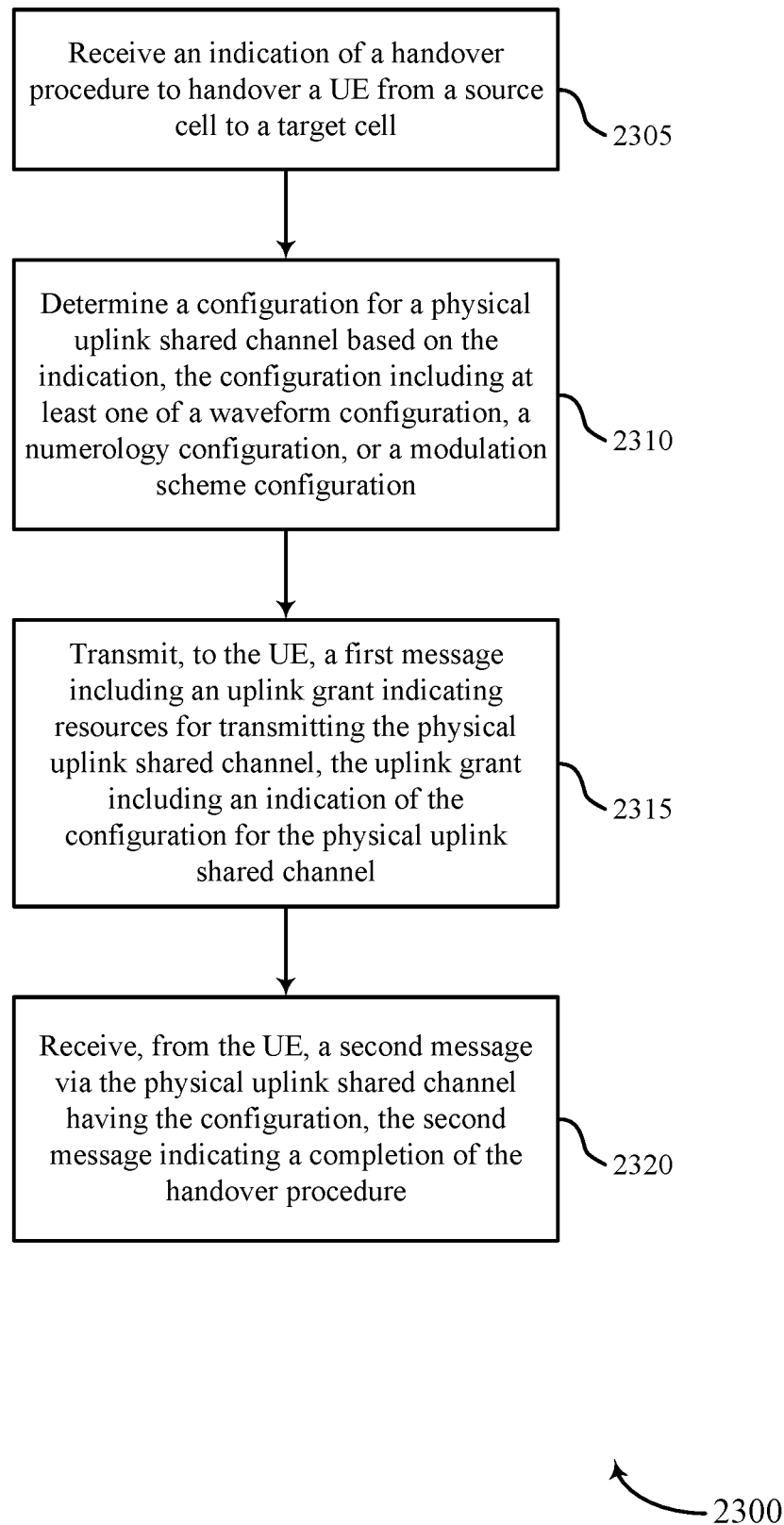

FIG. 23 shows a flowchart illustrating a method 2300 that supports PUSCH configurations and occasions for handover procedures in accordance with aspects of the present disclosure. The operations of method 2300 may be implemented by a base station 105 or its components as described herein. For example, the operations of method 2300 may be performed by a base station communications manager as described with reference to FIGS. 13 through 18. In some examples, a base station may execute a set of instructions to control the functional elements of the base station to perform the functions described below. Additionally or alternatively, a base station may perform aspects of the functions described below using special-purpose hardware.

At 2305, the base station may receive an indication of a handover procedure to handover a UE from a source cell to a target cell. The operations of 2305 may be performed according to the methods described herein. In some examples, aspects of the operations of 2305 may be performed by a handover preparation component as described with reference to FIGS. 13 through 18.

At 2310, the base station may determine a configuration for a PUSCH based on the indication, the configuration including at least one of a waveform configuration, a numerology configuration, or a modulation scheme configuration. The operations of 2310 may be performed according to the methods described herein. In some examples, aspects of the operations of 2310 may be performed by a PUSCH configuration manager as described with reference to FIGS. 13 through 18.

At 2315, the base station may transmit, to the UE, a first message including an uplink grant indicating resources for transmitting the PUSCH, the uplink grant including an indication of the configuration for the PUSCH. The operations of 2315 may be performed according to the methods described herein. In some examples, aspects of the operations of 2315 may be performed by an uplink grant manager as described with reference to FIGS. 13 through 18.

At 2320, the base station may receive, from the UE, a second message via the PUSCH having the configuration, the second message indicating a completion of the handover procedure. The operations of 2320 may be performed according to the methods described herein. In some examples, aspects of the operations of 2320 may be performed by a handover completion manager as described with reference to FIGS. 13 through 18.

Figure 24:
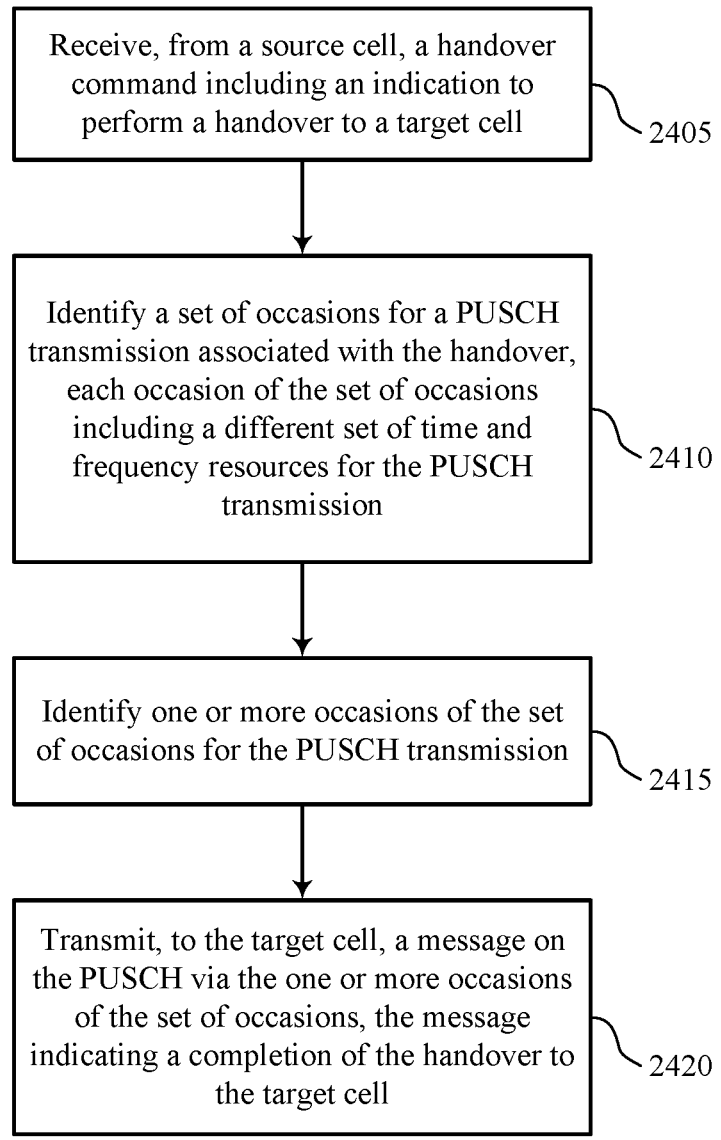

FIG. 24 shows a flowchart illustrating a method 2400 that supports PUSCH configurations and occasions for handover procedures in accordance with aspects of the present disclosure. The operations of method 2400 may be implemented by a UE 115 or its components as described herein. For example, the operations of method 2400 may be performed by a UE communications manager as described with reference to FIGS. 7 through 12. In some examples, a UE may execute a set of instructions to control the functional elements of the UE to perform the functions described below. Additionally or alternatively, a UE may perform aspects of the functions described below using special-purpose hardware.

At 2405, the UE may receive, from a source cell, a handover command including an indication to perform a handover to a target cell. The operations of 2405 may be performed according to the methods described herein. In some examples, aspects of the operations of 2405 may be performed by a handover command receiver as described with reference to FIGS. 7 through 12.

At 2410, the UE may identify a set of occasions for a PUSCH transmission associated with the handover, each occasion of the set of occasions including a different set of time and frequency resources for the PUSCH transmission. The operations of 2410 may be performed according to the methods described herein. In some examples, aspects of the operations of 2410 may be performed by a PUSCH occasion identifier as described with reference to FIGS. 7 through 12.

At 2415, the UE may identify one or more occasions of the set of occasions for the PUSCH transmission. The operations of 2415 may be performed according to the methods described herein. In some examples, aspects of the operations of 2415 may be performed by a PUSCH occasion transmission identifier as described with reference to FIGS. 7 through 12.

At 2420, the UE may transmit, to the target cell, a message on the PUSCH via the one or more occasions of the set of occasions, the message indicating a completion of the handover to the target cell. The operations of 2420 may be performed according to the methods described herein. In some examples, aspects of the operations of 2420 may be performed by a PUSCH transmitter as described with reference to FIGS. 7 through 12.

Figure 25:
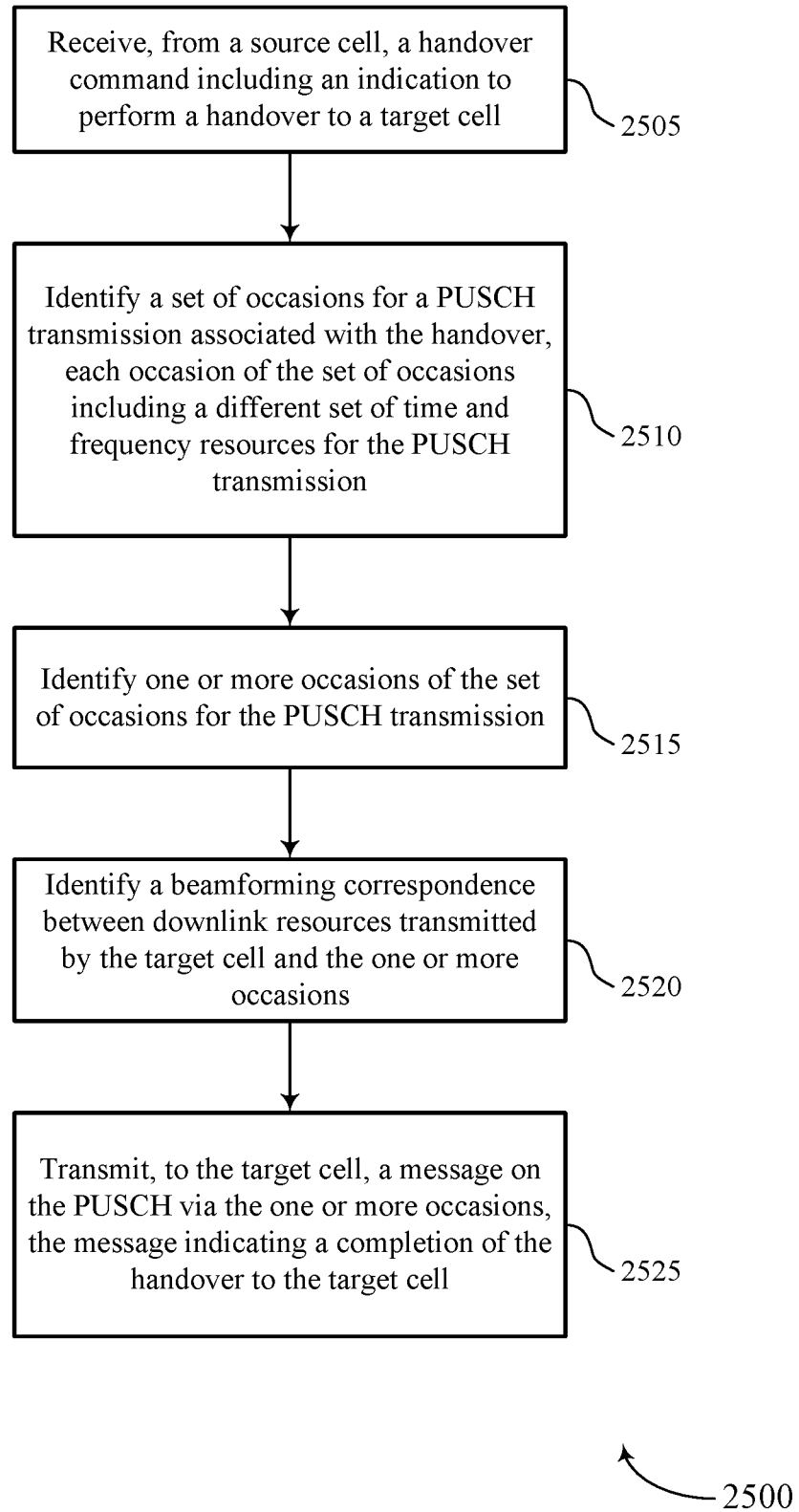

FIG. 25 shows a flowchart illustrating a method 2500 that supports PUSCH configurations and occasions for handover procedures in accordance with aspects of the present disclosure. The operations of method 2500 may be implemented by a UE 115 or its components as described herein. For example, the operations of method 2500 may be performed by a UE communications manager as described with reference to FIGS. 7 through 12. In some examples, a UE may execute a set of instructions to control the functional elements of the UE to perform the functions described below. Additionally or alternatively, a UE may perform aspects of the functions described below using special-purpose hardware.

At 2505, the UE may receive, from a source cell, a handover command including an indication to perform a handover to a target cell. The operations of 2505 may be performed according to the methods described herein. In some examples, aspects of the operations of 2505 may be performed by a handover command receiver as described with reference to FIGS. 7 through 12.

At 2510, the UE may identify a set of occasions for a PUSCH transmission associated with the handover, each occasion of the set of occasions including a different set of time and frequency resources for the PUSCH transmission. The operations of 2510 may be performed according to the methods described herein. In some examples, aspects of the operations of 2510 may be performed by a PUSCH occasion identifier as described with reference to FIGS. 7 through 12.

At 2515, the UE may identify one or more occasions of the set of occasions for the PUSCH transmission. The operations of 2515 may be performed according to the methods described herein. In some examples, aspects of the operations of 2515 may be performed by a PUSCH occasion transmission identifier as described with reference to FIGS. 7 through 12.

At 2520, the UE may identify a beamforming correspondence between downlink resources transmitted by the target cell and the one or more occasions of the set of occasions. The operations of 2520 may be performed according to the methods described herein. In some examples, aspects of the operations of 2520 may be performed by a beamforming correspondence component as described with reference to FIGS. 7 through 12.

At 2525, the UE may transmit, to the target cell, a message on the PUSCH via the one or more occasions of the set of occasions, the message indicating a completion of the handover to the target cell. The operations of 2525 may be performed according to the methods described herein. In some examples, aspects of the operations of 2525 may be performed by a PUSCH transmitter as described with reference to FIGS. 7 through 12.

Figure 26:
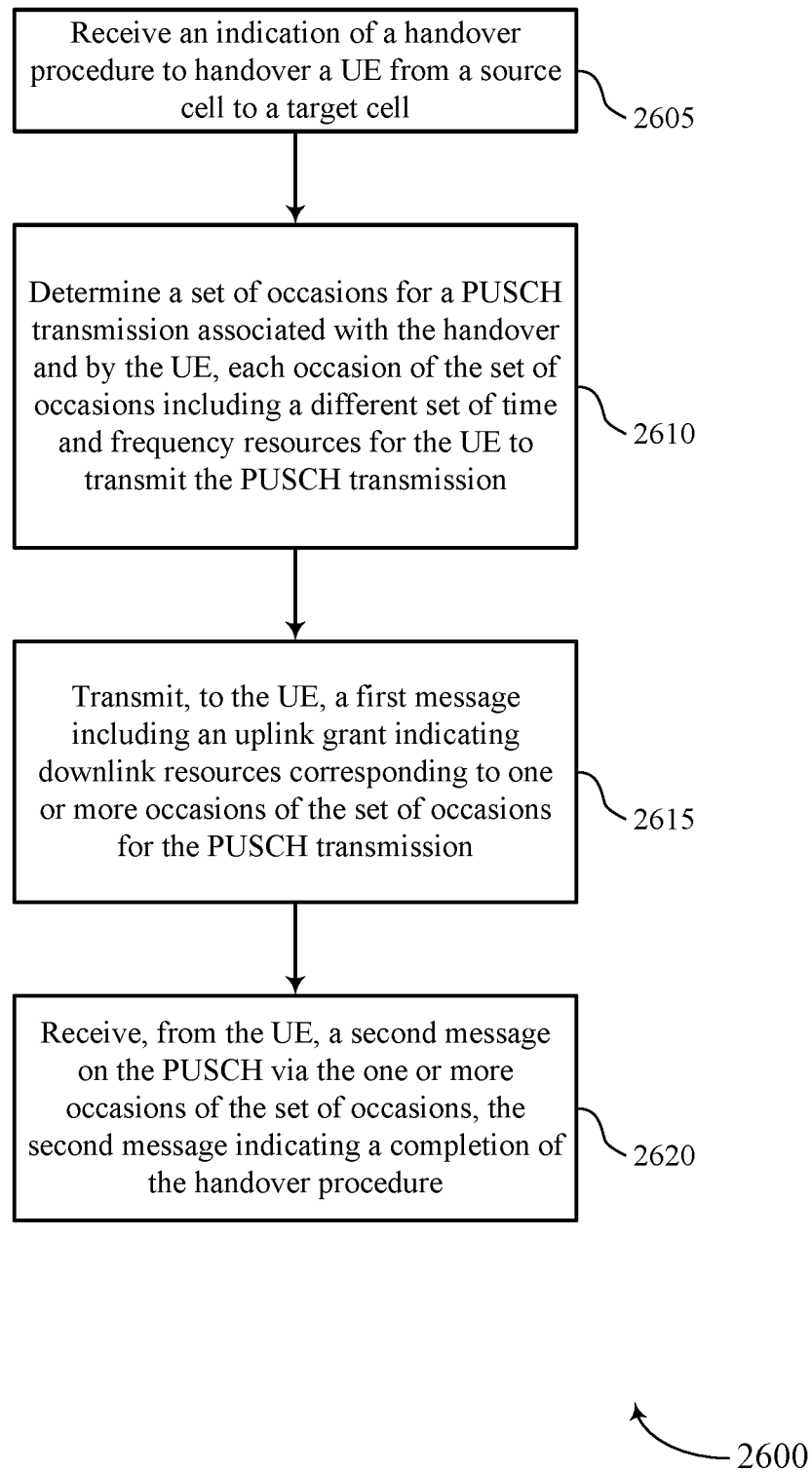

FIG. 26 shows a flowchart illustrating a method 2600 that supports PUSCH configurations and occasions for handover procedures in accordance with aspects of the present disclosure. The operations of method 2600 may be implemented by a base station 105 or its components as described herein. For example, the operations of method 2600 may be performed by a base station communications manager as described with reference to FIGS. 13 through 18. In some examples, a base station may execute a set of instructions to control the functional elements of the base station to perform the functions described below. Additionally or alternatively, a base station may perform aspects of the functions described below using special-purpose hardware.

At 2605, the base station may receive an indication of a handover procedure to handover a UE from a source cell to a target cell. The operations of 2605 may be performed according to the methods described herein. In some examples, aspects of the operations of 2605 may be performed by a handover indication receiver as described with reference to FIGS. 13 through 18.

At 2610, the base station may determine a set of occasions for a PUSCH transmission associated with the handover and by the UE, each occasion of the set of occasions including a different set of time and frequency resources for the UE to transmit the PUSCH transmission. The operations of 2610 may be performed according to the methods described herein. In some examples, aspects of the operations of 2610 may be performed by a PUSCH occasion determination component as described with reference to FIGS. 13 through 18.

At 2615, the base station may transmit, to the UE, a first message including an uplink grant indicating downlink resources corresponding to one or more occasions of the set of occasions for the PUSCH transmission. The operations of 2615 may be performed according to the methods described herein. In some examples, aspects of the operations of 2615 may be performed by a PUSCH occasion indicator as described with reference to FIGS. 13 through 18.

At 2620, the base station may receive, from the UE, a second message on the PUSCH via the one or more occasions of the set of occasions, the second message indicating a completion of the handover procedure. The operations of 2620 may be performed according to the methods described herein. In some examples, aspects of the operations of 2620 may be performed by a PUSCH receiver as described with reference to FIGS. 13 through 18.

Figure 27:
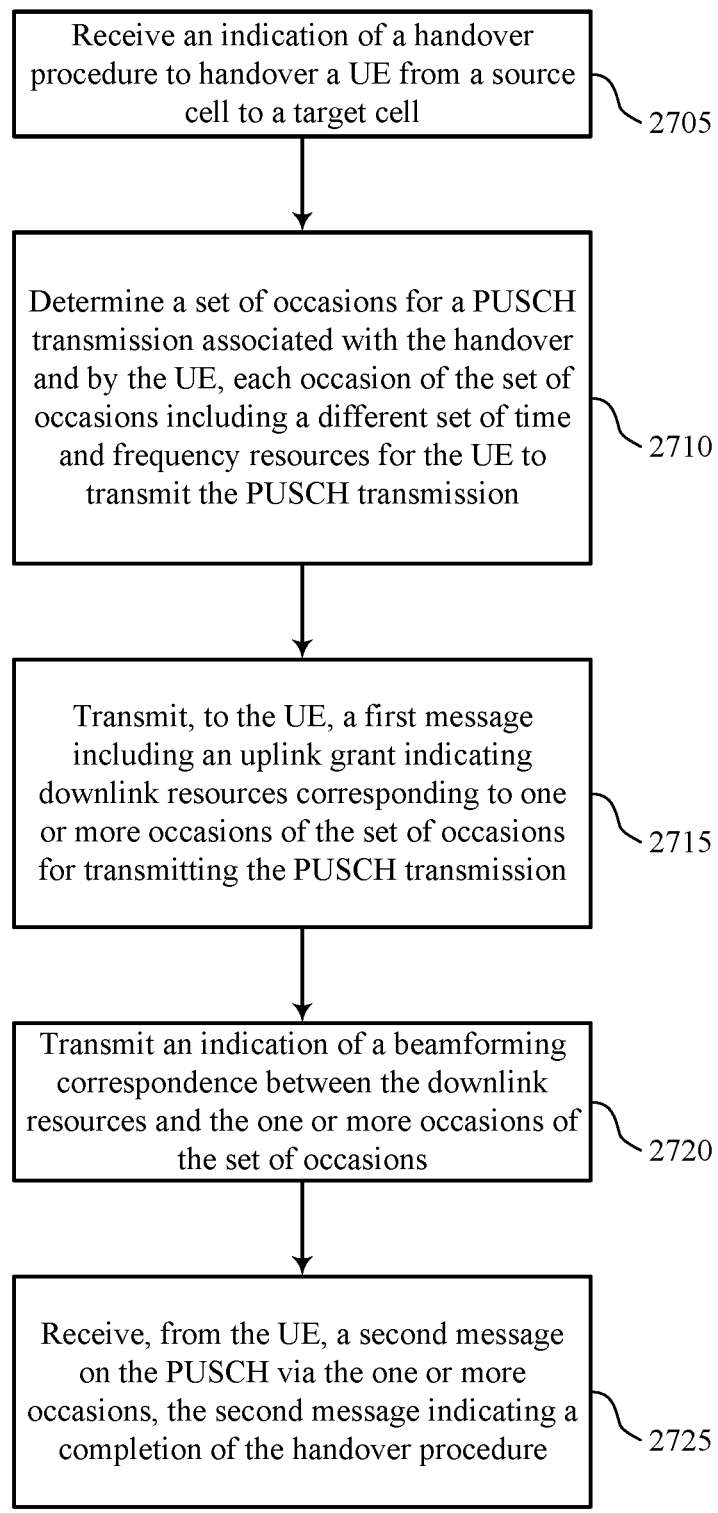

FIG. 27 shows a flowchart illustrating a method 2700 that supports PUSCH configurations and occasions for handover procedures in accordance with aspects of the present disclosure. The operations of method 2700 may be implemented by a base station 105 or its components as described herein. For example, the operations of method 2700 may be performed by a base station communications manager as described with reference to FIGS. 13 through 18. In some examples, a base station may execute a set of instructions to control the functional elements of the base station to perform the functions described below. Additionally or alternatively, a base station may perform aspects of the functions described below using special-purpose hardware.

At 2705, the base station may receive an indication of a handover procedure to handover a UE from a source cell to a target cell. The operations of 2705 may be performed according to the methods described herein. In some examples, aspects of the operations of 2705 may be performed by a handover indication receiver as described with reference to FIGS. 13 through 18.

At 2710, the base station may determine a set of occasions for a PUSCH transmission associated with the handover and by the UE, each occasion of the set of occasions including a different set of time and frequency resources for the UE to transmit the PUSCH transmission. The operations of 2710 may be performed according to the methods described herein. In some examples, aspects of the operations of 2710 may be performed by a PUSCH occasion determination component as described with reference to FIGS. 13 through 18.

At 2715, the base station may transmit, to the UE, a first message including an uplink grant indicating downlink resources corresponding to one or more occasions of the set of occasions for the PUSCH transmission. The operations of 2715 may be performed according to the methods described herein. In some examples, aspects of the operations of 2715 may be performed by a PUSCH occasion indicator as described with reference to FIGS. 13 through 18.

At 2720, the base station may transmit an indication of a beamforming correspondence between the downlink resources and the one or more occasions of the set of occasions. The operations of 2720 may be performed according to the methods described herein. In some examples, aspects of the operations of 2720 may be performed by a beamforming correspondence transmitter as described with reference to FIGS. 13 through 18.

At 2725, the base station may receive, from the UE, a second message on the PUSCH via the one or more occasions of the set of occasions, the second message indicating a completion of the handover procedure. The operations of 2725 may be performed according to the methods described herein. In some examples, aspects of the operations of 2725 may be performed by a PUSCH receiver as described with reference to FIGS. 13 through 18.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Example 1

A method for wireless communications at a user equipment (UE), comprising: receiving, from a source cell, a handover command comprising an indication to perform a handover to a target cell; identifying a configuration for a physical uplink shared channel based at least in part on the handover command or downlink control information of the target cell, the configuration comprising at least one of a waveform configuration, a numerology configuration, or a modulation scheme configuration; and transmitting, to the target cell, a message via the physical uplink shared channel having the identified configuration, the message indicating a completion of the handover to the target cell.

Example 2

The method of example 1, wherein identifying the configuration of the physical uplink shared channel comprises: receiving an uplink grant indicating resources for transmitting the physical uplink shared channel, the uplink grant comprising an indication of the configuration for the physical uplink shared channel.

Example 3

The method of example 2, further comprising: identifying, within the uplink grant, an indication of the waveform configuration; and selecting a waveform from a set of waveforms based at least in part on the indication of the waveform configuration.

Example 4

The method of example 2, further comprising: identifying, within the uplink grant, an indication of the numerology configuration; and selecting a numerology from a set of numerologies based at least in part on the indication of the numerology configuration.

Example 5

The method of example 4, wherein the selected numerology is the same as a numerology of an active uplink bandwidth part of the source cell.

Example 6

The method of example 4, wherein the selected numerology is different from a numerology of an active uplink bandwidth part of the source cell.

Example 7

The method of example 2, further comprising: identifying, within the uplink grant, an indication of the modulation scheme configuration; and selecting a modulation scheme from a set of modulation schemes based at least in part on the indication of the modulation scheme configuration.

Example 8

The method of example 7, wherein the modulation scheme comprises frequency-domain-based Pi/2 binary phase shift keying for a demodulation reference signal associated with the physical uplink shared channel or time-domain-based Pi/2 binary phase shift keying for the demodulation reference signal associated with the physical uplink shared channel.

Example 9

The method of example 7, wherein the indication of the modulation scheme configuration comprises one or more reserved bits within the uplink grant.

Example 10

The method of example 2, wherein the uplink grant is included in the handover command.

Example 11

The method of example 2, wherein receiving the uplink grant indicating the resources for transmitting the physical uplink shared channel comprises: receiving, from the target cell, the downlink control information comprising the uplink grant.

Example 12

The method of any of examples 1 to 11, wherein identifying the configuration for the physical uplink shared channel comprises: receiving, from the target cell, system information comprising an indication of the waveform configuration; and selecting a waveform from a set of waveforms based at least in part on the indication of the waveform configuration.

Example 13

The method of example 12, wherein the indication of the waveform configuration is received within a field of a common configuration information element.

Example 14

The method of any of examples 1 to 13, wherein identifying the configuration for the physical uplink shared channel comprises: determining a waveform of an active bandwidth part of the source cell; and selecting the waveform of the active bandwidth part for the physical uplink shared channel.

Example 15

The method of any examples 1 to 14, wherein identifying the configuration for the physical uplink shared channel comprises: determining a numerology of an initial uplink bandwidth part of the target cell; and selecting the numerology of the initial uplink bandwidth part for the physical uplink shared channel.

Example 16

The method of any examples 1 to 15, wherein identifying the configuration for the physical uplink shared channel comprises: determining a numerology of an active uplink bandwidth part of the source cell; and selecting the numerology of the active uplink bandwidth part for the physical uplink shared channel.

Example 17

The method of any examples 1 to 16, further comprising: receiving an uplink grant indicating resources for transmitting the physical uplink shared channel; determining whether an indication of the configuration for the physical uplink shared channel is included in the uplink grant; and identifying the configuration for the physical uplink shared channel based at least in part on a determination that the indication of the configuration is absent from the uplink grant.

Example 18

The method of example 17, further comprising: selecting a waveform from a set of waveforms based at least in part on an indication of the waveform configuration in system information received from the target cell, wherein the selection is based at least in part on the indication of the configuration being absent from the uplink grant.

Example 19

The method of example 17, further comprising: determining a waveform of an active bandwidth part of the source cell; selecting the waveform of the active bandwidth part for the physical uplink shared channel, wherein the selection is based at least in part on the indication of the configuration being absent from the uplink grant.

Example 20

The method of example 17, further comprising: selecting a numerology from a set of numerologies based at least in part on an indication of the numerology configuration in system information received from the target cell, wherein the selection is based at least in part on the indication of the configuration being absent from the uplink grant.

Example 21

The method of example 17, further comprising: determining a numerology of an active bandwidth part of the source cell; selecting the numerology of the active bandwidth part for the physical uplink shared channel, wherein the selection is based at least in part on the indication of the configuration being absent from the uplink grant.

Example 22

The method of any examples 1 to 21, wherein the numerology configuration comprises a configuration of a numerology for the physical uplink shared channel or a numerology of an active bandwidth part for transmitting the physical uplink shared channel.

Example 23

The method of any examples 1 to 22, wherein the handover comprises a random access channel-less handover.

Example 24

The method of any examples 1 to 23, wherein the message comprises a radio resource control reconfiguration complete message.

Example 25

An apparatus for wireless communications comprising a processor; memory in electronic communication with the processor; and instructions stored in the memory and executable by the processor to cause the apparatus to perform a method of any of examples 1 to 24.

Example 26

An apparatus comprising at least one means for performing a method of any of examples 1 to 24.

Example 27

A non-transitory computer-readable medium storing code for wireless communications, the code comprising instructions executable by a processor to perform a method of any of examples 1 to 24.

Example 28

A method for wireless communications at a base station, comprising: determining to handover a user equipment (UE) from the base station to a target cell using a handover procedure; determining a configuration for a physical uplink shared channel based at least in part on the determination, the configuration comprising at least one of a waveform configuration, a numerology configuration, or a modulation scheme configuration; and transmitting, to the UE, a handover command comprising an uplink grant indicating resources for transmitting the physical uplink shared channel to the target cell, the uplink grant comprising an indication of the configuration for the physical uplink shared channel.

Example 29

The method of example 28, further comprising: receiving, from the target cell, an indication of a capability of the target cell to support one or more modulation schemes from a set of modulation schemes, wherein the configuration for the physical uplink shared channel is based at least in part on the capability of the target cell.

Example 30

The method of example 29, wherein the set of modulation schemes comprises frequency-domain-based Pi/2 binary phase shift keying for a demodulation reference signal associated with the physical uplink shared channel and time-domain-based Pi/2 binary phase shift keying for the demodulation reference signal associated with the physical uplink shared channel.

Example 31

The method of example 28, wherein determining the configuration for the physical uplink shared channel comprises: identifying a set of waveforms for the physical uplink shared channel; and determining the waveform configuration using a waveform from the set of waveforms.

Example 32

The method of example 28, wherein determining the configuration for the physical uplink shared channel comprises: identifying a set of numerologies for the physical uplink shared channel; and determining the numerology configuration using a numerology from the set of numerologies.

Example 33

The method of example 28, wherein determining the configuration for the physical uplink shared channel comprises: identifying a set of modulation schemes for the physical uplink shared channel; and determining the modulation scheme configuration using a modulation scheme from the set of modulation schemes.

Example 34

An apparatus for wireless communications comprising a processor; memory in electronic communication with the processor; and instructions stored in the memory and executable by the processor to cause the apparatus to perform a method of any of examples 28 to 33.

Example 35

An apparatus comprising at least one means for performing a method of any of examples 28 to 33.

Example 36

A non-transitory computer-readable medium storing code for wireless communications, the code comprising instructions executable by a processor to perform a method of any of examples 28 to 33.

Example 37

A method for wireless communications at a base station, comprising: receiving an indication of a handover procedure to handover a user equipment (UE) from a source cell to a target cell; determining a configuration for a physical uplink shared channel based at least in part on the indication, the configuration comprising at least one of a waveform configuration, a numerology configuration, or a modulation scheme configuration; transmitting, to the UE, a first message comprising an uplink grant indicating resources for transmitting the physical uplink shared channel, the uplink grant comprising an indication of the configuration for the physical uplink shared channel; and receiving, from the UE, a second message via the physical uplink shared channel having the configuration, the second message indicating a completion of the handover procedure.

Example 38

The method of example 37, further comprising: determining a capability of the base station to support one or more modulation schemes from a set of modulation schemes; and transmitting, to the source cell, an indication of the capability.

Example 39

The method of example 38, wherein the set of modulation schemes comprises frequency-domain-based Pi/2 binary phase shift keying for a demodulation reference signal associated with the physical uplink shared channel and time-domain-based Pi/2 binary phase shift keying for the demodulation reference signal associated with the physical uplink shared channel.

Example 40

The method of any of examples 37 to 39, wherein determining the configuration for the physical uplink shared channel comprises: identifying a set of waveforms for the physical uplink shared channel; and determining the waveform configuration using a waveform from the set of waveforms.

Example 41

The method of example 37, wherein determining the configuration for the physical uplink shared channel comprises: identifying a set of numerologies for the physical uplink shared channel; and determining the numerology configuration using a numerology from the set of numerologies.

Example 42

The method of example 37, wherein determining the configuration for the physical uplink shared channel comprises: identifying a set of modulation schemes for the physical uplink shared channel; and determining the modulation scheme configuration using a modulation scheme from the set of modulation schemes.

Example 43

An apparatus for wireless communications comprising: a processor; memory coupled with the processor; and instructions stored in the memory and executable by the processor to cause the apparatus to perform a method of any of examples 37 to 42.

Example 44

An apparatus comprising at least one means for performing a method of any of examples 37 to 42.

Example 45

A non-transitory computer-readable medium storing code for wireless communications, the code comprising instructions executable by a processor to perform a method of any of examples 37 to 42.

Example 46

A method for wireless communications at a user equipment (UE), comprising: receiving, from a source cell, a handover command comprising an indication to perform a handover to a target cell; identifying a plurality of occasions for a physical uplink shared channel transmission associated with the handover, each occasion of the plurality of occasions comprising a different set of time and frequency resources for the physical uplink shared channel transmission; identifying one or more occasions of the plurality of occasions for the physical uplink shared channel transmission; and transmitting, to the target cell, a message on the physical uplink shared channel via the one or more occasions, the message indicating a completion of the handover to the target cell.

Example 47

The method of example 46, wherein identifying the one or more occasions of the plurality of occasions further comprises: identifying a beamforming correspondence between downlink resources transmitted by the target cell and the one or more occasions.

Example 48

The method of example 47, further comprising: receiving an indication of the beamforming correspondence between the downlink resources and the one or more occasions of the plurality of occasions.

Example 49

The method of example 47, wherein the UE supports beam correspondence, the method comprising: receiving, from the target cell, one or more sets of the downlink resources; selecting at least one set of downlink resources of the one or more sets of the downlink resources based at least in part on a reference signal received power measurement of the one or more sets of the downlink resources; identifying a receive beam for receiving the selected at least one set of downlink resources; and transmitting, to the target cell, the message on the physical uplink shared channel on a transmit beam based at least in part on the identified receive beam.

Example 50

The method of example 49, wherein the identified one or more occasions of the plurality of occasions is based at least in part on the selected at least one set of downlink resources.

Example 51

The method of example 47, wherein the beamforming correspondence comprises a correspondence between one set of downlink resources and one occasion, a correspondence between one set of downlink resources and multiple occasions, a correspondence between multiple sets of downlink resources and one occasion, or a combination thereof.

Example 52

The method of example 47, wherein the downlink resources comprise synchronization signal/physical broadcast channel blocks, channel state information reference signals, or a combination thereof.

Example 53

The method of example 52, further comprising: receiving an indication of a number of synchronization signal/physical broadcast channel blocks that are transmitted by the target cell; and identifying the one or more occasions of the plurality of occasions based at least in part on the number of synchronization signal/physical broadcast channel blocks.

Example 54

The method of example 53, wherein the indication of the number of synchronization signal/physical broadcast channel blocks is received via a system information block, radio resource control signaling, or a combination thereof.

Example 55

The method of example 52, further comprising: receiving the channel state information reference signals based at least in part on a channel state information reference signal based radio resource management procedure.

Example 56

The method of any one of examples 46 to 55, further comprising: transmitting the message on the physical uplink shared channel via the one or more occasions of the plurality of occasions based at least in part on beam sweeping the physical uplink shared channel over multiple occasions of the one or more occasions.

Example 57

The method of any one of examples 46 to 55, further comprising: determining a timing reference of the one or more occasions of the plurality of occasions based at least in part on a boundary of a radio frame by which the UE is allowed to perform the handover, a boundary of a radio frame or a boundary of a half radio frame where downlink resources are detected from the target cell, a timing of a physical random access channel occasion at the target cell, or a combination thereof.

Example 58

The method of example 57, further comprising: receiving, in the handover command, a system frame number of the radio frame by which the UE is allowed to perform the handover.

Example 59

The method of any one of examples 46 to 58, further comprising: determining a frequency reference of the one or more occasions of the plurality of occasions based at least in part on a reference frequency for uplink and downlink transmissions, a random access channel occasion frequency reference, a configured frequency reference received in the handover command, or a combination thereof.

Example 60

The method of example 59, wherein the reference frequency for uplink and downlink transmissions is based at least in part on information received in a master information block, physical broadcast channel, or a combination thereof for a standalone deployment of the UE.

Example 61

The method of example 59, wherein the reference frequency for uplink and downlink transmissions is based at least in part on a network configuration that indicates the reference frequency for a non-standalone deployment of the UE.

Example 62

The method of any one of examples 46 to 61, wherein the plurality of occasions overlaps one or more random access channel occasions in time, frequency, or a combination thereof.

Example 63

The method of any one of examples 46 to 62, wherein the plurality of occasions is frequency division multiplexed, time division multiplexed, or a combination thereof.

Example 64

The method of any one of examples 46 to 63, wherein one or more timing gaps between the plurality of occasions are the same or are different between consecutive occasions in a time domain.

Example 65

The method of any one of examples 46 to 64, wherein the handover does not include use of a random access channel during the handover.

Example 66

An apparatus for wireless communications comprising: a processor; memory coupled with the processor; and instructions stored in the memory and executable by the processor to cause the apparatus to perform a method of any of examples 46 to 65.

Example 67

An apparatus comprising at least one means for performing a method of any of examples 46 to 65.

Example 68

A non-transitory computer-readable medium storing code for wireless communications, the code comprising instructions executable by a processor to perform a method of any of examples 46 to 65.

Example 69

A method for wireless communications at a base station, comprising: receiving an indication of a handover procedure to handover a user equipment (UE) from a source cell to a target cell; determining a plurality of occasions for a physical uplink shared channel transmission associated with the handover and by the UE, each occasion of the plurality of occasions comprising a different set of time and frequency resources for the UE to transmit the physical uplink shared channel transmission; transmitting, to the UE, a first message comprising an uplink grant indicating downlink resources corresponding to one or more occasions of the plurality of occasions for the physical uplink shared channel transmission; and receiving, from the UE, a second message on the physical uplink shared channel via the one or more occasions of the plurality of occasions, the second message indicating a completion of the handover procedure.

Example 70

The method of example 69, further comprising: transmitting an indication of a beamforming correspondence between the downlink resources and the one or more occasions of the plurality of occasions.

Example 71

The method of example 70, wherein the indication comprises a correspondence between one set of downlink resources and one occasion, a correspondence between one set of downlink resources and multiple occasions, a correspondence between multiple sets of downlink resources and one occasion, or a combination thereof.

Example 72

The method of any one of examples 69 to 71, further comprising: transmitting, to the UE, one or more sets of the downlink resources on one or more transmit beams; and receiving, from the UE, the second message on the physical uplink shared channel on a receive beam based at least in part on the one or more transmit beams.

Example 73

The method of any one of examples 69 to 72, wherein the downlink resources comprise synchronization signal/physical broadcast channel blocks, channel state information reference signals, or a combination thereof.

Example 74

The method of example 73, further comprising: transmitting an indication of a number of synchronization signal/physical broadcast channel blocks that are transmitted by the target cell, wherein the one or more occasions of the plurality of occasions are based at least in part on the number of synchronization signal/physical broadcast channel blocks.

Example 75

The method of example 74, further comprising: transmitting the indication of the number of synchronization signal/physical broadcast channel blocks via a system information block, radio resource control signaling, or a combination thereof.

Example 76

The method of example 73, further comprising: transmitting the channel state information reference signals based at least in part on a channel state information reference signal based radio resource management procedure.

Example 77

The method of any one of examples 69 to 76, wherein the plurality of occasions overlaps one or more random access channel occasions in time, frequency, or a combination thereof.

Example 78

The method of any one of examples 69 to 77, wherein the plurality of occasions is frequency division multiplexed, time division multiplexed, or a combination thereof.

Example 79

The method of any one of examples 69 to 78, wherein one or more timing gaps between the plurality of occasions are the same or are different between consecutive occasions in a time domain.

Example 80

The method of any one of examples 69 to 79, wherein the handover does not include use of a random access channel during the handover.

Example 81

An apparatus for wireless communications comprising: a processor; memory coupled with the processor; and instructions stored in the memory and executable by the processor to cause the apparatus to perform a method of any of examples 69 to 80.

Example 82

An apparatus comprising at least one means for performing a method of any of examples 69 to 80.

Example 83

A non-transitory computer-readable medium storing code for wireless communications, the code comprising instructions executable by a processor to perform a method of any of examples 69 to 80.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a source cell, a handover command comprising an indication to perform a handover to a target cell;
    receiving an indication of a numerology configuration for a physical uplink shared channel configuration for a handover completion message to be transmitted via a physical uplink shared channel, wherein the physical uplink shared channel configuration is based at least in part on receiving the handover command or downlink control information of the target cell;
    selecting a numerology from a set of numerologies based at least in part on the indication of the numerology configuration, wherein the numerology comprises a subcarrier spacing for transmitting the handover completion message to the target cell; and
    transmitting, to the target cell, the handover completion message in accordance with the selected numerology and via the physical uplink shared channel having the physical uplink shared channel configuration, the handover completion message indicating a completion of the handover to the target cell.

2. The method of claim 1, wherein receiving the indication of the numerology configuration for the physical uplink shared channel configuration comprises:
    receiving an uplink grant indicating resources for transmitting the handover completion message via the physical uplink shared channel, the uplink grant comprising an indication of the physical uplink shared channel configuration and one or more parameters including the numerology configuration.

3. The method of claim 2, further comprising:
    receiving, within the uplink grant, an indication of a waveform configuration for the physical uplink shared channel, wherein the one or more parameters include the waveform configuration; and
    selecting a waveform from a set of waveforms based at least in part on the indication of the waveform configuration.

4. The method of claim 2, further comprising:
    receiving, within the uplink grant, an indication of a modulation scheme configuration for the physical uplink shared channel, wherein the one or more parameters include the modulation scheme configuration; and
    selecting a modulation scheme from a set of modulation schemes based at least in part on the indication of the modulation scheme configuration.

5. The method of claim 4, wherein the modulation scheme comprises frequency-domain-based Pi/2 binary phase shift keying for a demodulation reference signal associated with the physical uplink shared channel or time-domain-based Pi/2 binary phase shift keying for the demodulation reference signal associated with the physical uplink shared channel, and wherein the indication of the modulation scheme configuration comprises one or more reserved bits within the uplink grant.

6. The method of claim 2, wherein receiving the uplink grant indicating the resources for transmitting the handover completion message via the physical uplink shared channel comprises:
receiving, from the target cell, the downlink control information comprising the uplink grant.

7. The method of claim 1, further comprising:
receiving, from the target cell, system information comprising an indication of a waveform configuration for the physical uplink shared channel; and
selecting a waveform from a set of waveforms based at least in part on the indication of the waveform configuration.

8. The method of claim 1, further comprising:
determining a waveform of an active bandwidth part of the source cell; and
selecting the waveform of the active bandwidth part for the physical uplink shared channel.

9. The method of claim 1,
wherein the numerology comprises a numerology of an initial uplink bandwidth part for the physical uplink shared channel.

10. The method of claim 1,
wherein the numerology comprises a numerology of an active uplink bandwidth part for the physical uplink shared channel.

11. The method of claim 1, further comprising:
receiving an uplink grant indicating resources for transmitting the handover completion message via the physical uplink shared channel; and
selecting one or more parameters for the physical uplink shared channel configuration based at least in part on a determination that an indication of the one or more parameters for the physical uplink shared channel configuration is absent from the uplink grant, the one or more parameters for the physical uplink shared channel configuration comprising at least one of the numerology configuration, a waveform configuration, or a modulation scheme configuration.

12. The method of claim 11, further comprising:
selecting a waveform from a set of waveforms based at least in part on receiving the indication of the one or more parameters in system information from the target cell, the indication of the one or more parameters comprising an indication of the waveform configuration; wherein selecting the waveform is based at least in part on the indication of the one or more parameters for the physical uplink shared channel configuration being absent from the uplink grant.

13. The method of claim 11, further comprising:
determining a waveform of an active bandwidth part of the source cell; and
selecting the waveform of the active bandwidth part for the physical uplink shared channel, wherein selecting the waveform is based at least in part on the indication of the one or more parameters for the physical uplink shared channel configuration being absent from the uplink grant.

14. The method of claim 11, further comprising:
selecting the numerology from the set of numerologies based at least in part on receiving the indication of the one or more parameters in system information received from the target cell, the indication of the one or more parameters comprising an indication of the numerology configuration, wherein selecting the numerology is based at least in part on the indication of the one or more parameters for the physical uplink shared channel configuration being absent from the uplink grant.

15. The method of claim 11, further comprising:
determining a numerology of an active bandwidth part of the source cell; and
selecting the numerology of the active bandwidth part for the physical uplink shared channel, wherein selecting the numerology is based at least in part on the indication of the one or more parameters for the physical uplink shared channel configuration being absent from the uplink grant.

16. An apparatus for wireless communications at a user equipment (UE), comprising:
a processor, memory coupled with the processor; and
instructions stored in the memory and executable by the processor to cause the apparatus to:
receive, from a source cell, a handover command comprising an indication to perform a handover to a target cell;
receive an indication of a numerology configuration for a physical uplink shared channel configuration for a handover completion message to be transmitted via a physical uplink shared channel, wherein the physical uplink shared channel configuration is based at least in part on receiving the handover command or downlink control information of the target cell;
select a numerology from a set of numerologies based at least in part on the indication of the numerology configuration, wherein the numerology comprises a subcarrier spacing for transmitting the handover completion message to the target cell; and
transmit, to the target cell, the handover completion message in accordance with the selected numerology and via the physical uplink shared channel having the physical uplink shared channel configuration, the handover completion message indicating a completion of the handover to the target cell.

17. The apparatus of claim 16, wherein the instructions to receive the indication of the numerology configuration for the physical uplink shared channel configuration are executable by the processor to cause the apparatus to:
receive an uplink grant indicating resources for transmitting the handover completion message via the physical uplink shared channel, the uplink grant comprising an indication of the physical uplink shared channel configuration and one or more parameters including the numerology configuration.

18. The apparatus of claim 17, wherein the instructions are further executable by the processor to cause the apparatus to:
receive, within the uplink grant, an indication of a waveform configuration for the physical uplink shared channel, wherein the one or more parameters include the waveform configuration; and
select a waveform from a set of waveforms based at least in part on the indication of the waveform configuration.

19. The apparatus of claim 17, wherein the instructions are further executable by the processor to cause the apparatus to:
receive, within the uplink grant, an indication of a modulation scheme configuration for the physical uplink shared channel, wherein the one or more parameters include the modulation scheme configuration; and
select a modulation scheme from a set of modulation schemes based at least in part on the indication of the modulation scheme configuration.

20. The apparatus of claim 19, wherein:
the modulation scheme comprises frequency-domain-based Pi/2 binary phase shift keying for a demodulation reference signal associated with the physical uplink shared channel or time-domain-based Pi/2 binary phase shift keying for the demodulation reference signal associated with the physical uplink shared channel, and
the indication of the modulation scheme configuration comprises one or more reserved bits within the uplink grant.

21. The apparatus of claim 17, wherein the instructions to receive the uplink grant indicating the resources for transmitting the handover completion message via the physical uplink shared channel are executable by the processor to cause the apparatus to:
receive, from the target cell, the downlink control information comprising the uplink grant.

22. The apparatus of claim 16, wherein the instructions are further executable by the processor to cause the apparatus to:
receive, from the target cell, system information comprising an indication of a waveform configuration for the physical uplink shared channel; and
select a waveform from a set of waveforms based at least in part on the indication of the waveform configuration.

23. The apparatus of claim 16, wherein the instructions are further executable by the processor to cause the apparatus to:
determine a waveform of an active bandwidth part of the source cell; and
select the waveform of the active bandwidth part for the physical uplink shared channel.

24. The apparatus of claim 16,
wherein the numerology comprises a numerology of an initial uplink bandwidth part for the physical uplink shared channel.

25. The apparatus of claim 16, wherein
the numerology comprises a numerology of an active uplink bandwidth part for the physical uplink shared channel.

26. The apparatus of claim 16, wherein the instructions are further executable by the processor to cause the apparatus to:
receive an uplink grant indicating resources for transmitting the handover completion message via the physical uplink shared channel; and
select one or more parameters for the physical uplink shared channel configuration based at least in part on a determination that an indication of the one or more parameters for the physical uplink shared channel configuration is absent from the uplink grant, the one or more parameters for the physical uplink shared channel configuration comprising at least one of the numerology configuration, a waveform configuration, or a modulation scheme configuration.

27. An apparatus for wireless communications at a user equipment (UE), comprising:
means for receiving, from a source cell, a handover command comprising an indication to perform a handover to a target cell;
means for receiving an indication of a numerology configuration for a physical uplink shared channel configuration for a handover completion message to be transmitted via a physical uplink shared channel, wherein the physical uplink shared channel configuration is based at least in part on receiving the handover command or downlink control information of the target cell;
means for selecting a numerology from a set of numerologies based at least in part on the indication of the numerology configuration, wherein the numerology comprises a subcarrier spacing for transmitting the handover completion message to the target cell; and
means for transmitting, to the target cell, the handover completion message in accordance with the selected numerology and via the physical uplink shared channel having the physical uplink shared channel configuration, the handover completion message indicating a completion of the handover to the target cell.

28. A non-transitory computer-readable medium storing code for wireless communications at a user equipment (UE), the code comprising instructions executable by a processor to:
receive, from a source cell, a handover command comprising an indication to perform a handover to a target cell;
receive an indication of a numerology configuration for a physical uplink shared channel configuration for a handover completion message to be transmitted via a physical uplink shared channel, wherein the physical uplink shared channel configuration is based at least in part on receiving the handover command or downlink control information of the target cell;
select a numerology from a set of numerologies based at least in part on the indication of the numerology configuration, wherein the numerology comprises a subcarrier spacing for transmitting the handover completion message to the target cell; and
transmit, to the target cell, the handover completion message in accordance with the selected numerology and via the physical uplink shared channel having the physical uplink shared channel configuration, the handover completion message indicating a completion of the handover to the target cell.

* * * * *